United States Patent
Taniguchi et al.

[11] Patent Number: 6,094,216
[45] Date of Patent: *Jul. 25, 2000

[54] STEREOSCOPIC IMAGE DISPLAY METHOD, AND STEREOSCOPIC IMAGE DISPLAY APPARATUS USING THE METHOD

[75] Inventors: Naosato Taniguchi, Urawa; Hiroaki Hoshi, Yokohama; Saburo Sugawara, Kawasaki; Toshiyuki Sudo, Kawasaki; Hideki Morishima, Kawasaki; Kazutaka Inoguchi, Kawasaki, all of Japan

[73] Assignee: Canon Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/650,650

[22] Filed: May 20, 1996

[30] Foreign Application Priority Data

| May 22, 1995 | [JP] | Japan | 7-148111 |
| Jul. 3, 1995 | [JP] | Japan | 7-189799 |
| Feb. 27, 1996 | [JP] | Japan | 8-065508 |

[51] Int. Cl.⁷ .......... H04N 13/04; H04N 15/00; H04N 9/47
[52] U.S. Cl. .............. 348/51; 348/56; 348/57
[58] Field of Search .......... 348/51, 53, 56, 348/52, 54, 55, 57, 58, 59; H04N 13/04, 15/00, 9/47

[56] References Cited

U.S. PATENT DOCUMENTS

| 4,562,463 | 12/1985 | Lipton | 348/51 |
| 4,772,943 | 9/1988 | Nakagawa et al. | 358/92 |
| 4,851,901 | 7/1989 | Iwasaki | 358/88 |
| 5,132,839 | 7/1992 | Travis | 359/462 |
| 5,875,055 | 2/1999 | Morishima et al. | 348/57 |

FOREIGN PATENT DOCUMENTS

| 0 354 851 A2 | 2/1990 | European Pat. Off. . | |
| 0 540 137 A1 | 5/1993 | European Pat. Off. | H04N 13/00 |
| 0 570 179 A2 | 11/1993 | European Pat. Off. . | |
| 0 588 332 A2 | 3/1994 | European Pat. Off. . | |
| WO 95/5052 | 2/1995 | WIPO . | |

*Primary Examiner*—Howard Britton
*Assistant Examiner*—Nhon T. Diep
*Attorney, Agent, or Firm*—Morgan and Finnegan, LLP

[57] ABSTRACT

A stereoscopic display apparatus and method performs and includes, respectively, steps of dividing each of a plurality of parallax images supplied from a parallax image source having parallax image information into stripe pixels, displaying, on a display, a single stripe image by arranging and synthesizing some of the stripe pixels in a predetermined order, displaying a slit pattern consisting of a light-transmission portion and a light-shielding portion arranged at a predetermined pitch on a spatial light modulation element arranged at a predetermined position on the front or rear side of the display, inputting light transmitted through the stripe pixels, corresponding to the right and left eyes of an observer, of the stripe image to the right and left eyes of the observer via the spatial light modulation element and synchronously displaying the stripe pattern and the slit pattern in units of pixels or scan lines on corresponding scan lines of the display and the spatial light modulation element.

44 Claims, 34 Drawing Sheets

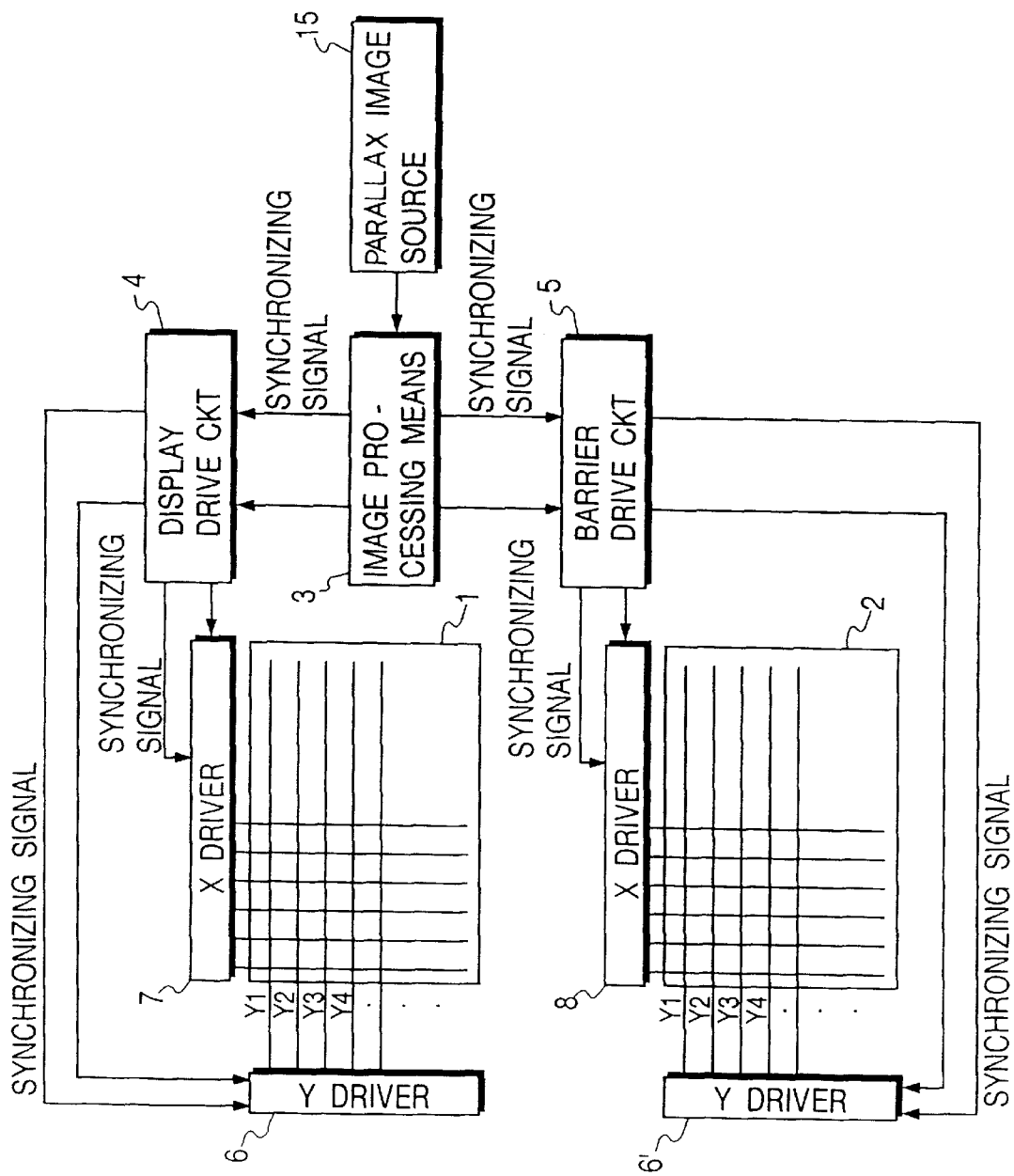

FIG. 4A

|    | X₁ | X₂ | X₃ | X₄ | X₅ | X₆ | X₇ | X₈ | · | · | · | X₁₂ |
|----|----|----|----|----|----|----|----|----|---|---|---|-----|
| Y1 | R  | L  | R  | L  | R  | L  | R  | L  | R | L | R | L   |
| Y2 | R  | L  | R  | L  | R  | L  | R  | L  | R | L | R | L   |
| Y3 | R  | L  | R  | L  | R  | L  | R  | L  | R | L | R | L   |
| Y4 | R  | L  | R  | L  | R  | L  | R  | L  | R | L | R | L   |
| Y5 | R  | L  | R  | L  | R  | L  | R  | R  | L | R | L | R   |
| Y6 | L  | R  | L  | R  | L  | R  | L  | R  | L | R | L | R   |
| Y7 | L  | R  | L  | R  | L  | R  | L  | R  | L | R | L | R   |
| Y8 | L  | R  | L  | R  | L  | R  | L  | R  | L | R | L | R   |

Rows Y1–Y4: 11A; Rows Y5–Y8: 11B; overall: 1

FIG. 4B

Columns X₁–X₁₂, Rows Y1–Y8. Rows Y1–Y4: 2A; Rows Y5–Y8: 2B; overall: 2.

|   | $Y_1$ | $Y_2$ | $Y_3$ | $Y_4$ | $Y_5$ | $Y_6$ | $Y_7$ | $Y_8$ | · · · | $Y_{12}$ |
|---|---|---|---|---|---|---|---|---|---|---|
| $X_1$ | R | L | R | L | R | L | R | R | L | R |
| $X_2$ | R | L | R | L | R | L | R | R | L | R |
| $X_3$ | R | L | R | L | R | L | R | R | L | R |
| $X_4$ | R | L | R | L | R | L | R | R | L | R |
| $X_5$ | R | L | R | L | R | L | R | R | L | R |
| $X_6$ | R | L | R | L | R | L | R | R | L | R |
| $X_7$ | R | L | R | L | R | L | R | R | L | R |
| $X_8$ | R | L | R | L | R | L | R | R | L | R |

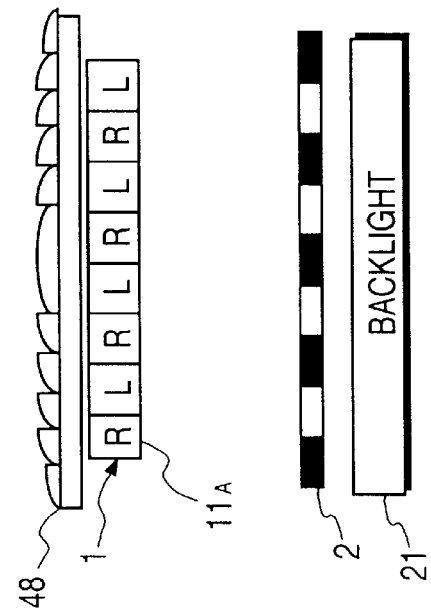
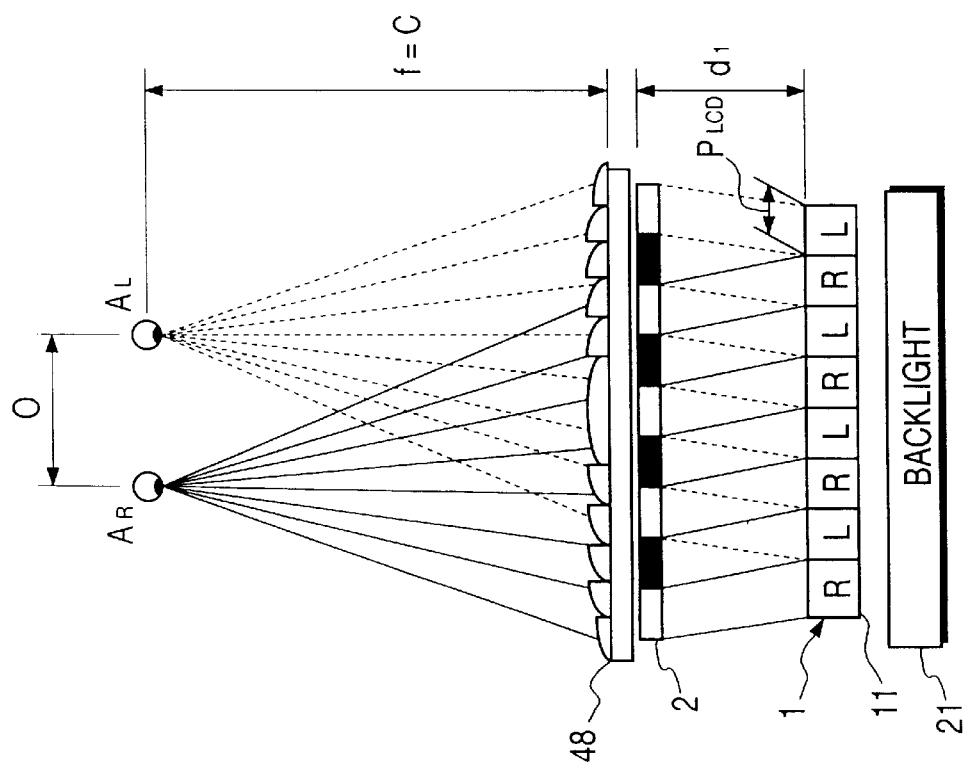

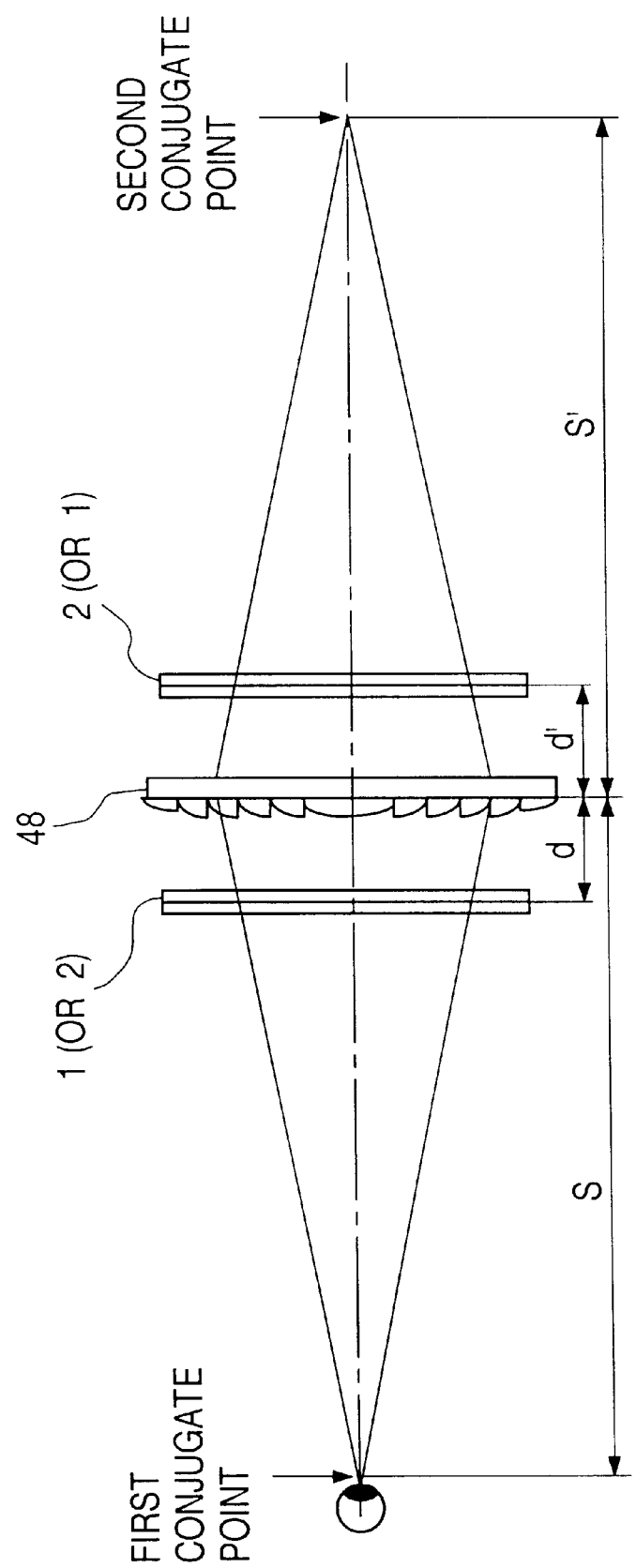

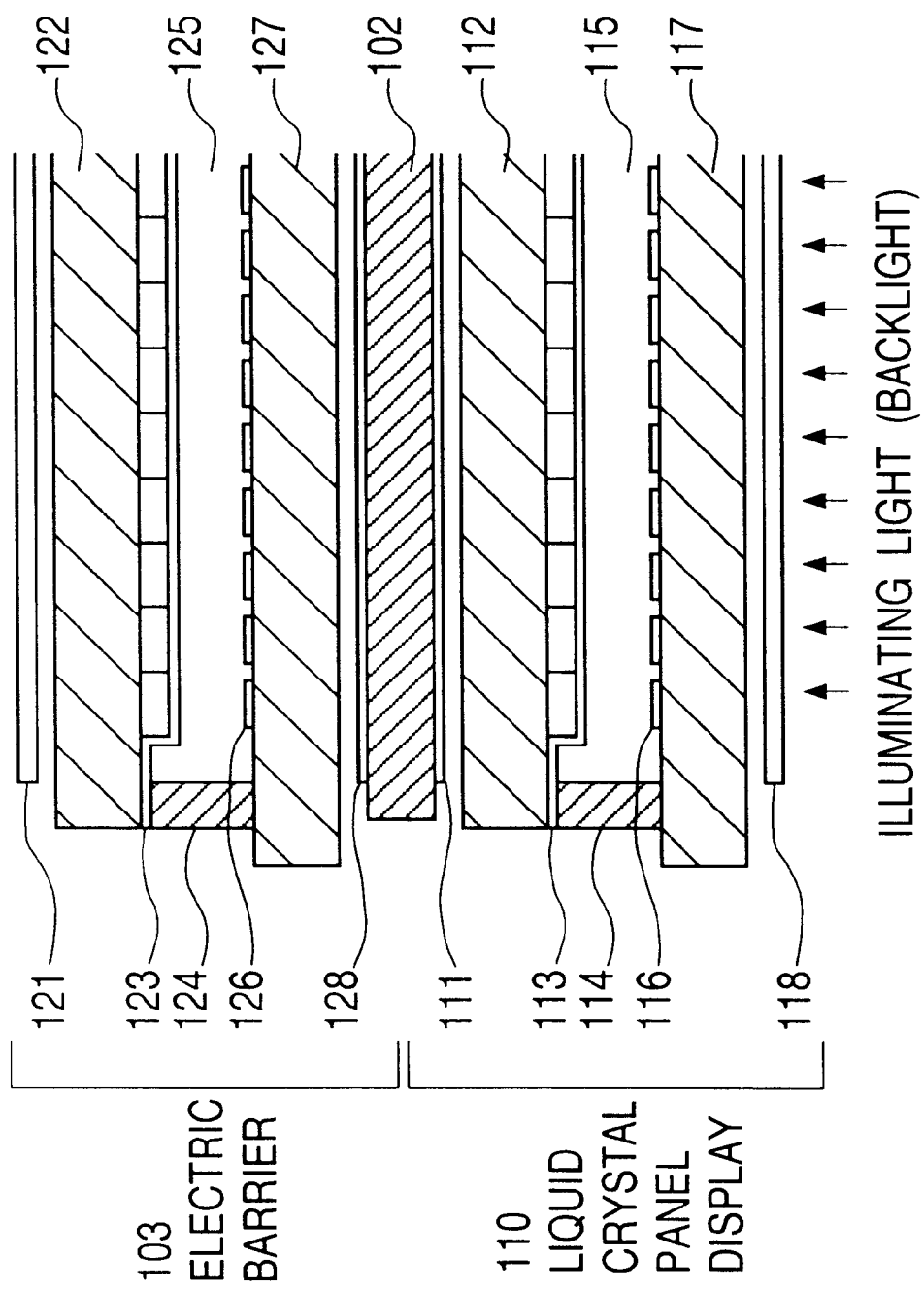

STEREOSCOPIC IMAGE DISPLAY METHOD, AND STEREOSCOPIC IMAGE DISPLAY APPARATUS USING THE METHOD

BACKGROUND OF THE INVENTION

1. Field of the Invention

The present invention relates to a stereoscopic image display method and a stereoscopic image display apparatus using the same and, more particularly, to a stereoscopic image display method using a spatial light modulation element as a parallax barrier or a slit pattern for controlling the directivity of light coming from backlight, and a stereoscopic image display apparatus using the method.

2. Related Background Art

The technique of a stereoscopic image display method using a parallax barrier method is disclosed by S. H. Kaplan ("Theory of Parallax Barriers", J.SMPTE, Vol. 59, No. 7, pp. 11–21, 1952). In this method, each of a plurality of parallax images is divided into stripe pixels, the stripe pixels constituting the right and left parallax images are alternately arranged on a single screen to form and display a stripe image, and the corresponding parallax images are observed by the right and left eyes of an observer via a slit (called a parallax barrier) which is arranged at a position separated by a predetermined distance from the stripe image and has predetermined light-transmission portions, thereby obtaining a stereoscopic view.

However, such conventional apparatus cannot be used as a two-dimensional image display apparatus such as a normal television apparatus.

In view of this problem, Japanese Patent Application Laid-Open Nos. 3-119889 and 5-122733 disclose a stereoscopic image display apparatus, which electronically forms a parallax barrier using, e.g., a transmission type liquid crystal element, and electronically controls to change the shape and positions of barrier stripes.

FIG. 34 is a schematic diagram of a stereoscopic image display apparatus disclosed in Japanese Patent Application Laid-Open No. 3-119889. In this apparatus, an electronic parallax barrier 103 comprising a transmission type liquid crystal display element is arranged on an image display surface (panoramagram or stereogram) 101 via a transparent glass/acrylic spacer 102 having a thickness d. A plurality of parallax images obtained by picking up an image from two or more directions are displayed on the image display surface 101 as a stripe image obtained by dividing each of the parallax images into vertical stripe pixels, and alternately arranging the stripe pixels of the plurality of parallax images in a predetermined order. On the other hand, vertically elongated barrier stripes are formed at arbitrary positions on the display surface of the electronic parallax barrier 103 by designating the X and Y addresses of the parallax barrier 103 using a control means such as a microcomputer 104, thus allowing a stereoscopic view according to the principle of the parallax barrier method.

In order to display a two-dimensional image (non-stereoscopic image) on this apparatus, the entire image display region of the electronic parallax barrier 103 is set in a transparent state without forming any barrier stripes thereon. In this manner, both stereoscopic and two-dimensional images can be displayed unlike in the stereoscopic image display method using the conventional parallax barrier method.

FIG. 35 is a schematic sectional view showing principal part of a stereoscopic image display apparatus constituted by a liquid crystal display panel and an electronic barrier disclosed in Japanese Patent Application Laid-Open No. 5-122733. In this stereoscopic image display apparatus, two liquid crystal layers (TN) 115 and 125 are respectively sandwiched between two pairs of polarizing plates 111 and 118, and 121 and 128, so that the liquid crystal layer 115 serves as an image display means, and the liquid crystal layer 125 serves as an electronic barrier forming means. Note that the apparatus shown in FIG. 35 also comprises a glass (spacer) 102, upper glass substrates 112 and 122, lower glass substrates 117 and 127, common electrodes 113 and 123, spacers 114 and 124, and pixel electrodes 116 and 126. In this apparatus as well, in order to display a two-dimensional image (non-stereoscopic image), the entire image display region of the electronic parallax barrier 125 is set in a transparent state without forming any barrier stripes thereon. In this manner, both stereoscopic and two-dimensional images can be displayed.

In the prior art disclosed in Japanese Patent Application Laid-Open No. 3-119889, the image display surface 101 displays a single stripe image obtained by dividing at least two parallax images into stripe pixels and alternately arranging the stripe pixels of these two parallax images. Therefore, the stereoscopic resolution of the image display apparatus is reduced to at least ½ that of original parallax images.

Furthermore, in the above-mentioned prior art, since the stripe image constituted by the vertical stripe pixels displayed on the image display surface 101 is not synchronized with the parallax barrier pattern formed on the electronic parallax barrier 103, crosstalk between the right and left images is generated, and flicker noise is often generated, resulting in an eyesore.

On the other hand, since the display positions of the barrier stripes remain the same unless the view point position of the observer moves, the luminance decreases in a localized stripe pattern.

Furthermore, when the image display means comprises, e.g., a liquid crystal, the image display surface has a stripe-shaped pixel structure, and such image must be observed via similar barrier stripes, thus easily causing Moiré fringes.

Furthermore, in the prior art disclosed in Japanese Patent Application Laid-Open No. 5-122733, since the apparatus uses a total of four polarizing plates, the luminance lowers due to absorption by these plates.

In addition, in these prior arts, when the observer horizontally moves by only the interval between his or her eyes (inter-ocular distance), a pseudoscopic view is prevented by replacing the display positions of the right and left eye images of the stripe image. However, the apparatus cannot cope with a change in view point position in the back-and-forth direction with respect to the apparatus.

Furthermore, in order to prevent the pseudoscopic view, a change in view point position of the observer is followed so that normal parallax images are always incident on the eyes, and the observed stereoscopic image always remains the same. Thus, a "roundabout or wraparound stereoscopic view effect" that can obtain smooth stereoscopic feeling cannot be obtained.

SUMMARY OF THE INVENTION

It is an object of the present invention to provide a stereoscopic image display method and a stereoscopic image display apparatus using the method, which can reduce crosstalk between the right and left parallax images and can eliminate flicker noise and Moire fringes by synchronizing an image displayed on a display and a slit pattern displayed on a spatial light modulation element in units of corresponding pixels or corresponding scan lines using the parallax barrier method.

It is another object of the present invention to provide a stereoscopic image display method and a stereoscopic image display apparatus using the method, which can obtain at least one of the following effects:

(1-1) since the switching operation between the first and second stripe images and the switching operation between the first and second parallax barrier patterns are performed in synchronism with corresponding pixels or scan lines to display such images and patterns at high speed, crosstalk can be minimized, and the respective parallax images can be recognized on the entire display surface of a display at high resolution without any omission;

(1-2) since the conventional apparatus uses four polarizing plates, the luminance lowers due to absorption by these polarizing plates, while since the number of polarizing plates can be reduced by one in the present invention, the display luminance can be improved;

(1-3) since the width of stripe pixels to be displayed on the display, the width of light-transmission and light-shielding portions to be formed on the spatial light modulation element, the interval between the display and the spatial light modulation element, or the relative positional relationship between the stripe images and the light-transmission portions is controlled in accordance with a signal from an observation condition detection means for automatically detecting the view point position of the observer or an observation condition inputting means input by the observer, a satisfactory stereoscopic view can always be attained even when the observer moves;

(1-4) since two out of three or more original parallax images constituting parallax image information of a parallax image source are selected and used, two parallax images are generated based on data constituting the parallax image information, or two parallax images are generated by interpolation or re-construction based on at least two original parallax images constituting the parallax image information, in accordance with a signal from the observation condition detection means for automatically detecting the view point position of the observer or the observation condition inputting means input by the observer, when the observer moves, parallax images with different view point positions are appropriately generated accordingly, and a stereoscopic image that can give a so-called smooth "roundabout effect" can be displayed;

(1-5) a high-resolution stereoscopic image free from any crosstalk can be locally displayed in a two-dimensional image displayed on the display;

(1-6) since an interlace driving operation is adopted, even when the display or the spatial light modulation element comprises, e.g., a liquid crystal element having a relatively low response speed, a high-definition stereoscopic image free from any flicker can be displayed;

(1-7) since the display and the spatial light modulation element are designed to display an image by scanning scan lines in the vertical direction, driving circuits for their display screens can have a simple arrangement;

(1-8) since the display surfaces of the display and the spatial light modulation element are divided into a plurality of areas having the same size along the scan lines, and the scan lines at the same relative positions are simultaneously selected from the plurality of areas so as to be synchronously driven, a display operation for one frame can be performed within a shorter period of time, and a stereoscopic image from which flicker noise is further eliminated can be displayed;

(1-9) when the stripe image and the slit pattern are synchronously displayed on the display and the spatial light modulation element in units of pixels or scan lines, since a plurality of pixels preceding to the pixel to be synchronously displayed on the spatial light modulation element or a plurality of scan lines preceding to the scan line to be synchronously displayed are displayed precedently as light-shielding portions, crosstalk between the right and left parallax images can be further eliminated, and even when liquid crystal panels with different characteristics are used, crosstalk can be eliminated, thus assuring large driving margins of the respective panels; and (1-10) since a linear Fresnel lens is used, the display and the spatial light modulation elements can be constituted by liquid crystal elements having the same specifications, and a low-cost stereoscopic image display apparatus can be attained.

In order to achieve the above objects, according to one aspect of the present invention, there is provided a stereoscopic image display method comprising the steps of:

dividing each of a plurality of parallax images supplied from a parallax image source having parallax image information into stripe pixels;

displaying, on a display, a single stripe image by arranging and synthesizing some of the stripe pixels in a predetermined order;

displaying a slit pattern consisting of a light-transmission portion and a light-shielding portion arranged at a predetermined pitch on a spatial light modulation element arranged at a predetermined position on the front or rear side of the display;

inputting light transmitted through the stripe pixels, corresponding to the right and left eyes of an observer, of the stripe image to the right and left eyes of the observer via the spatial light modulation element; and synchronously displaying the stripe pattern and the slit pattern in units of pixels or scan lines on corresponding scan lines of the display and the spatial light modulation element.

The method further comprises the step of interlace-scanning the corresponding scan lines of the display and the spatial light modulation element.

The method further comprises the step of scanning the corresponding scan lines of the display and the spatial light modulation element in a vertical direction.

The plurality of parallax images are right and left parallax images, the stripe image is one of a first stripe image obtained by alternately arranging and synthesizing odd stripe pixels of the stripe pixels obtained by dividing the right parallax image and even stripe pixels of the stripe pixels obtained by dividing the left parallax image, and a second stripe image obtained by alternately arranging and synthesizing even stripe pixels of the stripe pixels obtained by dividing the right parallax image and odd stripe pixels of the stripe pixels obtained by dividing the left parallax image, one of the two stripe images is displayed on the display, the other stripe image is subsequently displayed, and the slit pattern in which the positions of the light-transmission portion and the light-shielding portion replace each other is displayed on the spatial light modulation element.

The stripe image is displayed on a portion of a display surface of the display, a non-stripe image is displayed on the remaining portion of the display surface, the slit pattern is displayed on a portion, corresponding to the stripe image displayed on the display, of a display surface of the spatial light modulation element, and the remaining portion of the display surface of the spatial light modulation element is set in a light-transmission state.

The stripe image is displayed on a portion of a display surface of the display, a non-stripe image is displayed on the remaining portion of the display surface, and the slit pattern is displayed on the entire display surface of the spatial light modulation element.

The display width of each of the stripe pixels constituting the stripe image to be displayed on the display and/or the display width of each of the light-transmission portion and the light-shielding portion of the slit pattern to be displayed on the spatial light modulation element are/is set to be equal to the total width of a plurality of pixels constituting display surfaces of the display and the spatial light modulation element.

The display width of each of the stripe pixels constituting the stripe image to be displayed on the display is set to be equal to the width of one pixel constituting a display surface of the display, and the display width of each of the light-transmission portion and the light-shielding portion of the slit pattern to be displayed on the spatial light modulation element is set to be equal to the total width of a plurality of pixels constituting a display surface of the spatial light modulation element.

The display width of each of the stripe pixels constituting the stripe image to be displayed on the display is set to be equal to the total width of a plurality of pixels constituting a display surface of the display, and the display width of each of the light-transmission portion and the light-shielding portion of the slit pattern to be displayed on the spatial light modulation element is set to be equal to the width of one pixel constituting a display surface of the spatial light modulation element.

Each of display surfaces of the display and the spatial light modulation element has pixels in a matrix structure.

The method further comprises the step of outputting predetermined polarized light from the display.

The spatial light modulation element comprises a liquid crystal element.

The method further comprises the step of controlling at least one of constituting elements of the stripe image and constituting elements of the slit pattern in accordance with a signal from one of observation condition detecting means for automatically detecting a view point position of the observer and observation condition inputting means used by the operator to input an observation condition.

The method further comprises the step of controlling a distance between the display and the spatial light modulation element on the basis of a signal from one of observation condition detecting means for automatically detecting a view point position of the observer and observation condition inputting means used by the operator to input an observation condition.

The method further comprises the step of selecting and using the parallax images from at least three original parallax images constituting the parallax image information on the basis of a signal from one of observation condition detecting means for automatically detecting a view point position of the observer and observation condition inputting means used by the operator to input an observation condition.

The method further comprises the step of generating the parallax images on the basis of data constituting the parallax image information or generating the parallax images on the basis of at least two original parallax images constituting the parallax image information by interpolation or re-construction in correspondence with a view point position of the observer, in accordance with a signal from one of observation condition detecting means for automatically detecting the view point position of the observer and observation condition inputting means used by the operator to input an observation condition.

The method further comprises the step of precedently displaying, as the light-shielding portion, a plurality of pixels preceding to a pixel to be synchronously displayed or a plurality of scan lines preceding to a scan line to be synchronously displayed on the spatial light modulation element when the stripe image and the slit pattern are synchronously displayed on the display and the spatial light modulation element in units of pixels or scan lines.

The method further comprises the step of dividing each of display surfaces of the display and the spatial light modulation element into a plurality of regions having the same size along a scan line, simultaneously selecting and scanning scan lines at the same relative positions of the plurality of regions, and synchronously displaying the stripe image and the slit pattern on the display and the spatial light modulation element in units of pixels on the plurality of scan lines or in units of corresponding scan lines of the plurality of scan lines.

According to one aspect of the present invention, there is provided a stereoscopic image display apparatus comprising:

a display for displaying a single stripe image obtained by arranging and synthesizing some of a plurality of stripe pixels which are obtained by dividing each of a plurality of parallax images supplied from a parallax image source having parallax image information;

a spatial light modulation element arranged at a predetermined position on a front or rear side of the display, the spatial light modulation element displaying a slit pattern consisting of a light-transmission portion and a light-shielding portion arranged at a predetermined pitch, and light transmitted through the stripe pixels, corresponding to right and left eyes of an observer, of the stripe image being input to the right and left eyes of the observer via the spatial light modulation element so as to attain a stereoscopic view; and means for synchronously displaying the stripe image and the slit pattern on corresponding scan lines of the display and the spatial light modulation element in units of pixels or scan lines.

The corresponding scan lines of the display and the spatial light modulation element are interlace-scanned.

The corresponding scan lines of the display and the spatial light modulation element are scanned in a vertical direction.

The plurality of parallax images are right and left parallax images, the stripe image is one of a first stripe image obtained by alternately arranging and synthesizing odd stripe pixels of the stripe pixels obtained by dividing the right parallax image and even stripe pixels of the stripe pixels obtained by dividing the left parallax image, and a second stripe image obtained by alternately arranging and synthesizing even stripe pixels of the stripe pixels obtained by dividing the right parallax image and odd stripe pixels of the stripe pixels obtained by dividing the left parallax image, the slit pattern to be displayed upon display of the first stripe image and the slit pattern to be displayed upon display of the second stripe image have opposite positional relationships of the light-transmission portion and the light-shielding portion, and the two stripe images are successively displayed.

The stripe image is displayed on a portion of a display surface of the display, a non-stripe image is displayed on the remaining portion of the display surface, the slit pattern is displayed on a portion, corresponding to the stripe image displayed on the display, of a display surface of the spatial light modulation element, and the remaining portion of the display surface of the spatial light modulation element is set in a light-transmission state.

The stripe image is displayed on a portion of a display surface of the display, a non-stripe image is displayed on the remaining portion of the display surface, and the slit pattern is displayed on the entire display surface of the spatial light modulation element.

The display width of each of the stripe pixels constituting the stripe image to be displayed on the display and/or the display width of each of the light-transmission portion and the light-shielding portion of the slit pattern to be displayed on the spatial light modulation element are/is set to be equal to the total width of a plurality of pixels constituting display surfaces of the display and the spatial light modulation element.

The display width of each of the stripe pixels constituting the stripe image to be displayed on the display is set to be equal to the width of one pixel constituting a display surface of the display, and the display width of each of the light-transmission portion and the light-shielding portion of the slit pattern to be displayed on the spatial light modulation element is set to be equal to the total width of a plurality of pixels constituting a display surface of the spatial light modulation element.

The display width of each of the stripe pixels constituting the stripe image to be displayed on the display is set to be equal to the total width of a plurality of pixels constituting a display surface of the display, and the display width of each of the light-transmission portion and the light-shielding portion of the slit pattern to be displayed on the spatial light modulation element is set to be equal to the width of one pixel constituting a display surface of the spatial light modulation element.

Each of display surfaces of the display and the spatial light modulation element has pixels in a matrix structure.

The spatial light modulation element comprises a liquid crystal element.

The spatial light modulation element comprises a ferroelectric liquid crystal element.

The display comprises a liquid crystal element.

The display comprises a ferroelectric liquid crystal element.

The display comprises a self-emission type display and a single polarizing plate.

Predetermined polarized light is output from the stripe image to be displayed on the display, and the spatial light modulation element comprises a liquid crystal element and a single polarizing plate.

At least one of constituting elements of the stripe image and constituting elements of the slit pattern is controlled in accordance with a signal from one of observation condition detecting means for automatically detecting a view point position of the observer and observation condition inputting means used by the operator to input an observation condition.

The distance between the display and the spatial light modulation element is controlled by distance controlling means on the basis of a signal from one of observation condition detecting means for automatically detecting a view point position of the observer and observation condition inputting means used by the operator to input an observation condition.

The parallax images to be used are selected from at least three original parallax images constituting the parallax image information on the basis of a signal from one of observation condition detecting means for automatically detecting a view point position of the observer and observation condition inputting means used by the operator to input an observation condition.

The parallax images are generated on the basis of data constituting the parallax image information or the parallax images are generated on the basis of at least two original parallax images constituting the parallax image information by interpolation or re-construction in correspondence with a view point position of the observer, in accordance with a signal from one of observation condition detecting means for automatically detecting the view point position of the observer and observation condition inputting means used by the operator to input an observation condition.

A plurality of pixels preceding to a pixel to be synchronously displayed or a plurality of scan lines preceding to a scan line to be synchronously displayed on the spatial light modulation element are precedently displayed as the light-shielding portion when the stripe image and the slit pattern are synchronously displayed on the display and the spatial light modulation element in units of pixels or scan lines.

Each of display surfaces of the display and the spatial light modulation element is divided into a plurality of regions having the same size along a scan line, scan lines at the same relative positions of the plurality of regions are simultaneously selected and scanned, and the stripe image and the slit pattern are synchronously displayed on the display and the spatial light modulation element in units of pixels on the plurality of scan lines or in units of corresponding scan lines of the plurality of scan lines.

According to another aspect of the present invention, there is provided a stereoscopic image display apparatus comprising:

a display for sequentially forming a single stripe image obtained by arranging and synthesizing some of a plurality of stripe pixels which are obtained by dividing each of right- and left-eye parallax images supplied from a parallax image source having parallax image information, while performing a scanning operation; and a spatial light modulation element located on the front or rear side of the display, the spatial light modulation element sequentially forming a slit pattern consisting of a light-transmission portion and a light-shielding portion arranged at a predetermined pitch in synchronism with the scanning operation, and light transmitted through the stripe pixels, corresponding to the right and left eyes of an observer, of the stripe image displayed on the display being input to the right and left eyes of the observer via the slit pattern.

The spatial light modulation element is arranged on the front side of the display, and the apparatus further comprises a linear Fresnel lens having a power only in a horizontal direction and arranged on the front side of the spatial light modulation element or arranged between the display and the spatial light modulation element.

A spatial light modulation element illuminated with light emitted by light source means is arranged on the rear side of the display, and the apparatus further comprises a linear Fresnel lens having a power only in a horizontal direction and arranged on the front side of the display or arranged between the display and the spatial light modulation element.

According to another aspect of the present invention, there is provided a stereoscopic image display method comprising the steps of:

sequentially forming, on a display, a single stripe image obtained by arranging and synthesizing some of a plurality of stripe pixels which are obtained by dividing each of right- and left-eye parallax images supplied from a parallax image source having parallax image information, while performing a scanning operation; and inputting light transmitted through the stripe pixels, corresponding to the right and left eyes of an observer, of the stripe image displayed on the display to the right and left eyes of the observer via a slit pattern, which is obtained by sequentially forming a light-transmission portion and a light-shielding portion at a predetermined pitch on a spatial light modulation element, in synchronism with the scanning operation.

Examples of the present invention will become apparent from the following description of the embodiments.

BRIEF DESCRIPTION OF THE DRAWINGS

FIG. 3 is an explanatory view of the driving method of the first embodiment;

FIGS. 4A and 4B are explanatory views of the display states of the first embodiment;

FIGS. 20A to 20D are explanatory views of the stereoscopic image display method of a stereoscopic image display apparatus according to the ninth embodiment of the present invention;

FIGS. 22A and 22B are explanatory views of the stereoscopic image display method of the 10th embodiment;

FIGS. 27A and 27B are explanatory views of the display states of the 12th embodiment;

FIGS. 28A and 28B are explanatory views of the display states of a stereoscopic image display apparatus according to the 13th embodiment of the present invention;

FIGS. 31A and 31B are schematic views showing principal part of a stereoscopic image display apparatus according to the 15th embodiment of the present invention;

FIG. 33 is a view showing the optical layout of the arrangement shown in FIGS. 32A and 32B;

FIG. 35 is a schematic sectional view showing another conventional stereoscopic image display apparatus.

DETAILED DESCRIPTION OF THE PREFERRED EMBODIMENTS

Figure 1:
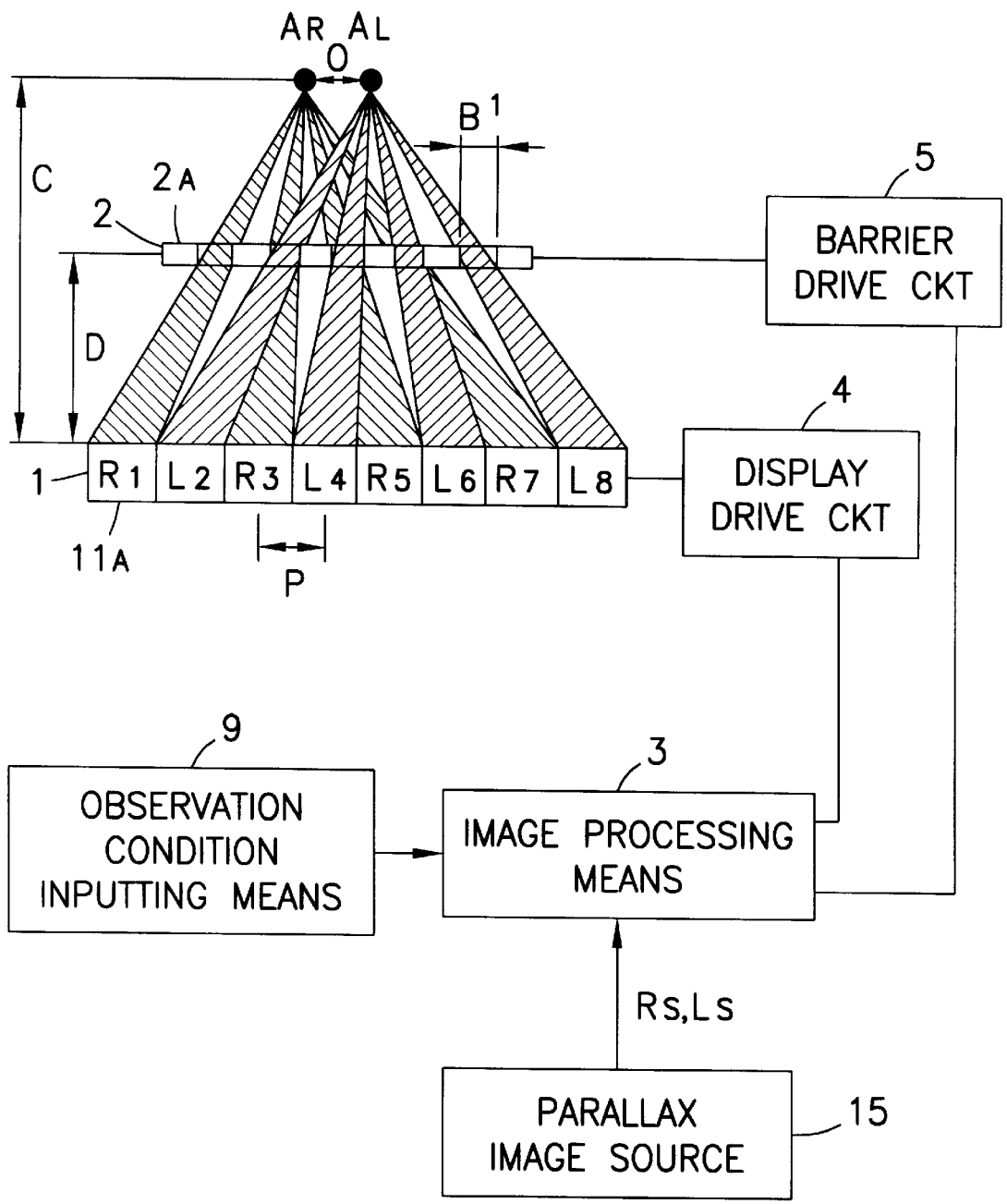
FIG. 1 is a schematic diagram showing principal part of a stereoscopic image display apparatus according to the first embodiment of the present invention.
Figure 2A:
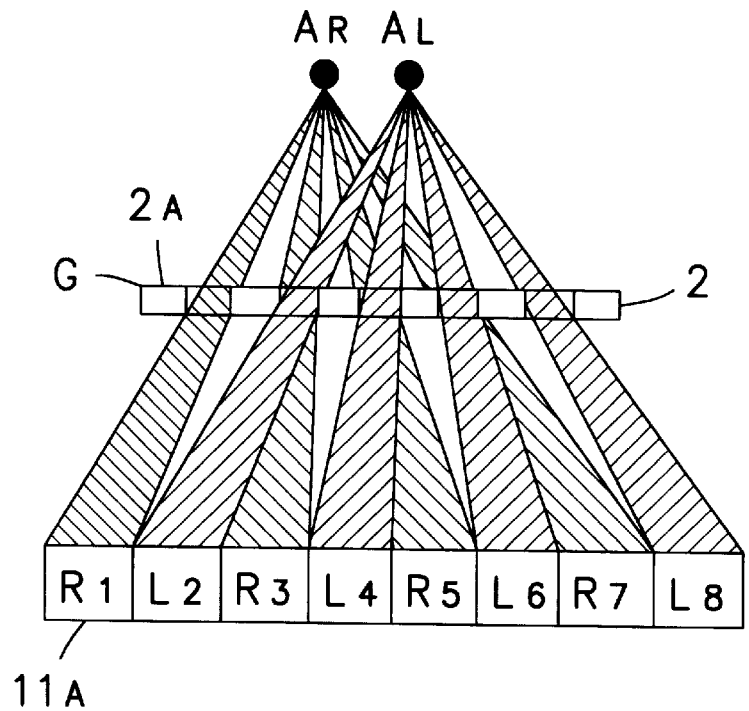
FIGS. 2A and 2B are explanatory views of the stereoscopic image display method of the first embodiment.
Figure 2B:
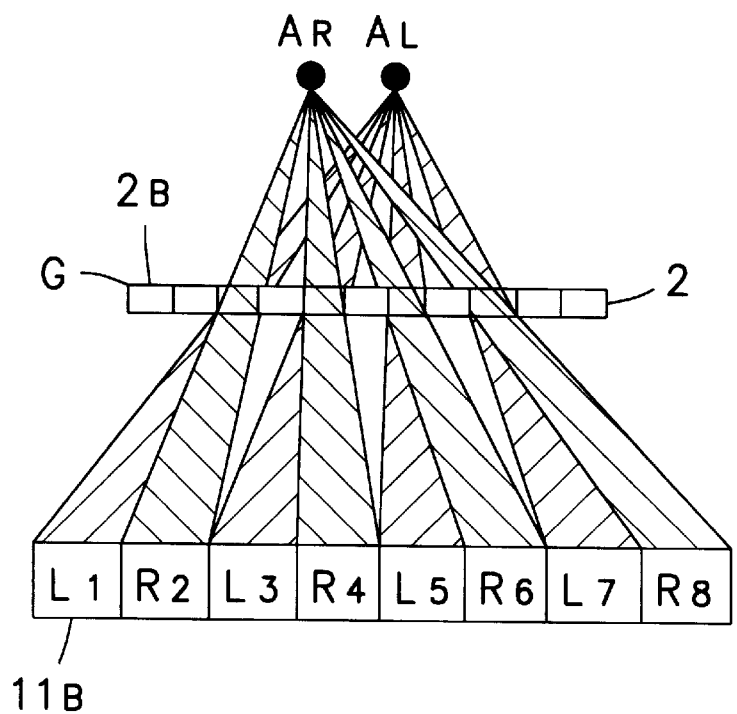

FIG. 1 is a schematic diagram showing principal part of a stereoscopic image display apparatus according to the first embodiment of the present invention. FIGS. 2A and 2B are explanatory views of the stereoscopic image display method of the first embodiment, FIG. 3 is an explanatory view of the driving method of the first embodiment, and FIGS. 4A and 4B are explanatory views of the display states of the first embodiment. In these drawings, an image display portion is expressed by a horizontal sectional view. Referring to FIG. 1, a display 1 comprises, e.g., a liquid crystal element (LCD) having a backlight light source, and its display surface is constituted by a large number of pixels having a matrix structure. The display 1 displays an image by non-interlace scanning scan lines. A stripe image (to be described later) 11 ($11_A$) is displayed on the image display surface of the display 1.

A spatial light modulation element 2 comprises, e.g., a transmission type liquid crystal element, and its display surface is constituted by a large number of pixels having a matrix structure. When a stereoscopic image is displayed on the display 1, light-transmission portions (slit portions) and light-shielding portions are horizontally arranged on the display surface of the element 2 at a predetermined pitch to form (or display) a parallax barrier pattern (slit pattern) $2_A$ or $2_B$. $A_R$ and $A_L$ respectively indicate the right and left eyes of an observer.

In this specification, the observer side of the display 1 or the spatial light modulation element 2 is called a "front side", and the opposite side is called a "rear side". Therefore, in this embodiment, the spatial light modulation element 2 is arranged on the front side of the display 1.

A parallax image source 15 comprises, e.g., a multi-channel VTR or a multi-channel image pickup device having multi-channel cameras, or three-dimensional data of an object. A plurality of images output from such device and three-dimensional data will be referred to as parallax image information hereinafter. Note that the multi-channel VTR, the multi-channel image pickup device, or the like has a plurality of images. Since parallax images (images with a parallax) are selected from these images, these plurality of images will be referred to as original parallax images hereinafter.

An observation condition inputting means 9 inputs information such as observation position information of the observer, a display region of a stereoscopic image to be displayed on the display 1, and the like. An image processing means 3 extracts right- and left-eye parallax images $R_S$ and $L_S$ from the parallax image information of the parallax image source 15, divides these parallax images $R_S$ and $L_S$ in the horizontal direction to generate vertically elongated stripe pixels, and alternately arranges these stripe pixels to synthesize them to obtain a single stripe image. Stripe pixels based on the parallax image $R_S$ are represented by $R_i$ (i=1, 2, 3, 4, . . . ), and stripe pixels based on the parallax image $L_S$ are represented by $L_i$ (i=1, 2, 3, 4, . . . ).

A display driving circuit 4 displays the stripe image, which is synthesized by and output from the image processing means 3, on the display surface of the display 1. A barrier driving circuit 5 drives the spatial light modulation element 2 in accordance with a signal from the image processing means 3 to form a parallax barrier pattern thereon.

The relationship between the stripe image 11 and the parallax barrier pattern of this embodiment will be explained below. In FIG. 1, let O be the interval (base length) between the two eyes of the observer, C be the observation distance from the displayed image (stripe image) 11 ($11_A$) on the image display surface to the eyes of the observer, D be the distance between the display 1 and the spatial light modulation element (parallax barrier) 2, B' be the width of each slit portion of the parallax barrier pattern formed on the spatial light modulation element 2, and P be the pixel interval (width) of stripe pixels constituting the stripe image displayed on the display 1. Then, in order to obtain a stereoscopic view, these parameters must satisfy the following relations:

$$D=P \cdot C/(O+P) \quad (1)$$

$$B'=P \cdot (C-D)/C \quad (2)$$

Note that the observation width has a finite divergence at the observation position in practice, and these quantities are set after they are slightly modified. These relationships have been described in detail in the above-mentioned S. H. Kaplan's reference.

In this embodiment, since the display 1 uses a liquid crystal display having a pixel size of 0.110 mm (horizontal)× 0.330 mm (vertical), and one pixel size is set to be the width of one stripe pixel of each parallax image, the pixel interval is P=0.110 mm. On the other hand, since the base length and the observation distance are respectively set to be O=65 mm and C=1,000 mm as the observation conditions, the constituting data of the spatial light modulation element 2 are D=1.69 mm and B'=0.1098 mm. Note that slight fine adjustment is made in consideration of the divergence of the observation width.

The stereoscopic image display method of the present invention will be explained below with reference to FIG. 1, FIGS. 2A and 2B, FIG. 3, and FIGS. 4A and 4B.

That is, at a certain time (at the time of the display state shown in FIG. 2A), the image processing means 3 extracts two parallax images $R_S$ and $L_S$ from the parallax image source 15, divides these images into elongated stripe pixels $R_i$ and $L_i$, and alternately arranges these stripe pixels from, e.g., the left end of the display surface in FIG. 1 in the order of $R_1$, $L_2$, $R_3$, $L_4$, $R_5$, $L_6$, . . . to synthesize them to obtain a first stripe image $11_A$. The data of the first stripe image $11_A$ is input to the display driving circuit 4, which displays the first stripe image $11_A$ on the image display surface of the display 1.

At the same time, the image processing means 3 inputs image data of the parallax barrier pattern to the barrier driving circuit 3 in synchronism with the output data of the stripe image, and the barrier driving circuit 5 displays a first parallax barrier pattern $2_A$ on which light-transmission portions and light-shielding portions each having the width B' are alternately formed in the order of close, open, close, open, close, open, . . . from a point G on the spatial light modulation element 2.

The formation region of the parallax barrier corresponds to the image region (the entire surface in FIG. 1), where the stripe image 11 is displayed, of the display 1.

At this time, only the right-eye parallax image constituted by the stripe pixels $R_1$, $R_3$, $R_5$, . . . is incident on the right eye $A_R$ via the first parallax barrier pattern $2_A$, and only the left-eye parallax image constituted by the stripe pixels $L_2$, $L_4$, $L_6$, . . . is incident on the left eye $A_L$ via the first parallax barrier pattern $2_A$. As a result, the observer can stereoscopically observe the first stripe image $11_A$ by the same principle as that of the conventional parallax barrier method.

At a time at which one frame has been scanned and the same scan line as described above is being scanned (at the time of the display state shown in FIG. 2B), the display 11 displays, as the stripe image 11, a second stripe image $11_B$ constituted by arranging stripe pixels $L_1$, $R_2$, $L_3$, $R_4$, $L_5$, $R_6$, . . . in the opposite order to that of the image $11_A$, and the spatial light modulation element 2 displays a second parallax barrier pattern $2_B$ on which the light-transmission portions and light-shielding portions are alternately formed in the order of open, close, open, close, open, close, . . . opposite to that of the first parallax barrier pattern from the point G.

At this time, only the right-eye parallax image constituted by the stripe pixels $R_2$, $R_4$, $R_6$, . . . is incident on the right eye $A_R$ via the second parallax barrier pattern $2_B$, and only the left-eye parallax image constituted by the stripe pixels $L_1, L_3, L_5, \ldots$ is incident on the left eye $A_L$ via the second parallax barrier pattern $2_B$. As a result, the observer can stereoscopically observe the second stripe image $11_B$ by the same principle as that of the conventional parallax barrier method.

The display 1 and the spatial light modulation element 2 are synchronously scanned in units of pixels to alternately attain these two display states so as to display the stripe images and the parallax barrier patterns. As a result, the right eye can observe the entire parallax image $R_S$ constituted by the stripe pixels $R_1, R_2, R_3, R_4, \ldots$, and the left eye can observe the entire parallax image $L_S$ constituted by the stripe pixels $L_1, L_2, L_3, L_4, \ldots$ in a flicker-less state.

The operation of the first embodiment will be described in more detail below with reference to FIG. 3.

As described above, for example, when the first stripe image $11_A$ and the first parallax barrier pattern $2_A$ are displayed, scan lines (Y1, Y2, Y3, Y4, . . . ) of the display 1 and the spatial light modulation element 2 are respectively driven by Y drivers 6 and 6' via synchronizing signals from the image processing means 3, and at the same time, X drivers 7 and 8 synchronously input a display driving signal and a barrier driving signal, as shown in FIG. 3. More specifically, the first scan line Y1 of the display 1 and the first scan line Y1 of the spatial light modulation element 2 are simultaneously driven, and pixels $X_i$ on the first scan line Y1 of the display 1 and pixels $X_i$ on the first scan line Y1 (the corresponding scan line to be scanned) of the spatial light modulation element 2 are synchronously driven to display images on these pixels.

Assume that the second stripe image $11_B$ is displayed on the entire display surface of the display 1, and the second parallax barrier pattern $2_B$ is displayed on the spatial light modulation element 2. As shown in FIG. 4A, the corresponding portion of the first stripe image $11_A$ obtained by synthesizing the stripe pixels R, L, R, L, R, L, . . . (the stripe pixels will be simply abbreviated as above although they are, strictly speaking, $R_1, L_2, R_3, L_4, R_5, L_6, \ldots$) of the right and left parallax images is sequentially displayed on the pixels on the first scan line Y1 of the display 1 from the above-mentioned state. At the same time, as shown in FIG. 4B, the first parallax barrier pattern $2_A$ constituted by alternately arranging the light-shielding portions and light-transmission portions in the order of close, open, close, open, close, open, . . . is sequentially displayed on the pixels on the first scan line Y1 of the spatial light modulation element 2 in units of pixels in synchronism with the display 1.

Next, the second scan line Y2 is selected, and the corresponding portion of the first stripe image $11_A$ and the corresponding portion of the first parallax barrier pattern 2A are synchronously displayed on the second scan lines Y2 of the display 1 and the spatial light modulation element 2 in the same manner as described above.

FIGS. 4A and 4B illustrate the state at the instance when the fifth scan line Y5 is selected before completion of all the scan operations, the pixel data of the stripe pixel $R_7$ is displayed on the seventh pixel $X_7$ of the display 1 (FIG. 4A), and the light-shielding portion is synchronously formed on the seventh pixel $X_7$ of the spatial light modulation element 2 (FIG. 4B). Therefore, the first stripe image $11_A$ is displayed on the upper portion of the display 1, and the second stripe image $11_B$ is displayed on the lower portion of the display 1. Also, the first parallax barrier pattern $2_A$ is displayed on the upper portion of the spatial light modulation element 2, and the second parallax barrier pattern $2_B$ is displayed on the lower portion thereof.

When the above-mentioned operation is sequentially repeated, and the scan operation of the last scan line is completed, the first stripe image $11_A$ is displayed on the entire display screen. When the observer observes this first stripe image $11_A$ via the spatial light modulation element 2 on which the first parallax barrier pattern $2_A$ is formed, he or she can observe the first stripe image $11_A$ as a stereoscopic image.

Subsequently, the scan operation is started in turn from the first scan line, and in this case, the display 1 displays, as the stripe image 11, the corresponding portion of the second stripe image $11_B$ obtained by arranging the stripe images L, R, L, R, L, R, . . . (the stripe pixels will be simply abbreviated as above although they are, strictly speaking, $L_1, R_2, L_3, R_4, L_5, R_6, \ldots$) in the opposite order. At the same time, the spatial light modulation element 2 alternately forms and displays the light-transmission portions and the light-shielding portions in the opposite order of open, close, open, close, open, close, . . . as the second parallax barrier pattern 2. When the image displayed on the display 1 is observed via the spatial light modulation element 2, the second stripe image $11_B$ can be observed as a stereoscopic image.

Therefore, in this embodiment, since the observer alternately stereoscopically observes the stripe images $11_A$ and $11_B$, the respective parallax images $R_S$ and $L_S$ are displayed on the eyes $A_R$ and $A_L$ of the observer without any omission, and the observer can observe a high-quality stereoscopic image without the resolution of the parallax images being reduced. Since the resolution lowers to ½ that of the display to be used in the stereoscopic image display apparatus using the conventional parallax barrier method, an image displayed in this embodiment can have a resolution twice that of the image obtained by the conventional apparatus.

In addition, in this embodiment, since the display 1 and the spatial light modulation element 2 are synchronously driven in units of pixels on their scan lines, the stripe pixels and the slit portions of the corresponding parallax barrier pattern synchronously change at any timing during the display operation of the stripe images so as to maintain a relationship therebetween that allows the observer to normally observe a stereoscopic image. Therefore, in this embodiment, crosstalk between the right and left parallax images can be remarkably reduced.

Furthermore, in this embodiment, since the light-transmission portions and the light-shielding portions of the parallax barrier pattern to be formed on the spatial light modulation element 2 alternately replace each other, a decrease in contrast in a Moiré pattern, i.e., the repetitive structure of the light-transmission portions and the light-shielding portions of the parallax barrier pattern, is not conspicuous.

Moreover, it is ideal to use the display 1 and the spatial light modulation element 2 having a high-speed frame rate in this embodiment. However, in this embodiment, since the stripe pattern and the parallax barrier pattern are synchronously displayed, the right and left parallax images are always incident on the right and left eyes of the observer without crosstalk therebetween, and the observer does not experience any flicker noise. For this reason, the display and the spatial light modulation element having a frame rate of 60 Hz to 120 Hz can be used.

The spatial light modulation element 2 must have a high contrast and must realize a high-speed driving operation since it separates the right- and left-eye parallax images by means of the parallax barrier pattern formed thereon. In view of these situations, a ferroelectric liquid crystal element (FLC) is preferably used as the display 1 and the spatial light modulation element 2 of this embodiment.

When the display 1 and the spatial light modulation element 2 comprise liquid crystal elements, they preferably use the same type of liquid crystal elements since it is easy to assure synchronization due to the same display speed (response speed) and identical driving circuits can be used.

In this embodiment, the display 1 and the spatial light modulation element 2 are driven in accordance with synchronizing signals supplied from the image processing means 3. However, various other driving methods may be used. For example, the display driving circuit 4 may generate a synchronizing signal to determine the driving timing of the barrier driving circuit 5, or the Y drivers may attain synchronization.

This embodiment has exemplified a case wherein one pixel size of the display 1 is equal to the interval P of the stripe images, i.e., each of the stripe pixels $R_1$, $L_2$, ... corresponds to one pixel of the display 1. However, the pixel width of each of the stripe pixels $R_i$ and $L_i$ may correspond to the width of a plurality of pixels of the display 1. For example, the interval P may equal the total width of R, G, and B pixels upon execution of a color display operation.

Also, this embodiment has exemplified a case wherein two parallax images are displayed. In addition, the method of this embodiment may be applied to a "parallax panoramagram" in which a stripe image is generated by synthesizing a plurality of parallax images and is observed via an appropriate parallax barrier.

The spatial light modulation element 2 of this embodiment need not have a matrix-shaped pixel structure but may have a vertical-line-shaped pixel structure since it forms vertically elongated, rectangular slit portions.

Note that the width P of each stripe pixel, the number of stripe pixels, and the like are constituting elements of the stripe image, and the width B' of each of the slit and light-shielding portions of the parallax barrier pattern and the like are constituting elements of a slit pattern (parallax barrier pattern).

In this embodiment, as described above, at least one of the constituting elements of the stripe image and the slit pattern is controlled in accordance with a signal from the observation condition inputting means 9.

Figure 5:
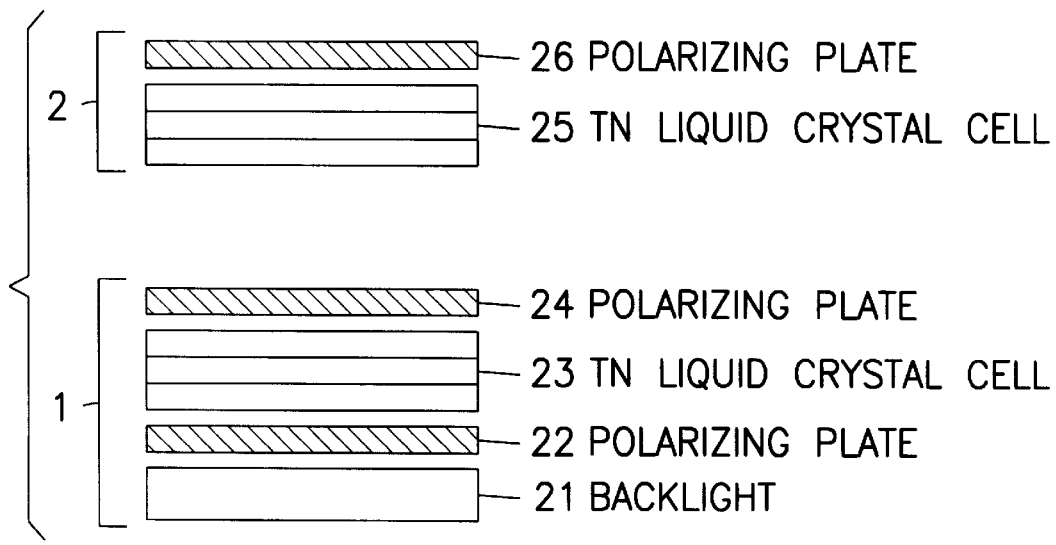
FIG. 5 is a schematic sectional view showing principal part of a stereoscopic image display apparatus according to the second embodiment of the present invention.

FIG. 5 is a schematic sectional view showing principal part of a stereoscopic image display apparatus according to the second embodiment of the present invention. In this embodiment, the display 1 and the spatial light modulation element 2 in the arrangement of the first embodiment specifically comprise TN liquid crystal elements (TN liquid crystal cells). Other arrangements are the same as those in the first embodiment.

The display 1 for displaying the stripe image 11 is arranged so that a TN liquid crystal cell 23 (a glass substrate, electrodes, and the like are not shown) sandwiched between two polarizing plates 22 and 24 is illuminated with light emitted by a backlight 21 having a reflection plate and a light guide plate. Therefore, linearly polarized light emanates from an image displayed on the display 1. The spatial light modulation element 2 is constituted by arranging a TN liquid crystal cell 25 on the side of the display 1, and a single polarizing plate 26 on the side of the observer, and displays a stripe-shaped parallax barrier pattern.

In this embodiment as well, since the stripe images $11_A$ and $11_B$ on the display 1 and the parallax barrier patterns $2_A$ and $2_B$ on the spatial light modulation element 2 are synchronously switched and displayed, the observer can observe a high-quality stereoscopic image free from a decrease in resolution of parallax images.

Figure 6:
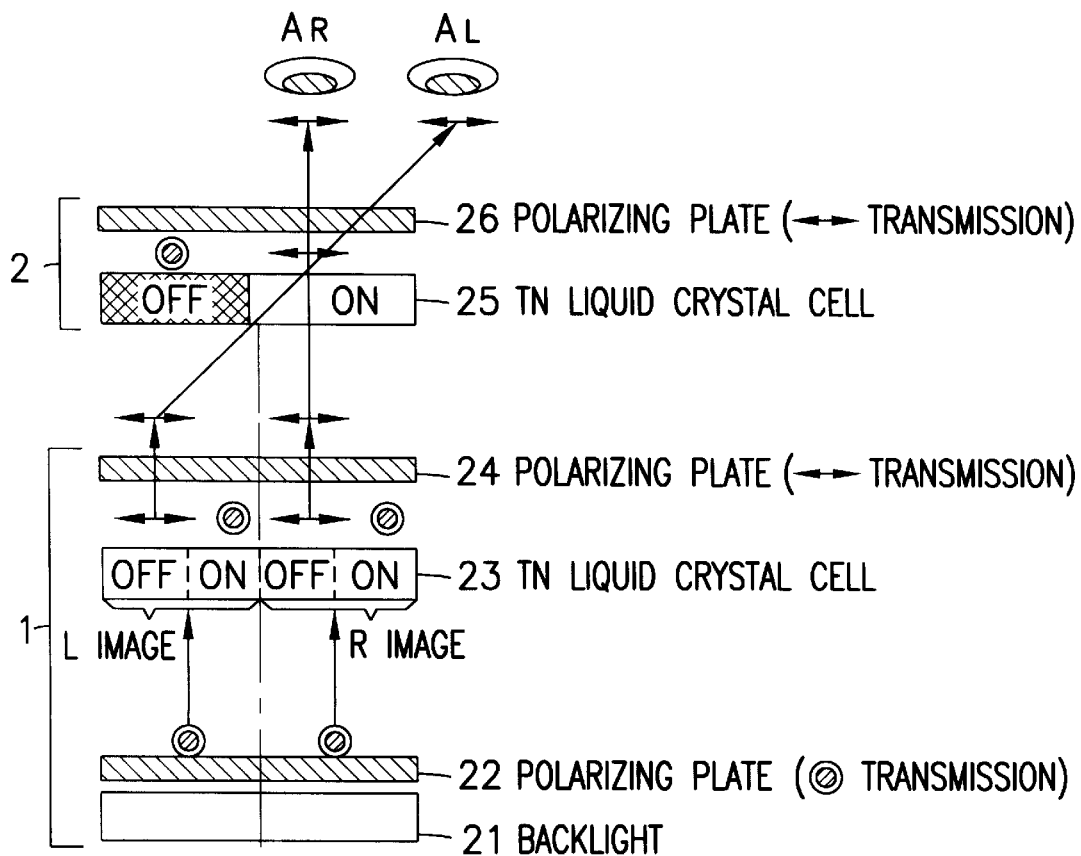
FIG. 6 is an explanatory view of the relationship between the directions of the polarization axes of polarizing plates and observation images in the second embodiment.

FIG. 6 is an explanatory view of the relationship between the directions of polarization axes of the polarizing plate and the observation image in this embodiment. For example, a case will be examined wherein the display 1 of this embodiment uses a normally white mode liquid crystal display, and the polarization axis of the polarizing plate 22 is perpendicular to the plane of the drawing of FIG. 6. At this time, the polarizing plates 22 and 24 are set to attain a crossed Nicols state. In this state, the polarization axis of only light components of the light, which are emitted by the backlight 21 and are incident on portions (OFF portions) applied with no voltage of the TN liquid crystal cell 23, is rotated by 90°, and these light components are transmitted through the polarizing plate 24.

On the other hand, the spatial light modulation element 2 is also constituted by the TN liquid crystal cell 25 and the single polarizing plate 26, and a voltage is applied to only the slit portions (ON portions) of the parallax barrier pattern. Therefore, the plane of polarization of the display image light (the polarization axis is parallel to the plane of the drawing) transmitted through the display 1 is not modulated by the slit portions (ON portions) of the parallax barrier pattern, and the display image light is directly transmitted through the polarizing plate 26 (the polarization axis is parallel to the plane of the drawing). A left-eye image (L image) is transmitted in the direction of a left eye $A_L$. A right-eye image (R image) is transmitted in the direction of a right eye $A_R$, and a stereoscopic image is observed. The relationship between the polarization axes of the polarizing plates and the observation image has been described.

Since the conventional apparatus disclosed in Japanese Patent Application Laid-Open No. 3-119889 uses four polarizing plates, the luminance of the displayed image lowers due to absorption by these polarizing plates. However, in this embodiment, Since the number of polarizing plates is decreased by one, the luminance of the displayed image can be improved.

Figure 7:
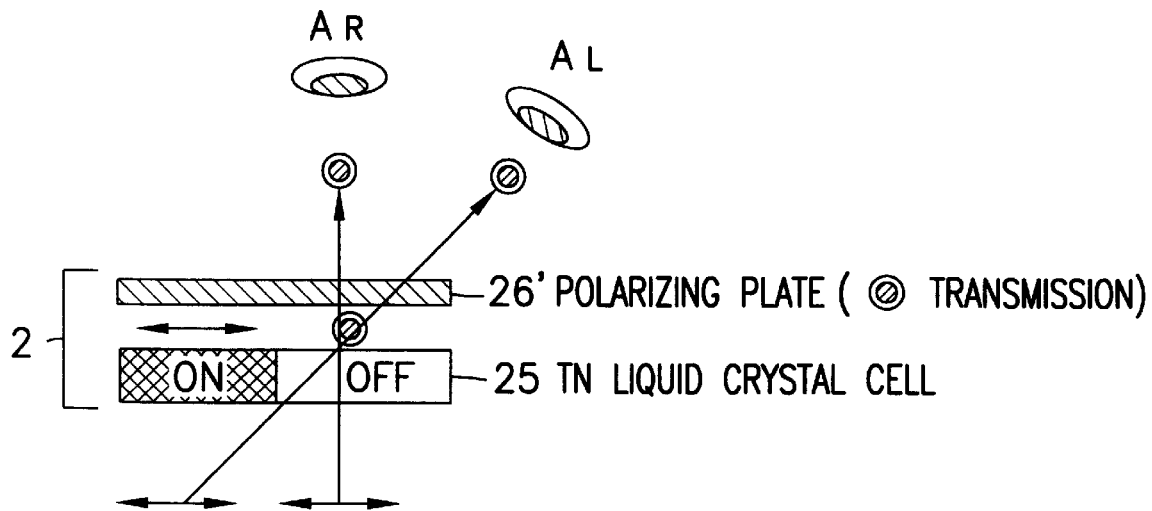
FIG. 7 is a view showing another arrangement of a spatial light modulation element in the second embodiment.

The polarization axis of the polarizing plate constituting the spatial light modulation element 2 can be set to have a direction other than that described above. For example, as shown in FIG. 7, the polarization axis of a polarizing plate 26' may be perpendicular to the plane of the drawing of FIG. 7, and at that time, no voltage is applied to the slit portions of the parallax barrier pattern displayed on the spatial light modulation element 2. In this case, the plane of polarization of the image display light (the polarization axis is parallel to the plane of the drawing) transmitted through the display 1 is rotated by 90° by these slit portions (OFF portions), and the image display light is transmitted through the polarizing plate 26', whose polarization axis is set to be perpendicular to the plane of the drawing, so as to become incident on the corresponding eyes. That is, in this case, the direction of polarization of image light incident on the corresponding eyes is perpendicular to that shown in FIG. 6.

Such change similarly occurs on the display mode of the liquid crystal panel used as the display 1. In such case, the polarization axes of the three polarizing plates used in the stereoscopic image display apparatus of the present invention can be set in correspondence with the respective states.

Figure 8:
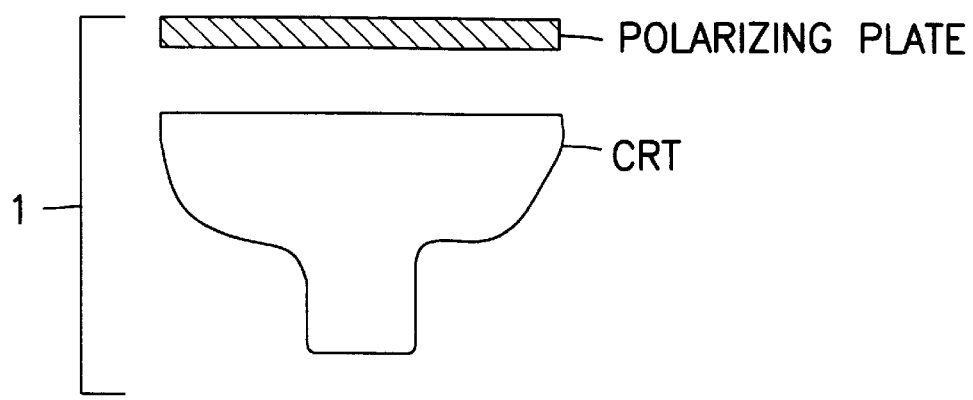
FIG. 8 is a view showing another arrangement of a display in the second embodiment.

Note that the display 1 may be constituted by a self-emission type display and a single polarizing plate, as shown in FIG. 8.

Figure 9:
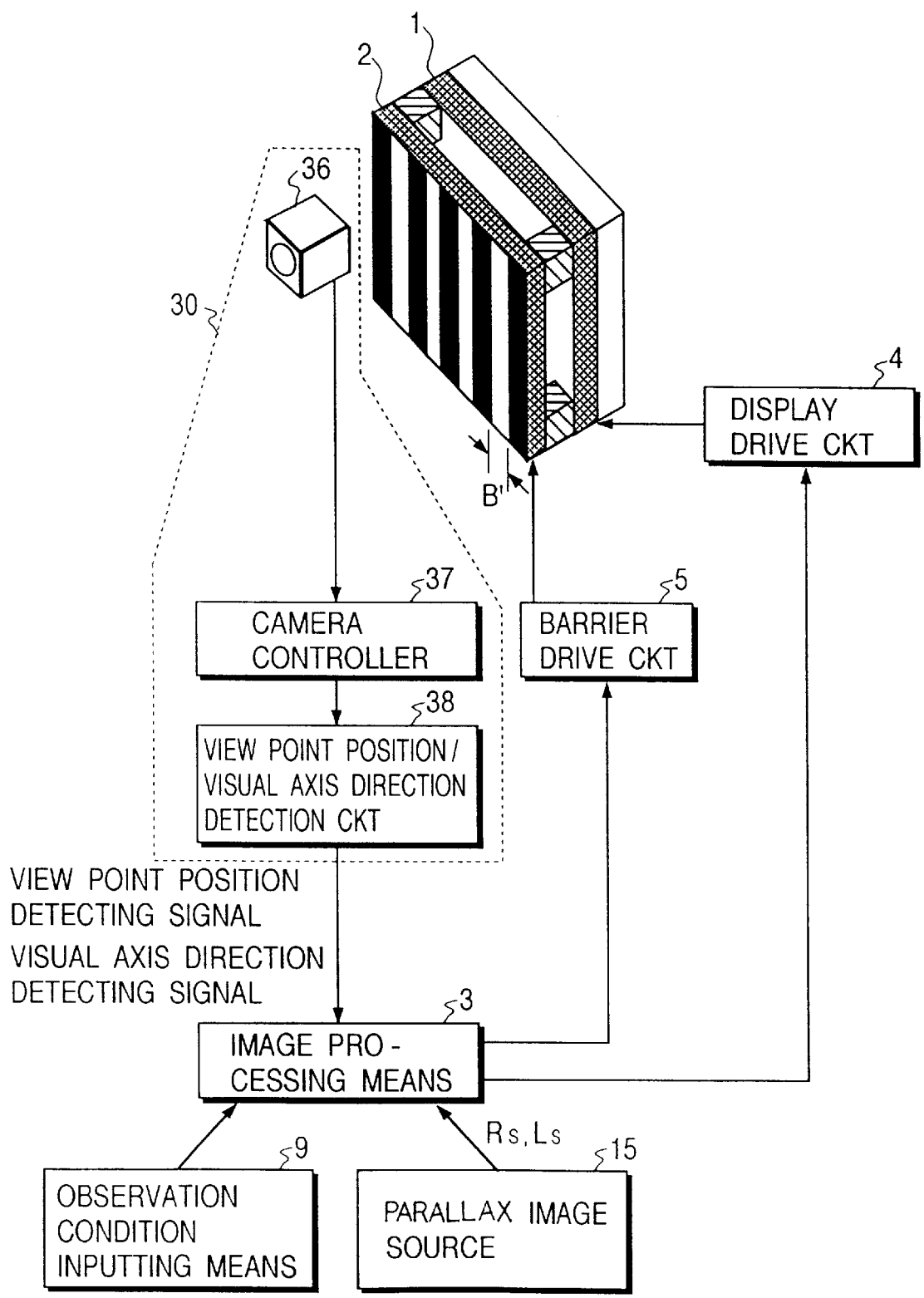
FIG. 9 is a schematic diagram showing principal part of a stereoscopic image display apparatus according to the third embodiment of the present invention.

FIG. 9 is a schematic diagram showing principal part of a stereoscopic image display apparatus according to the third embodiment of the present invention. In this embodiment, the view point position of the observer is automatically detected, and the operation of the stereoscopic image display apparatus is controlled in accordance with the detection result so as to allow a satisfactory stereoscopic view over a wide range.

Referring to FIG. 9, an observer image inputting means 36 inputs an image of the observer who is observing this apparatus. The observer image inputting means 36 of this embodiment is constituted by a single camera. A camera controller 37 controls the observer image inputting means 36. A view point position/visual axis direction detecting circuit 38 detects the view point position and visual axis direction of the observer by performing image processing of the signal supplied from the observer image inputting means 36. The observer image inputting means 36, the camera controller 37, the view point position/visual axis direction detecting circuit 38, and the like constitute an observation condition detecting means 30.

The operation of this embodiment will be described below. The image of the observer picked up by the observer image inputting means 36 is input to the view point position/ visual axis direction detecting circuit 38 via the camera controller 37. The view point position/visual axis direction detecting circuit 38 extracts the images of the eyes of the observer by performing image processing of the input image, thereby detecting the view point position and visual axis direction of the observer.

As has been described in the first embodiment, since the display operation of the stereoscopic image display apparatus of this embodiment is performed based on parallax barrier conditional formulas (1) and (2) above, if the observer moves backward or forward, it is preferable to change, in correspondence with the position (observation position) of the observer, the pixel interval (width) P of the stripe pixels displayed on the display 1 and the width B' of each slit portion of the parallax barrier pattern formed on the spatial light modulation element 2.

In this case, since the display 1 uses a liquid crystal display having a pixel size of 0.110 mm (horizontal)×0.330 mm (vertical) and three pixels correspond to the stripe width (the width of each stripe pixel) of the parallax image, the pixel interval is P=0.110×3=0.330 mm.

As the first observation conditions, the base length and the observation distance are respectively set to be O=65 mm and C=1,000 mm. With these conditions, the conditions for the spatial light modulation element 2 are set to be D=5.05 mm and B'=0.3283 mm. Note that slight fine adjustment is preferably performed in consideration of the divergence of the observation width. If the observer moves from this position to a position at an observation distance of about 1,500 mm, the observation distance in the observation conditions changes to C=1,500 mm. In this case, if the interval D remains the same, conditional formulas (1) and (2) hold when the width P of each stripe pixel on the display 1 is set to be P=0.220 mm and the width B' of each slit portion of the parallax barrier pattern on the spatial light modulation element 2 is set to be B'=0.2192 mm. In this case, each stripe pixel of the stripe image can be displayed to have a width P corresponding to two pixels, and each slit portion of the parallax barrier pattern can be formed to have a width B' corresponding to two pixels.

As described above, in this embodiment, the observation condition detecting means 30 detects the view point position of the observer, and the observation distance C is calculated in accordance with the detection result. Then, the width P of each stripe pixel constituting the stripe image and the width B' of each slit portion of the parallax barrier pattern to be displayed on the spatial light modulation element 2 are appropriately controlled in accordance with the calculated distance C, thus allowing a satisfactory stereoscopic view at the observation position over a wide range.

Note that the observation condition detecting means 30 of this embodiment may use two cameras, an output from a magnetic sensor which is attached to the head portion of the observer and detects a magnetic field formed around the observer, or a visual axis detecting means such as a known eye mark camera.

In this embodiment as well, the observer himself or herself may input the view point position using the observation condition inputting means 9 or may control an adjustment switch while observing the displayed image, thus controlling at least one of the constituting elements of the stripe image and the slit pattern, that display a stereoscopic image on the display 1.

Figure 10:
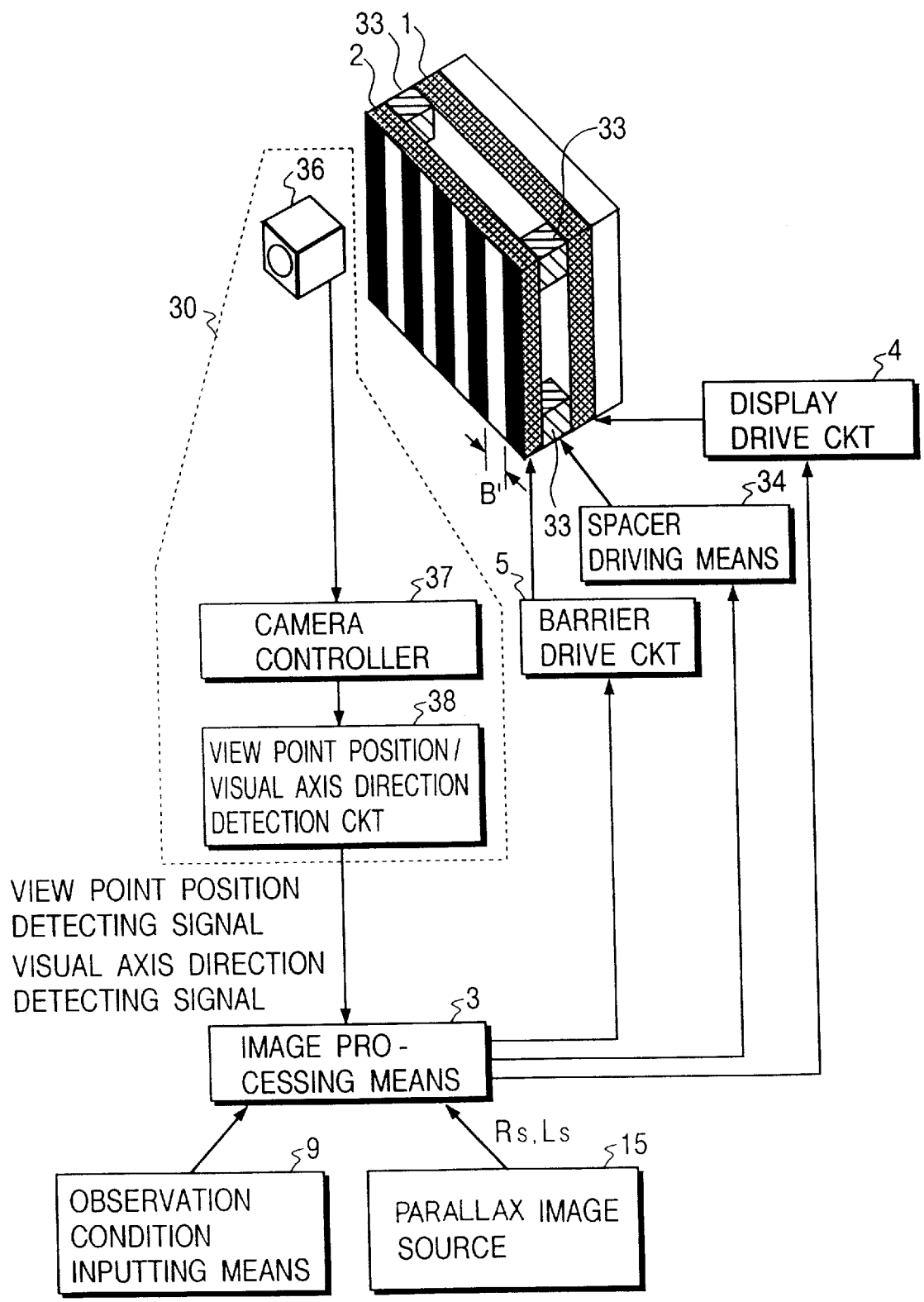
FIG. 10 is a schematic diagram showing principal part of a stereoscopic image display apparatus according to the fourth embodiment of the present invention.

FIG. 10 is a schematic diagram showing principal part of a stereoscopic image display apparatus according to the fourth embodiment of the present invention. The difference between the fourth and third embodiments is as follows. That is, in the third embodiment, when the observation distance C changes, the width P of each stripe pixel and the width B' of each slit portion of the parallax barrier pattern are changed to display a stereoscopic image to be observed. However, in this embodiment, the distance D between the display 1 and the spatial light modulation element 2 is changed to display a stereoscopic image to be observed. Other arrangements are the same as those in the third embodiment.

Referring to FIG. 10, variable spacers 33 control the interval D between the display 1 and the spatial light modulation element 2, and their lengths change in accordance with a signal. A spacer driving means 34 controls the variable spacers 33 in accordance with a signal from the image processing means 3. The variable spacers 33, the spacer driving means 34, and the like constitute an interval control means.

The operation of this embodiment will be described below. In this embodiment, the observation condition detecting means 30 detects the view point position of the observer, and the observation distance C is calculated in accordance with the detection result. Then, the variable spacers 33 are controlled via the spacer driving means 34 in accordance with the calculated distance C so as to change the interval D between the display 1 and the spatial light modulation element 2. With this control, the observer can observe a stereoscopic image.

The principle will be explained below. Formulas (1) and (2) are rewritten as follows:

$$C = D \cdot (O+P)/P = k \cdot D \qquad (3)$$

$$B' = P \cdot (k-1)/k \qquad (4)$$

for $k \equiv (O+P)/P$

With these formulas, when the width P of each stripe pixel of the stripe image 11 to be displayed on the display 1 and the base length O are determined, k is determined, and the width B' of each slit portion of the parallax barrier pattern is uniquely determined. Also, the interval D is proportional to the observation distance C.

Therefore, when the interval D between the display 1 and the spatial light modulation element 2 that forms the parallax barrier pattern is controlled in correspondence with the observation distance C, the above-mentioned conditional formulas hold.

For example, if the width P of each stripe image is set to be P=0.330 mm and the base length O is set to be O=65 mm, k=197.97, the interval D=5.05 mm and the width B'=0.3283 mm of each slit portion can be set at the position of an observation distance C=1,000 mm as one first observation condition. When the observer moves to the position at an observation distance C=1,500 mm as one second observation condition, the above-mentioned conditional formulas hold if the interval D=7.58 mm and the width B'=0.3283 mm of each slit portion are set.

Figure 11A:
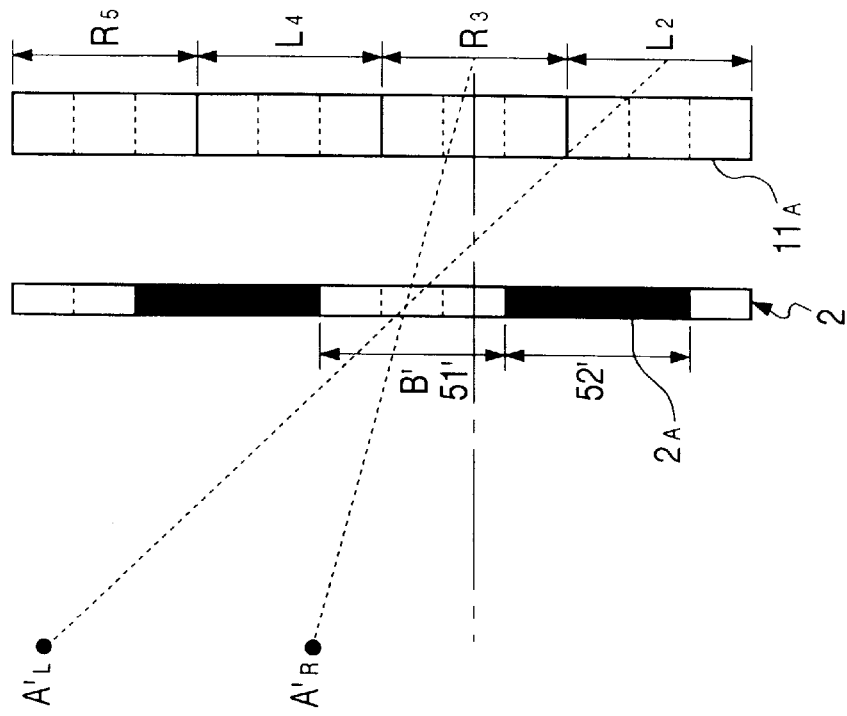
FIGS. 11A and 11B are explanatory views of movement of slit portions in the fourth embodiment.
Figure 11B:
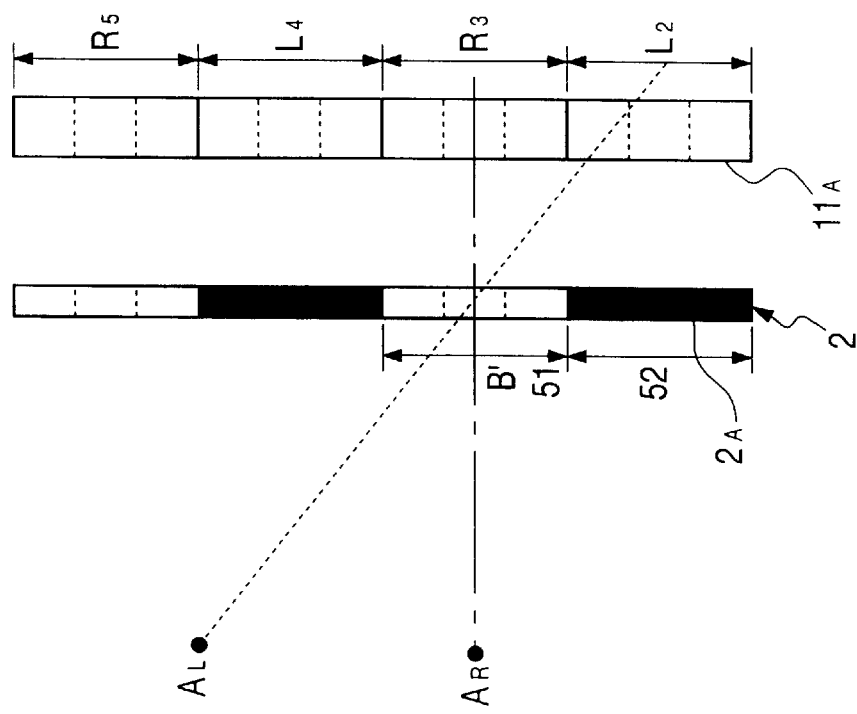

In the apparatus for displaying a stereoscopic image to follow the view point position like in this embodiment, when the observer moves in the right-and-left direction, the formation positions of the slit portions of the parallax barrier pattern can be appropriately shifted in the right-and-left direction in correspondence with the view point position of the observer, as shown in FIGS. 11A and 11B, thus satisfactorily displaying a stereoscopic image even in such case.

Assuming that each slit portion of the parallax barrier pattern is formed to have a width B' corresponding to three pixels of the spatial light modulation element 2, as indicated by 51 in FIG. 11A, when the view points move laterally to the position of A'$_R$ and A'$_L$, as shown in FIG. 11B, the slit portions of the parallax barrier pattern can be formed while shifting by one pixel relative to the stripe image 11$_A$, as indicated by 51' in FIG. 11B. Thus, in such case, the observer can satisfactorily stereoscopically observe the stripe image 11$_A$. Note that 52 or 52' indicates the position serving as a slit portion of a time-sequential parallax barrier pattern, as described above.

Alternatively, the observer can also satisfactorily recognize a stereoscopic image when the position of the stripe image 11 displayed on the display 11 shifts in the right-and-left direction while the positions of the slit portions of the parallax barrier pattern remain the same.

The 11th embodiment to be described later adopts the above-mentioned method.

FIGS. 12 to 14D are explanatory views of a stereoscopic image display apparatus according to the fifth embodiment of the present invention. In the above embodiments, the parallax images R$_S$ and L$_S$ used for synthesizing a stripe image to be displayed on the display 1 are always the same. In other words, the above-mentioned stereoscopic image display method/apparatus allows the observer to always satisfactorily observe the same stereoscopic image that remains the same even when the observer changes the view point position.

However, in this embodiment, this embodiment adopts the display method that gives a wraparound display effect to an image in correspondence with the change in view point position of the observer, and the parallax images R$_S$ and L$_S$ to be displayed on the display 1 are changed in accordance with the view point position of the observer.

Figure 12:
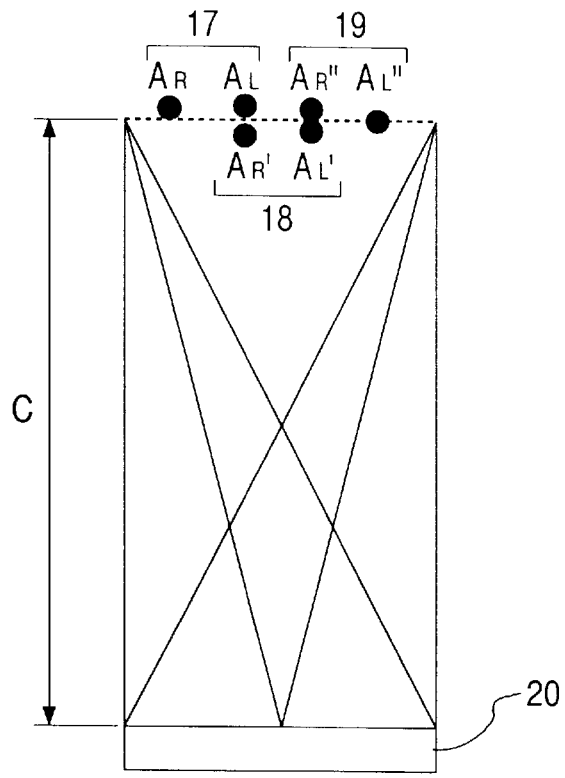
FIG. 12 is a schematic view showing principal part of a stereoscopic image display apparatus according to the fifth embodiment of the present invention.

FIG. 12 shows, as a display apparatus 20, only a portion consisting of the display 1 and the spatial light modulation element 2 of the stereoscopic image display apparatus of the third or fourth embodiment.

Assume that the observer observes an image from a position separated from the display apparatus 20 by the observation distance C. Note that the image processing means, the observation condition detecting means, and the like are not shown.

Figure 13:
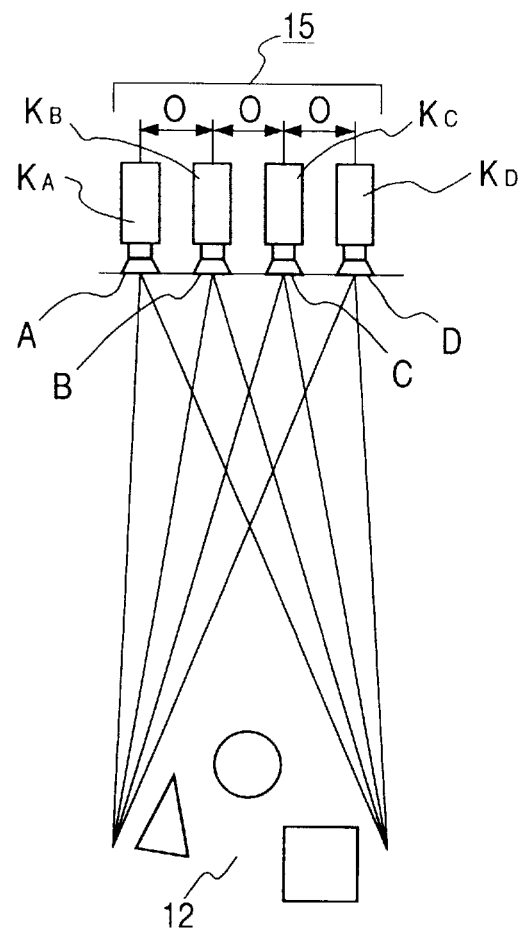
FIG. 13 is a schematic view showing principal part of parallax image sources of the fifth embodiment.

On the other hand, FIG. 13 is a schematic view showing principal part of the parallax image source 15 of this embodiment. Referring to FIG. 13, cameras K$_A$, K$_B$, K$_C$ and K$_D$ are aligned at positions separated from objects 12 by the distance C to be separated by intervals equal to the interval (base length) O between the two eyes of the observer so as to pick up images of the objects. Note that A to D respectively indicate the object-side principal points of the optical systems of the cameras. Therefore, in this embodiment, the parallax image source 15 always has four original parallax images.

The operation of this embodiment will be described below. A case will be examined below wherein the observer moves from a position 17 (the right eye position A$_R$, the left eye position A$_L$) to a position 19 (the right eye position A$_R$"=the left eye position A$_L$' at a position 18, the left eye position A$_L$") via the position 18 (the right eye position A$_R$'=the left eye position A$_L$ at the position 17, the left eye position A$_L$'), as shown in FIG. 12.

When the observer is located at the position 17, an original parallax image (FIG. 14A) picked up from the point A by the camera K$_A$ is input to the display apparatus 20 as an image R$_S$ to be observed by the right eye A$_R$ of the observer on the display apparatus 20. At the same time, an original parallax image (FIG. 14B) picked up at the point B by the camera K$_B$ is input to the display apparatus 20 as an image L$_S$ to be observed by the left eye A$_L$ of the observer.

Figures 14A, 14B, 14C, 14D:
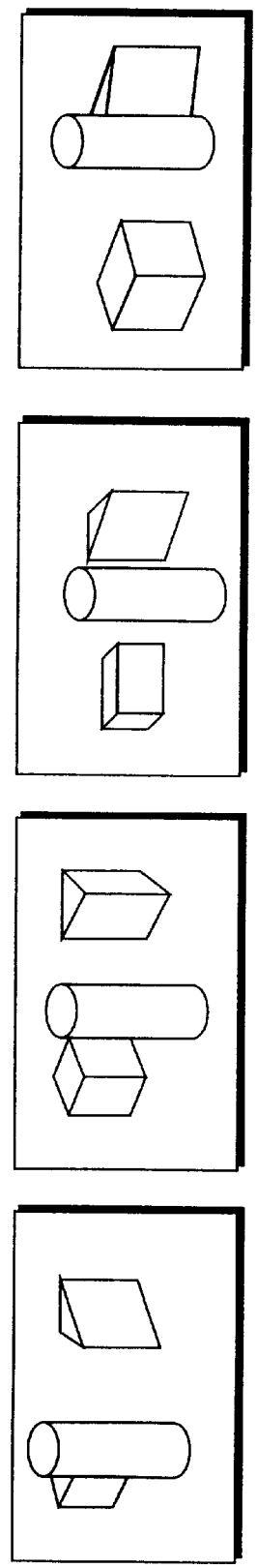
FIGS. 14A to 14D are explanatory views of original parallax images of the parallax image sources of the fifth embodiment.

The display apparatus 20 uses the two original parallax images shown in FIGS. 14A and 14B as those used for synthesizing a stripe image to be displayed on the display 1, and synthesizes and displays the stripe image using the image shown in FIG. 14A as the right-eye image and the image shown in FIG. 14B as the left-eye image. In this manner, the observer can observe a stereoscopic image when he or she observes the objects from the positions of the cameras K$_A$ and K$_B$.

When the observer moves to the position 18, the original parallax image (FIG. 14B) picked up at the point B by the camera K$_B$ is input to the display apparatus 20 as an image R$_S$ to be observed by the right eye A$_R$' of the observer. At the same time, an original parallax image (FIG. 14C) picked up at the point B by the camera K$_C$ is input to the display apparatus 20 as an image L$_S$ to be observed by the left eye A$_L$' of the observer.

The display apparatus 20 uses the two original parallax images shown in FIGS. 14B and 14C as those used for synthesizing a stripe image to be displayed on the display 1, and synthesizes and displays the stripe image using the image shown in FIG. 14B as the right-eye image and the image shown in FIG. 14C as the left-eye image. In this manner, the observer can observe a stereoscopic image when he or she observes the objects from the positions of the cameras K$_B$ and K$_C$.

When the observer moves to the position 19, the original parallax image (FIG. 14C) picked up at the point B by the camera K$_C$ is input to the display apparatus 20 as an image R$_S$ to be observed by the right eye A$_R$" of the observer. At the same time, an original parallax image (FIG. 14D) picked up at the point B by the camera K$_D$ is input to the display apparatus 20 as an image L$_S$ to be observed by the left eye A$_L$" of the observer.

The display apparatus 20 uses the two original parallax images shown in FIGS. 14C and 14D as those used for synthesizing a stripe image to be displayed on the display 1, and synthesizes and displays the stripe image using the image shown in FIG. 14C as the right-eye image and the image shown in FIG. 14D as the left-eye image. In this manner, the observer can observe a stereoscopic image when he or she observes the objects from the positions of the cameras K$_C$ and K$_D$.

With the above-mentioned operations, when the observer moves and changes his or her view point position, a stereoscopic image to be observed is constituted by parallax images obtained by viewing the objects from different directions, and a "wraparound" stereoscopic image of the objects 12 can be observed.

In this embodiment, the parallax image source 15 has parallax image information consisting of four original parallax images. Two out of four original parallax images are selected and used in accordance with a signal from the observation condition detecting means 30 so as to display a stereoscopic image.

In this embodiment, the object-side principal point positions A, B, C, and D of the cameras constituting the parallax image source 15 agree with the eye positions $A_R$, $A_L$ (=$A_R'$), $A_L'$ (=$A_R''$), and $A_L''$ at the respective observation positions. However, when the right eye of the observer is located between $A_R$ and $A_L$ of the position 17, and the left eye is located between $A_R'$ and $A_L'$ of the position 18, a single right-eye image (parallax image) $R_S$ is synthesized by performing "image interpolation" of two original parallax images shown in FIGS. 14A and 14B, and a single right-eye image (parallax image) $L_S$ is synthesized by performing image interpolation of two original parallax images shown in FIGS. 14B and 14C. Using these two parallax images $R_S$ and $L_S$ obtained by synthesizing the original parallax images, a stripe image to be displayed on the display 1 can be synthesized and displayed, thus realizing a more smoothly continuous image wraparound effect.

As the image interpolation method, a known method using an epipolar plane image (EPI), i.e., a method of creating an interpolated image by exploring corresponding points on an EPI (e.g., R. C. Bolles et. al: Int. J. Computer Vision, Vol. 1, No. 1, pp. 7–55, 1987) may be used.

When the image interpolation method is used, the images of the objects 12 need not be picked up by the four camera systems shown in FIG. 13. For example, using two original parallax images picked up by the cameras at the positions A and D, image interpolation is repeated to form desired parallax images, and a stripe image can be synthesized using the formed parallax images. (Note that forming parallax images by interpolation using those formed by interpolation will be referred to as "image re-construction" in the present invention.)

When the observer moves forward or backward, parallax images corresponding to the view point position may be formed by image interpolation, and a stripe image can be synthesized using these images. As the method of processing these images, a method disclosed in Japanese Patent Application Laid-Open No. 7-129792 is effective.

In the fifth embodiment, as images to be displayed, natural images picked up by four cameras are used. Alternatively, three-dimensional images such as so-called CG images created by a computer (e.g., a CAD) may be used. In this case, since "data" of an object is already three-dimensional data, parallax images viewed from arbitrary positions can be freely "generated". Therefore, a plurality of parallax images corresponding to the respective view point positions can be generated, and a stripe image can be synthesized and displayed based on these images.

Conventionally, when a multi-parallax image display (called parallax panoramagram) is performed using the parallax barrier method so as to broaden the view range or to give the "wraparound effect", the display resolution lowers to 1/n (where n is the number of parallax images used at that time).

However, in this embodiment, the decrease in resolution is at most ½. Furthermore, since this embodiment uses the arrangement of the third or fourth embodiment, a decrease in resolution can be prevented, and when the arrangement of the second embodiment is adopted, the image luminance can be improved.

Figure 15A:
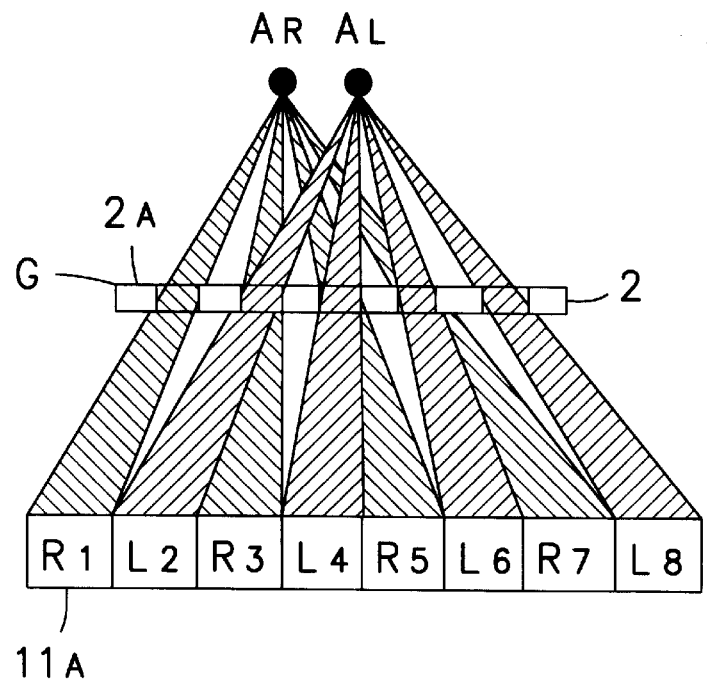
FIGS. 15A and 15B are explanatory views of the stereoscopic image display method of a stereoscopic image display apparatus according to the sixth embodiment of the present invention.
Figure 15B:
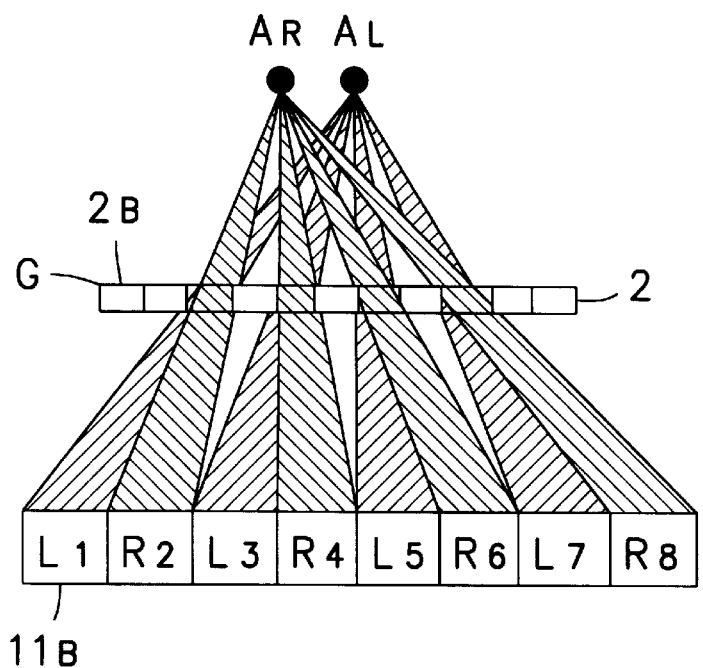

FIGS. 15A and 15B are explanatory view of the stereoscopic image display method of a stereoscopic image display apparatus according to the sixth embodiment of the present invention. In the first embodiment, the image display operation on the display 1 and the display operation of the parallax barrier pattern on the spatial light modulation element 2 are synchronously performed in units of pixels on the scan lines. However, in this embodiment, these display operations are synchronously performed in units of scan lines.

FIG. 15A shows the same display state as that shown in FIG. 2A of the first embodiment. In this state, when the observer observes the first stripe image $11_A$ via the first parallax barrier pattern $2_A$ formed on the spatial light modulation element 2, his or her right and left eyes can observe the corresponding parallax images, thus attaining a stereoscopic view.

In this embodiment, when the observer observes the second stripe image $11_B$ via the second parallax barrier pattern $2_B$ in the state shown in FIG. 15B, a stereoscopic view can be attained. In this embodiment, the stripe image 11 to be displayed on the display 1 and the light-transmission portions of the parallax barrier pattern formed on the spatial light modulation element 2 are synchronously displayed in units of scan lines, and the two display states shown in FIGS. 15A and 15B are alternately and repetitively displayed.

That is, at a certain time (at the time of the display state shown in FIG. 15A), the corresponding portion of the first stripe image $11_A$ obtained by arranging the stripe pixels $R_i$ and $L_i$ of the parallax images $R_S$ and $L_S$ in the order of $R_1$, $L_2$, $R_3$, $L_4$, . . . is displayed on a given scan line of the display 1. At the same time, the first parallax barrier pattern $2_A$ is formed by repetitively displaying the light-transmission portions and the light-shielding portions in the order of close (light-shielding portion), open (light-transmission portion), close, open, . . . from the point G on the corresponding scan line of the spatial light modulation element 2. At this time, only the right-eye image constituted by the stripe pixels $R_1$, $R_3$, $R_5$, . . . is incident on the right eye $A_R$, and only the left-eye image constituted by the stripe pixels $L_2$, $L_4$, $L_6$, . . . is incident on the left eye $A_L$, thus attaining a stereoscopic view. (Note that the right- and left-eye images have a resolution ½ that of the display surface of the display 1.)

At a time at which one frame has been scanned and the same scan line as described above is being scanned (at the time of the display state shown in FIG. 15B), the second stripe image $11_B$ obtained by arranging the stripe pixels $R_i$ and $L_i$ of the parallax images $R_S$ and $L_S$ in the order of $L_1$, $R_2$, $L_3$, $R_4$, . . . is displayed on the scan line of the display 1. At the same time, the second parallax barrier pattern $2_B$ is formed by repetitively displaying the light-transmission portions and light-shielding portions in the order of open, close, open, close, open, close, . . . from the point G on the corresponding scan line of the spatial light modulation element 2 (the second and first parallax barrier patterns $2_B$ and $2_A$ have opposite arrangements of the light-transmission portions and the light-shielding portions). At this time, only the right-eye parallax image constituted by the stripe pixels $R_2$, $R_4$, $R_6$, . . . is incident on the right eye $A_R$, and only the left-eye parallax image constituted by the stripe pixels $L_1$, $L_3$, $L_5$, . . . is incident on the left eye $A_L$, thus similarly attaining a stereoscopic view.

When these two display states are alternately and time-sequentially displayed at a high-speed frame rate, the right eye can observe the entire parallax image $R_S$ constituted by the stripe pixels $R_1$, $R_2$, $R_3$, $R_4$, . . . , and the left eye can observe the entire parallax image $L_S$ constituted by the stripe pixels $L_1$, $L_2$, $L_3$, $L_4$, . . . . As a result, the observer can observe a high-quality stereoscopic image without the display resolution of the display 1 being reduced.

In the conventional stereoscopic image display method, the resolutions of images to be observed by the right and left eyes lower to ½ the display resolution of the display to be used. However, in this embodiment, an image having a resolution twice that of the image displayed by the conventional method can be displayed.

Figure 16A:
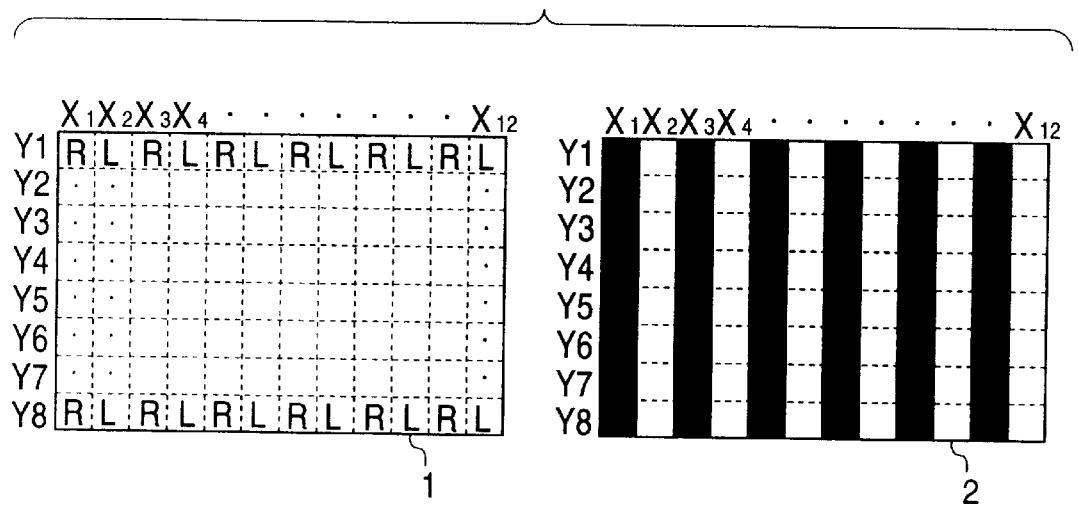
FIGS. 16A to 16C are explanatory views of the display states of the sixth embodiment.
Figure 16B:
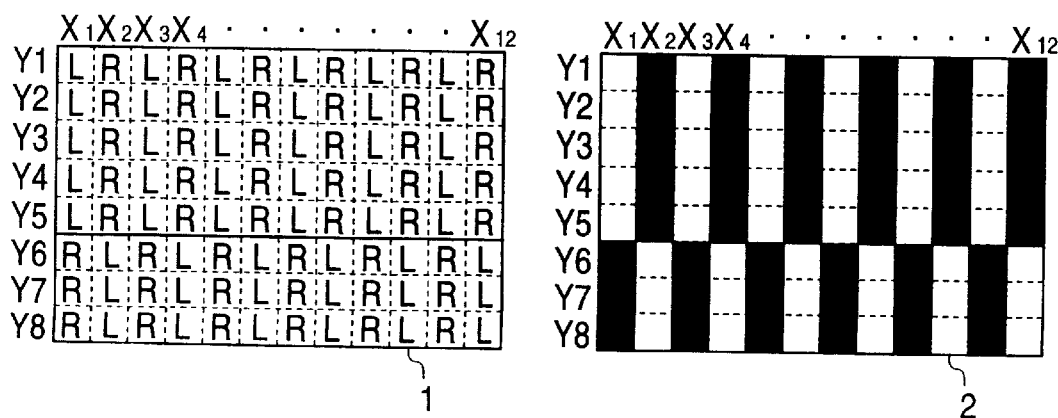
Figure 16C:
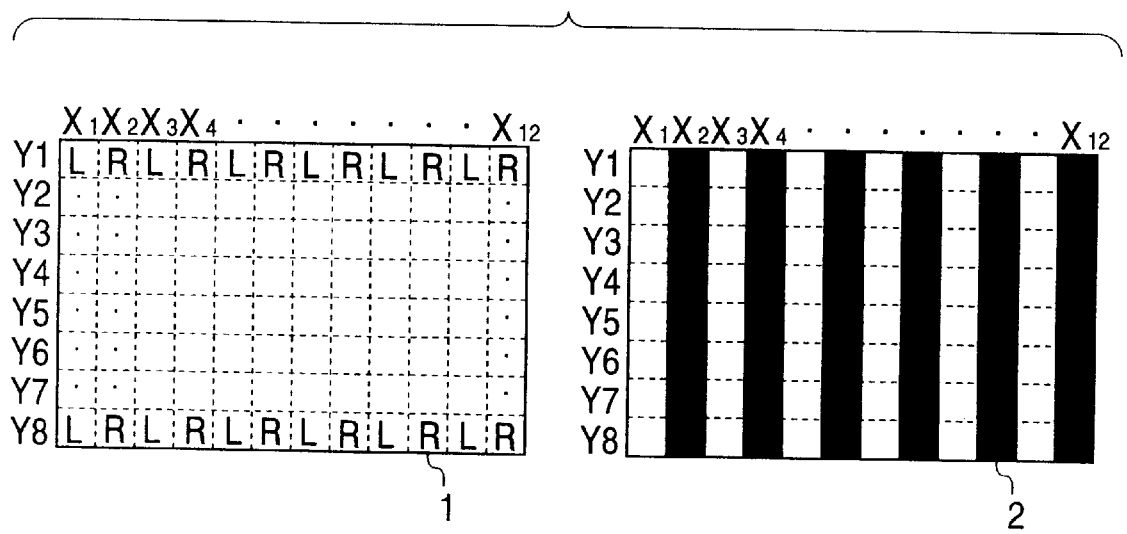

The display switching operations of the display 1 and the spatial light modulation element 2 of this embodiment will be described in more detail below with reference to FIGS. 16A to 16C. FIGS. 16A to 16C show a case wherein the display 1 and the spatial light modulation element 2 are driven in a non-interlace manner using the circuit arrangement shown in FIG. 3. In each of FIGS. 16A to 16C, the left drawing indicates the display state of the display 1, and the right drawing indicates the parallax barrier pattern to be displayed on the spatial light modulation element 2.

FIGS. 16A and 16C respectively show states wherein the images to be displayed on the display 1 have been completely switched to the first and second stripe images $11_A$ and $11_B$, and FIG. 16B shows the intermediate scanning state between FIGS. 16A and 16C, i.e., the display state at the time upon completion of scanning of the fifth scan line Y5.

As shown in FIG. 16A, at a certain time (at the time upon completion of scanning of the entire screen), the first stripe image $11_A$ obtained by arranging the stripe pixels in the order of $R_1$, $L_2$, $R_3$, $L_4$, . . . is displayed on the entire screen of the display 1, and the first parallax barrier pattern $2_A$ obtained by arranging stripe patterns in the order of close, open, close, open, . . . is displayed on the spatial light modulation element 2.

From this state, the first scan line Y1 is selected, the corresponding portion of the second stripe image $11_B$ obtained by arranging stripe pixels in the order of $L_1$, $R_2$, $L_3$, $R_4$, . . . is displayed on the scan line Y1 of the display 1, and the corresponding portion of the second parallax barrier pattern $2_B$ obtained by arranging stripe patterns in the order of open, close, open, close, . . . is displayed on the scan line Y1 of the spatial light modulation element 2 in synchronism with the scan line Y1 of the display 1. FIG. 16B shows the display state at the time upon completion of scanning of the fifth scan line Y5 after the above-mentioned operation is repeated in turn in the order of scan lines Y1, Y2, . . . .

In this embodiment, the display driving operations of the display 1 and the spatial light modulation element 2 are synchronously performed in units of scan lines. FIG. 16C shows the state upon completion of scanning of all the scan lines. In this state, the display 1 displays the second stripe image $11_B$, which complements the first stripe image $11_A$ shown in FIG. 16A. In FIG. 16A, the odd stripe pixels $R_1$, $R_3$, $R_5$, . . . of the right parallax image $R_S$ are displayed, while in FIG. 16C, the even stripe pixels $R_2$, $R_4$, $R_6$, . . . of the right parallax image $R_S$ are displayed. On the other hand, in FIG. 16A, the even stripe pixels $L_2$, $L_4$, $L_6$, . . . of the left parallax image $L_S$ are displayed, while in FIG. 16C, the odd stripe pixels $L_1$, $L_3$, $L_5$, . . . of the left parallax image $L_S$ are displayed.

Upon completion of a series of scanning operations (the rewrite display operations of all the scan lines), the right and left parallax images $R_S$ and $L_S$ are displayed on all the pixels constituting the display 1.

At this time, since the parallax barrier pattern to be formed on the spatial light modulation element 2 is synchronously switched and displayed in units of scan lines, even when a stripe image which is being rewritten or has been rewritten is observed via the spatial light modulation element 2, a stereoscopic view can be attained on the basis of the principle of the parallax barrier method with almost no crosstalk. Therefore, the observer can observe a high-resolution stereoscopic image displayed on all the pixels of the display.

Figure 17:
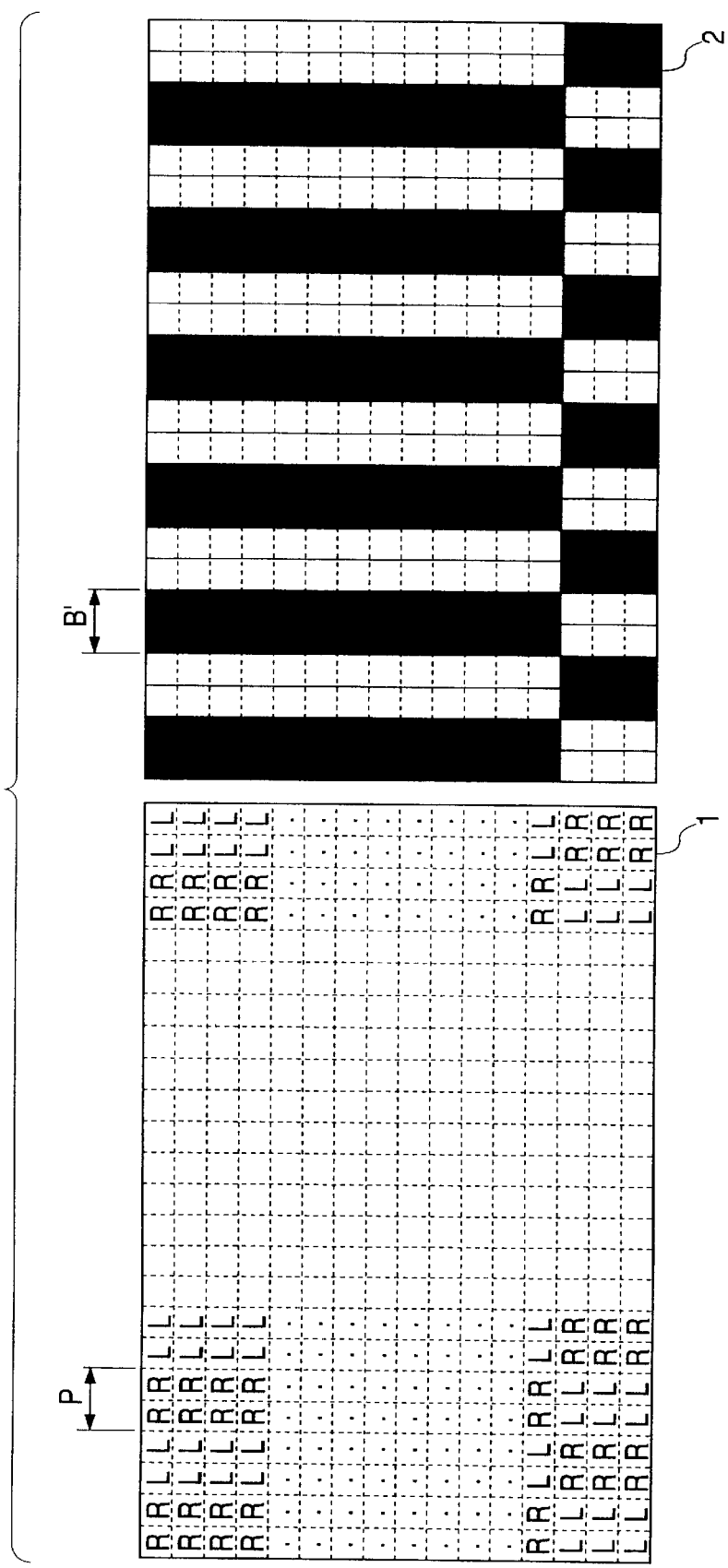
FIG. 17 is an explanatory view of another selection of the display width in the sixth embodiment.

In this embodiment, the display width P of each stripe pixel constituting the right and left parallax images matches one pixel of the display 1, and the display width of each of the light-transmission portions and the light-shielding portions of the parallax barrier pattern matches one pixel on the display surface of the spatial light modulation element 2. However, the present invention is not limited to this formation method of the parallax barrier pattern. For example, as shown in FIG. 17, the display width P of each stripe pixel may correspond to a plurality of pixels of the display 1, and the display width B' of each of the light-transmission portions and the light-shielding portions of the parallax barrier pattern may correspond to a plurality of pixels of the spatial light modulation element 2. These display widths can be independently selected. For example, the display width P of each stripe pixel may correspond to one pixel width of the display 1, and the display width B' of each of the light-transmission portions and the light-shielding portions of the parallax barrier pattern may correspond to a plurality of pixels of the spatial light modulation element 2. This applies to all the embodiments of the present invention.

Figure 18:
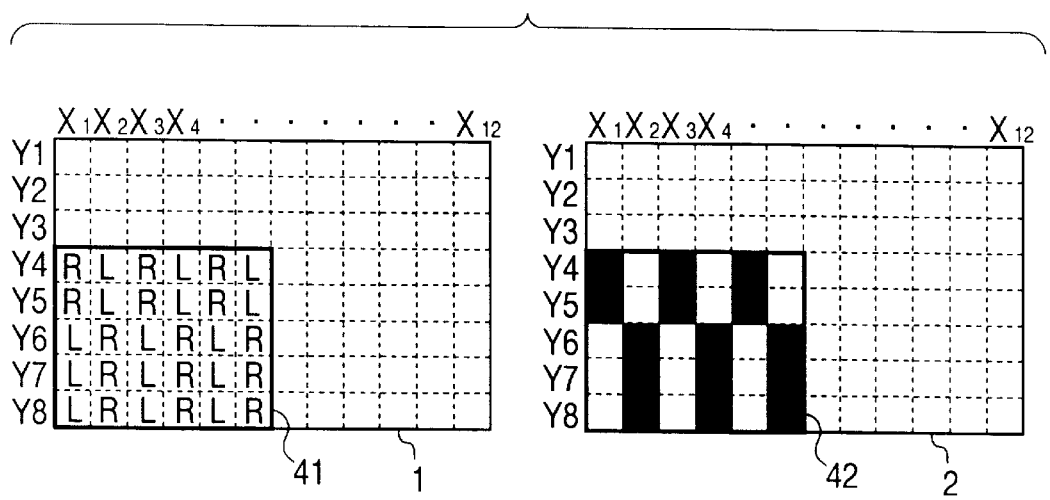
FIG. 18 is an explanatory view of the stereoscopic image display method of a stereoscopic image display apparatus according to the seventh embodiment of the present invention.

FIG. 18 is an explanatory view of the stereoscopic image display method of a stereoscopic image display apparatus according to the seventh embodiment of the present invention. The arrangement of the apparatus of this embodiment is basically same as that of the sixth embodiment. In the sixth embodiment, the stripe image $11_A$ or $11_B$ is displayed on the entire surface of the display 1, and the parallax barrier pattern $2_A$ or $2_B$ is synchronously formed on the entire display surface of the spatial light modulation element 2 in units of scan lines, thereby displaying a stereoscopic image on the entire display surface of the display 1. However, in this embodiment, a stereoscopic image can be displayed on only a portion of the display surface of the display 1 as if a window of a computer were opened. This point is different from the sixth embodiment.

In this embodiment, at the beginning of the operation of the stereoscopic image display apparatus, the observation condition inputting means 9 inputs a display range (region) 41 of a stereoscopic image on the display surface of the display 1, as shown in the left drawing in FIG. 18. A stripe image is displayed only on the designated region, and a two-dimensional image (non-stripe image) is displayed on the remaining region. At the same time, the parallax barrier pattern is formed on only a region 42, corresponding to the region 41 of the display 1, on the spatial light modulation element 2, and the remaining region is set in a light-transmission state. With this operation, a stereoscopic image can be observed only on the desired region 41 on the basis of the stripe image, and the two-dimensional image can be observed on a portion where the stripe image is not displayed.

In this embodiment, when a stereoscopic image is to be displayed on the region 41, the display operations of the display 1 and the spatial light modulation element 2 are synchronously performed in units of scan lines, as has been described in the sixth embodiment. FIG. 18 illustrates a state at the instance upon completion of scanning of the fifth scan line Y5 after the next image display operation is started from the state wherein the second stripe image $11_B$ obtained by arranging stripe pixels in the order of $L_1$, $R_2$, $L_3$, $R_4$, $L_5$, $R_6$, . . . is displayed on the entire region 41, so that the first stripe image $11_A$ obtained by arranging stripe pixels in the order of $R_1$, $L_2$, $R_3$, $L_4$, $R_5$, $L_6$, . . . is switched and displayed on the region 41 from the fourth scan line, and at the same time, the light-transmission portions and the light-shielding portions of the corresponding portion of the spatial light modulation element 2 are switched in synchronism with the scan lines.

In this embodiment, a stereoscopic image can be displayed on a portion of the display 1, so as to display both the stereoscopic image and a non-stereoscopic image, and the stripe image 11 to be displayed on the region 41 of the display 1 and the parallax barrier pattern to be formed on the region 42 of the spatial light modulation element 2 are synchronously displayed in units of scan lines. Therefore, even when the observer observes a locally displayed stripe image, he or she can attain a stereoscopic view based on the principle of the parallax barrier method without any crosstalk.

In this embodiment, the size of the display region 41 of the locally displayed stereoscopic image can be selected within the display screen size of the display 1, and the two-dimensional display position of the display region can also be appropriately selected within the display screen.

Note that the width P of each stripe pixel, the number of stripe pixels, the display region of the stripe image on the display 1, and the like are the constituting elements of the stripe image, and the width B' of each of the slit portions and the light-shielding portions of the parallax barrier pattern, the formation region of the parallax barrier pattern on the spatial light modulation element 2, and the like are the constituting elements of the slit pattern.

In this case, the display driving operations of the display 1 and the spatial light modulation element 2 may be synchronously performed in units of pixels like in the first embodiment.

Figure 19A:
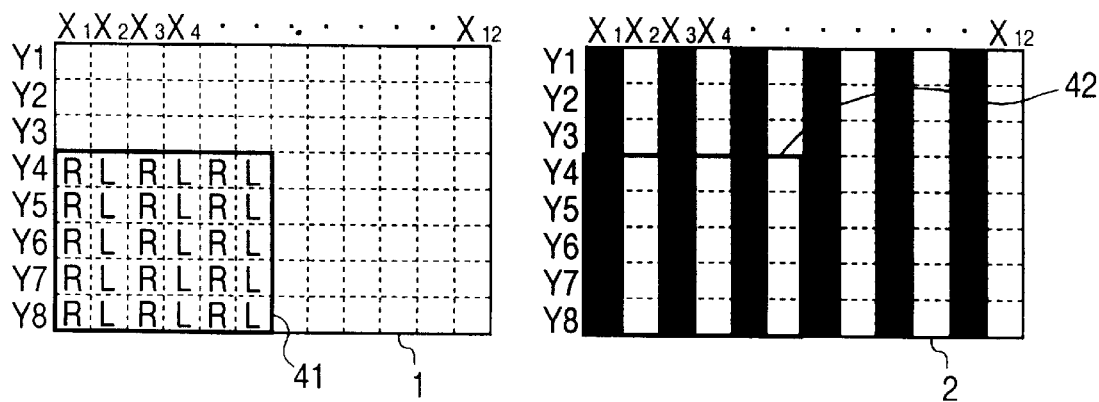
FIGS. 19A to 19C are explanatory views of the stereoscopic image display method of a stereoscopic image display apparatus according to the eighth embodiment of the present invention.
Figure 19B:
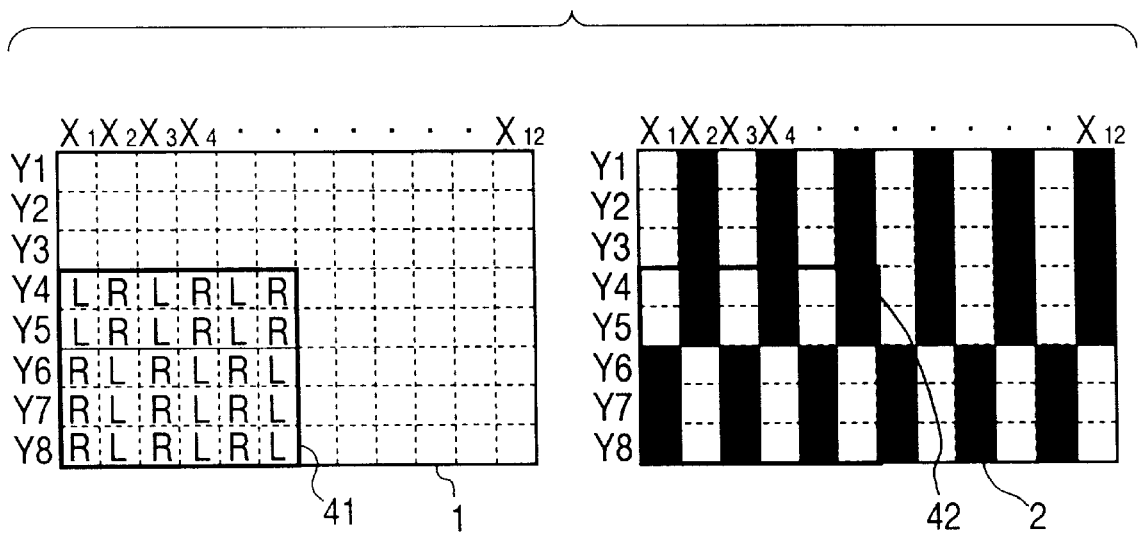
Figure 19C:
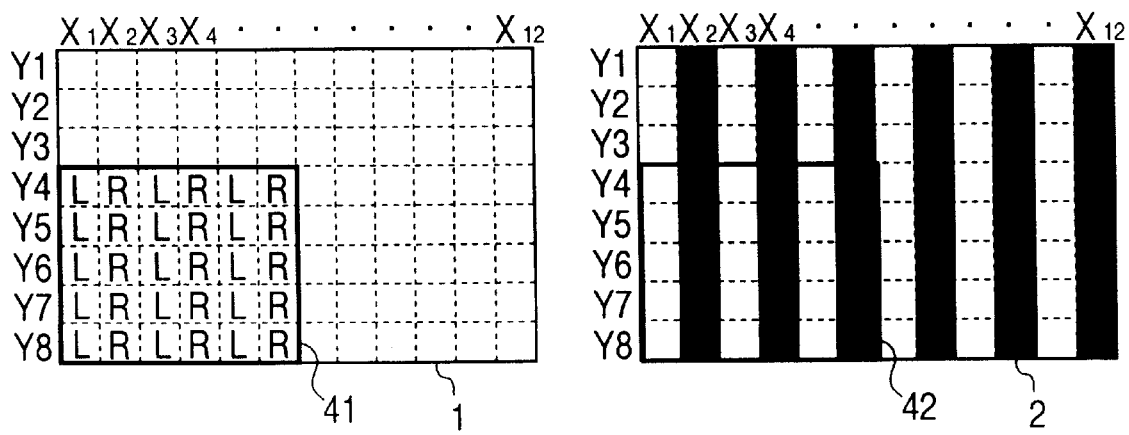

FIGS. 19A to 19C are explanatory views of the stereoscopic image display method of a stereoscopic image display apparatus according to the eighth embodiment of the present invention. The arrangement of the apparatus of this embodiment is basically same as that of the seventh embodiment. The difference between this embodiment and the seventh embodiment is as follows. That is, in this embodiment, the parallax barrier pattern is always formed on the display region of a two-dimensional image (non-stripe image), i.e., on a region other than the region 41 of the display 1. A case will be explained below wherein a stereoscopic image is displayed only on the region 41 on the display surface of the display 1 as in the seventh embodiment.

The state shown in FIG. 19A will be explained below. In this embodiment, as shown in the left drawing of FIG. 19A, a normal two-dimensional image is displayed on a region from the first scan line Y1 to the third scan line Y3 of the display 1. At this time, as shown in the right drawing of FIG. 19A, the stripe-shaped first parallax barrier pattern $2_A$ (close, open, close, open, . . . ) is displayed on the pixels on the respective scan lines on the entire display surface of the spatial light modulation element 2 in synchronism with the scanning timings of the scan lines of the display 1.

Upon scanning of the fourth scan line Y4, the display 1 displays stripe pixels R, L, R, L, R, L, . . . (the stripe pixels will be simply abbreviated as above although they are $R_1$, $L_2$, $R_3$, $L_4$, $R_5$, $L_6$, . . . in practice) in the range from the first pixel $X_1$ to the sixth pixel $X_6$, and displays an image portion, corresponding to the seventh pixel $X_7$ to the 12th pixel $X_{12}$, of the two-dimensional image in the range of these pixels.

The spatial light modulation element 2 displays the first parallax barrier pattern $2_A$ (close, open, close, open, . . . ) on all the pixels from the first pixel $X_1$ to the 12th pixel $X_{12}$ on the fourth scan line Y4 in synchronism with the timing of the corresponding scan line of the display 1. FIG. 19A shows the state after similar scanning/display operations are performed from the fifth scan line Y5 to the eighth scan line Y8.

The state shown in FIG. 19B will be explained below. Upon completion of scanning up to the eighth scan line Y8 in FIG. 19A, the scanning operation is restarted from the first scan line Y1. At this time, a normal two-dimensional image is displayed on the display 1 in the scanning operation from the first scan line Y1 to the third scan line Y3 as in the above-mentioned operation, but the second parallax barrier pattern $2_B$ (open, close, open, close, . . . ) is displayed on all the scan lines of the spatial light modulation element 2. Upon scanning of the fourth scan line Y4, the display 1 displays stripe pixels L, R, L, R, L, R, . . . (the stripe pixels will be simply abbreviated as above although they are $L_1$, $R_2$, $L_3$, $R_4$, $L_5$, $R_6$, . . . in practice) in the range from the first pixel $X_1$ to the sixth pixel $X_6$, and displays an image portion, corresponding to the seventh pixel $X_7$ to the 12th pixel $X_{12}$, of the two-dimensional image in the range of these pixels, as in the above-mentioned operation.

The spatial light modulation element 2 displays the second parallax barrier pattern $2_B$ (open, close, open, close, . . . ) on all the pixels from the first pixel $X_1$ to the 12th pixel $X_{12}$ on the fourth scan line Y4 in synchronism with the timing of the corresponding scan line of the display 1. FIG. 19B shows the state after similar scanning/display operations are performed up to the fifth scan line Y5.

FIG. 19C shows the state upon completion of the above-mentioned scanning/display operations up to the last scan line Y8.

On the region 41 for displaying a stereoscopic image, upon completion of a series of scanning operations (the rewrite display operations of all the scan lines) as in the first embodiment, the right and left parallax images $R_S$ and $L_S$ are displayed on all the pixels in the region 41. Therefore, this embodiment can realize the display operations of both a stereoscopic image and a non-stereoscopic image, and a high-resolution stereoscopic image free from crosstalk between the right and left images can be displayed in the stereoscopic display region 41.

Furthermore, since the parallax barrier pattern is displayed on the entire surface of the spatial light modulation element 2 in this embodiment, the arrangement of the barrier driving circuit can be simplified as compared to the seventh embodiment.

The above embodiments have exemplified the stereoscopic image display apparatuses based on the non-interlace driving method. However, a stereoscopic image display apparatus of the present invention can be constituted using an interlace driving method.

FIGS. 20A to 20D are explanatory views of the stereoscopic image display method of a stereoscopic image display apparatus according to the ninth embodiment of the present invention. The left drawing of each of FIGS. 20A to 20D shows the display state of the display 1, and the right drawing thereof shows the parallax barrier pattern to be formed on the spatial light modulation element 2. The arrangement of this embodiment is basically the same as that of the sixth embodiment. The difference between this embodiment and the sixth embodiment is that a stereoscopic image is displayed using an interlace scanning method in this embodiment. Other arrangements are the same as those in the sixth embodiment.

Figure 20A:
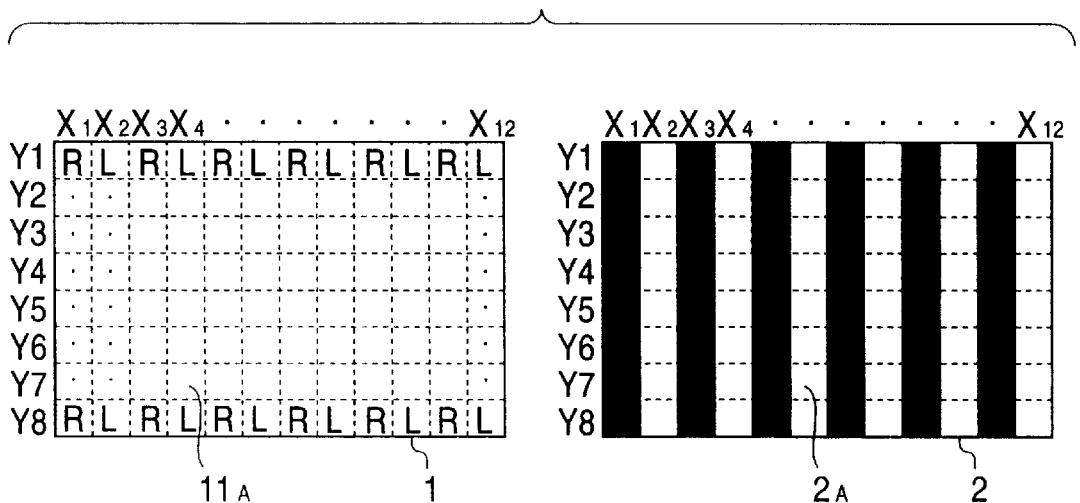
Figure 20B:
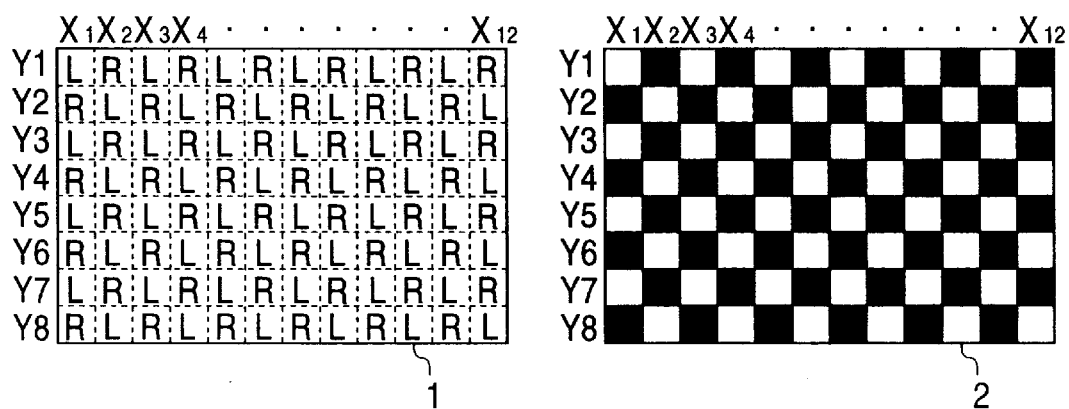
Figures 20C, 20D:
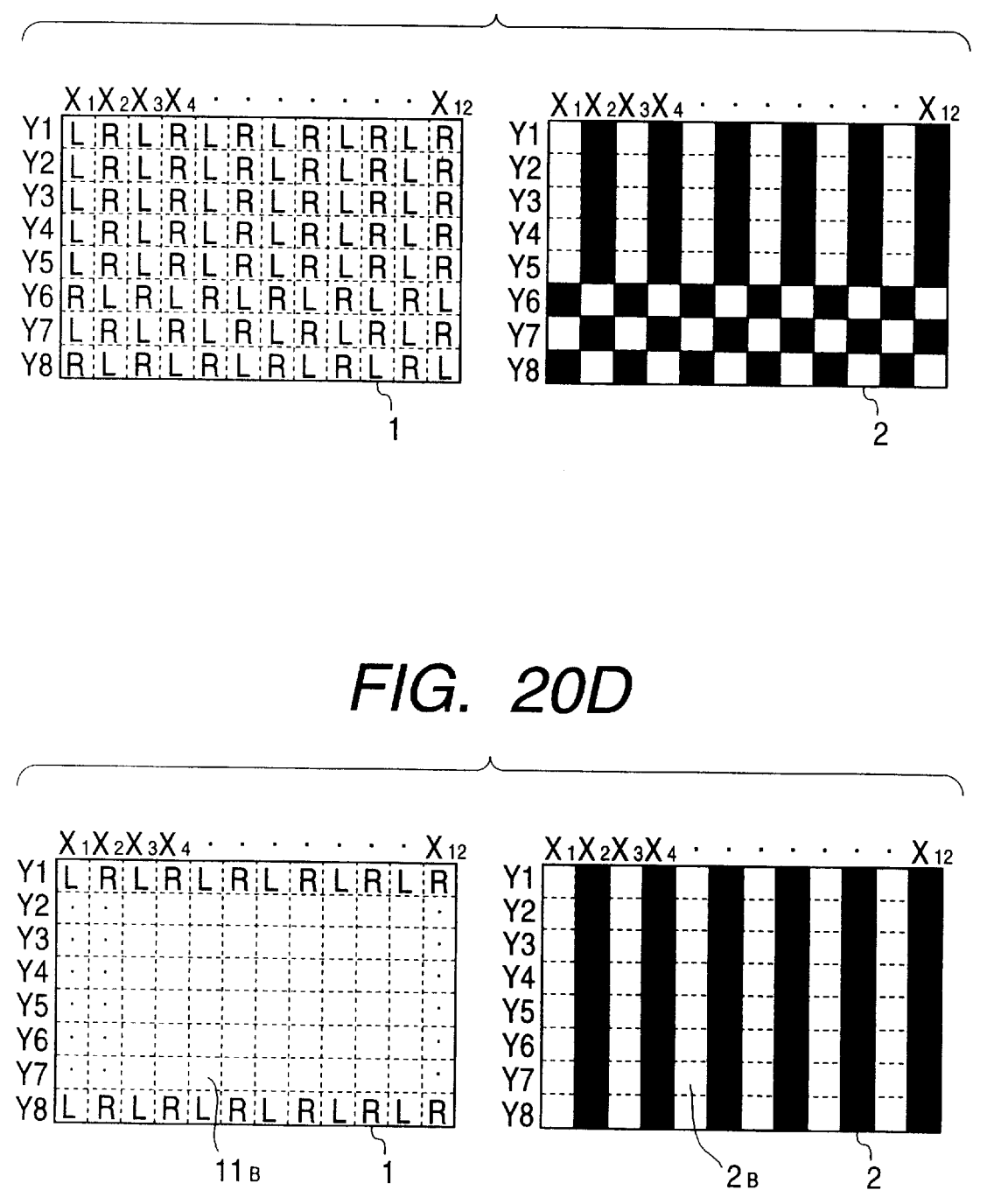

FIGS. 20A and 20D respectively show the same states as those shown in FIGS. 16A and 16C of the sixth embodiment. FIG. 20B shows the state upon completion of scanning of the odd scan lines of the display 1 and the spatial light modulation element 2 in this embodiment, and FIG. 20C shows the state upon completion of scanning of two lines (scan lines Y2 and Y4) of the even scan lines.

As shown in FIG. 20A, at a certain time (at the time of completion of scanning of the entire screen), the first stripe image $11_A$ obtained by arranging stripe pixels in the order of R, L, R, L, . . . (the stripe pixels will be simply abbreviated as above although they are $R_1$, $L_2$, $R_3$, $L_4$, . . . in practice) is displayed on the entire surface of the display 1, and the stripe-shaped first parallax barrier pattern $2_A$ (close, open, close, open, . . . ) is displayed on the spatial light modulation element 2.

Then, an odd scan line, e.g., the first scan line Y1, is selected, and the corresponding portion of the second stripe image $11_B$ obtained by arranging stripe pixels in the order of L, R, L, R, . . . (the stripe pixels will be simply abbreviated as above although they are $L_1$, $R_2$, $L_3$, $R_4$, ... in practice) is displayed on the portion of the first scan line Y1 on the display 1. At the same time, the corresponding portion of the stripe-shaped parallax barrier pattern $2_B$ (open, close, open, close, . . . ) is displayed on the portion of the first scan line Y1 of the spatial light modulation element 2. In this manner, the display driving operations of the display 1 and the spatial light modulation element 2 are synchronously performed in units of scan lines. FIG. 20B shows the display state at the time upon completion of scanning of all the odd scan lines after the above-mentioned operation is sequentially repeated for the scan lines.

Subsequently, an even scan line, e.g., the second scan line Y2, is selected, and the corresponding portion of the second stripe image $11_B$ obtained by arranging stripe pixels in the order of L, R, L, R, . . . is displayed on the portion of the second scan line Y2 on the display 1. At the same time, the corresponding portion of the second parallax barrier pattern $2_B$ (open, close, open, close, . . . ) is displayed on the portion of the second scan line Y2 of the spatial light modulation element 2. FIG. 20C shows the display state at the time upon completion of scanning of the fourth scan line Y4 after the above-mentioned operation is sequentially repeated for even scan lines.

FIG. 20D shows the state upon completion of the scanning/display operations of all the even scan lines. In this state, the display 1 displays the second stripe pattern $11_B$ which complements the first stripe image $11_A$ shown in FIG. 20A. On the other hand, the spatial light modulation element 2 displays the second parallax barrier pattern $2_B$.

Upon completion of a series of scanning operations (the rewrite display operations of all the scan lines), the right and left parallax images $R_S$ and $L_S$ are displayed on all the pixels of the display 1.

At this time, since the parallax barrier pattern is displayed in synchronism with a stripe image in units of scan lines, even when the observer observes the stripe image which is being rewritten or has been rewritten via the parallax barrier pattern, he or she can enjoy a stereoscopic view based on the principle of the parallax barrier method without causing any crosstalk, and can observe a stereoscopic image displayed on all the pixels of the display 1.

When the display operation is performed using the interlace driving method, odd and even scan lines can be alternately displayed in units of fields. For this reason, even when the display 1 and the spatial light modulation element 2 comprise liquid crystal elements with a slightly low display speed, a high-resolution stereoscopic image free from any flicker can be displayed.

This display method can be applied to the method for displaying a stereoscopic image on a portion on the screen of the display apparatus described in the seventh and eighth embodiments.

The interlace driving method can also be applied to the method of synchronously displaying a stripe image and a parallax barrier pattern in units of pixels in the first embodiment.

Figure 21:
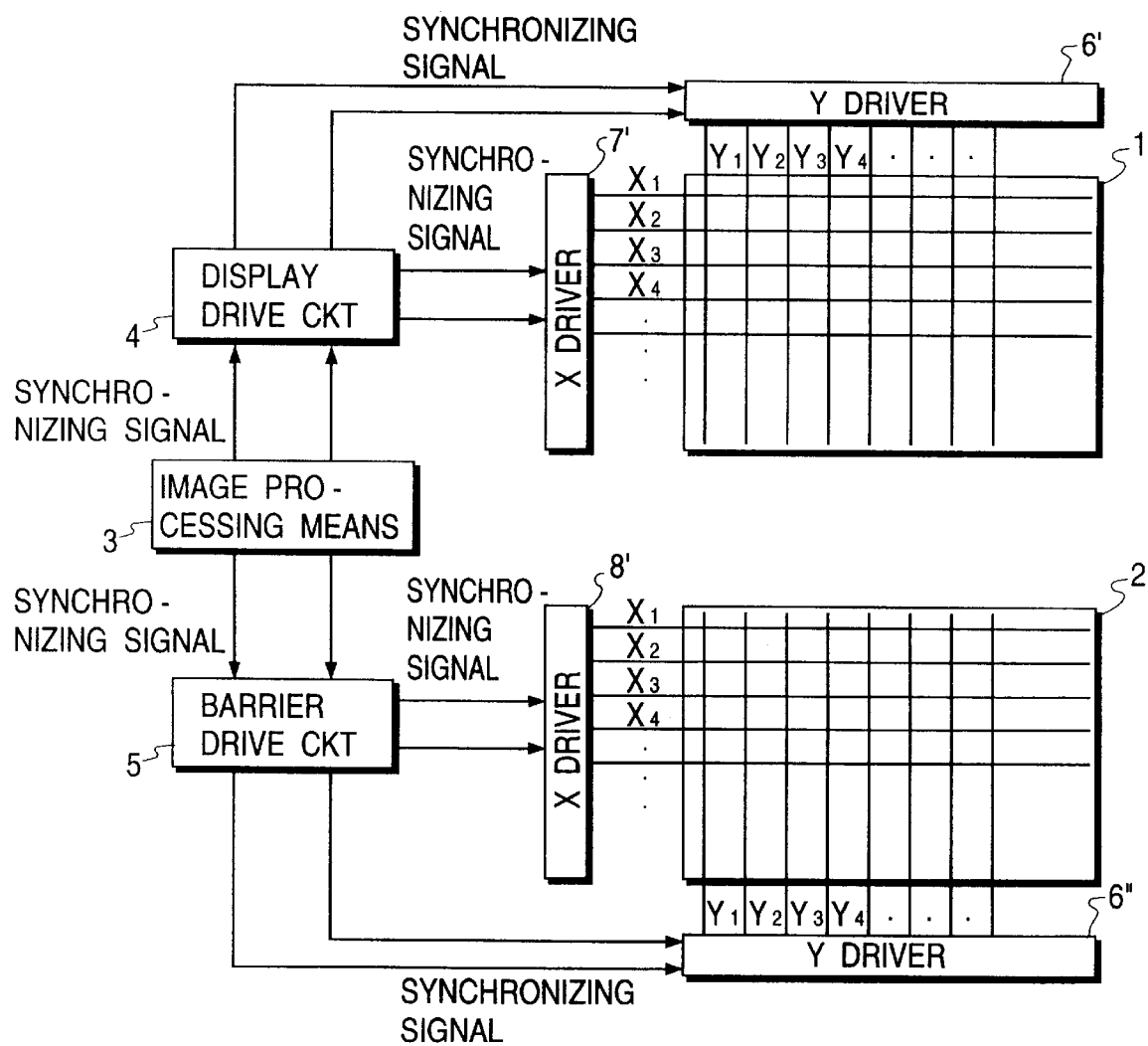
FIG. 21 is a schematic diagram showing principal part of a stereoscopic image display apparatus according to the 10th embodiment of the present invention.

FIG. 21 is a schematic diagram showing principal part of a stereoscopic image display apparatus according to the 10th embodiment of the present invention. FIGS. 22A and 22B are explanatory views of the stereoscopic image display method of this embodiment. Note that the layout of the display 1 and the spatial light modulation element 2 of this embodiment is the same as that in the sixth embodiment. This embodiment comprises the observation condition inputting means 9 and the parallax image source 15 as in the first embodiment although they are not shown. In this embodiment, the directions of the scan lines and data lines of the display 1 and the spatial light modulation element 2 are rotated by 90° as compared to the above embodiments. That is, in this embodiment, the scanning operation is performed in the vertical direction.

The display method will be explained below. As shown in FIG. 22A, the first scan line Y1 is selected at a certain time, and the display 1 displays stripe pixels $R_1$ of the right parallax image $R_S$ on all the pixels from the first pixel $X_1$ to the last pixel $X_8$ on its first scan line Y1. At this time, as shown in FIG. 22B, the spatial light modulation element 2 forms a light-shielding portion from the first pixel $X_1$ to the last pixel $X_8$ on its first scan line Y1. Then, the second scan line Y2 is selected, and the display 1 displays stripe pixels $L_2$ of the left parallax image $L_S$ on all the pixels from the first pixel $X_1$ to the last pixel $X_8$ on its second scan line Y2. In synchronism with this display operation, the spatial light modulation element 2 forms a light-transmission portion on all the pixels on it s second scan line Y2.

A similar driving operation is sequentially performed to display all the pixels. FIGS. 22A and 22B show the state upon completion of scanning of the seventh scan line Y7.

In this embodiment, as described above, since the stripe image $11_A$ or $11_B$ and the parallax barrier pattern $2_A$ or $2_B$ are formed in synchronism with each other in units of scan lines Yi of the display 1 and the spatial light modulation element 2, the observer can observe a stereoscopic image free from any crosstalk.

As can be seen from FIGS. 22A and 22B, when the scan lines are set in the vertical direction as in this embodiment, a stripe image portion or a parallax barrier pattern portion to be displayed on each scan line can be defined by only stripe pixels $R_i$ or $L_i$ of one of the right and left parallax images $R_S$ and $L_S$, or the light-transmission portion or the light-shielding portion. For this reason, unlike in the above embodiments, stripe pixels need not be alternately arranged and displayed like R, L, R, L, R, L, . . . along one scan line, nor the light-shielding portions and the light-transmission portions need be alternately formed and displayed, thus simplifying the display circuit.

In this embodiment, the display 1 and the spatial light modulation element 2 are driven in accordance with synchronizing signals supplied from the image processing means 3. However, various other driving methods may be used. For example, the display driving circuit 4 may generate a synchronizing signal to determine the driving timing of the barrier driving circuit 5, or the Y drivers may attain synchronization.

This embodiment adopts a driving method similar to the non-interlace driving method for sequentially performing scanning from the first scan line Y1. However, an interlace driving method for displaying odd scan lines, and then displaying even scan lines may be used.

Figure 23:
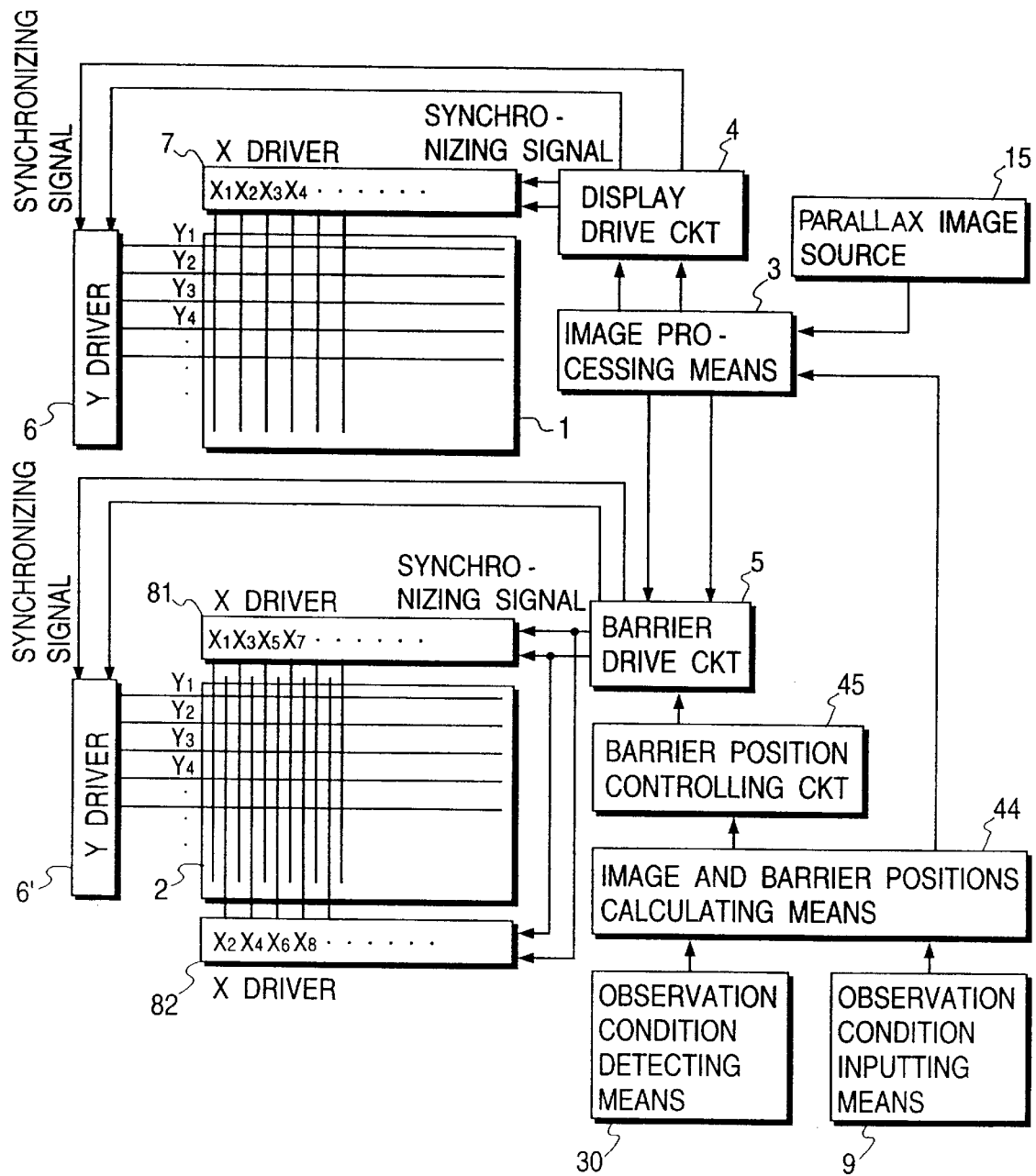
FIG. 23 is a schematic diagram showing principal part of a stereoscopic image display apparatus according to the 11th embodiment of the present invention.

FIG. 23 is a schematic diagram showing principal part of a stereoscopic image display apparatus according to the 11th embodiment of the present invention. This embodiment presents a developed form of the sixth embodiment. That is, in this embodiment, the view point position of the observer is detected, and the relative positional relationship between the parallax barrier pattern and the stripe image to be displayed on the display 1 is controlled in accordance with the view point position of the observer, thus allowing a stereoscopic view over a broad range.

Referring to FIG. 23, the observation condition detecting means 30 (described above in the third embodiment) picks up an image of the observer using a camera, extracts the images of the eyes of the observer by performing image processing of the input images, and detects the view point position of the observer. The observation condition inputting means 9 is used for manually inputting the view point position of the observer as needed. An image and barrier positions calculating means 44 calculates an optimal relative positional relationship between the parallax barrier pattern and the stripe image to be displayed on the display 1 on the basis of the view point position information input from the observation condition detecting means 30 or the observation condition inputting means 9, and outputs a signal to a barrier position controlling circuit 45 and the image processing means 3. The barrier position controlling circuit 45 controls the barrier driving circuit 5 on the basis of the input signal so as to form an optimal parallax barrier pattern on the spatial light modulation element 2.

The spatial light modulation element 2 is driven by X drivers 81 and 82. The X driver 81 drives odd pixels, and the X driver 82 drives even pixels.

The operation of this embodiment will be described below. Referring to FIG. 23, the observation condition detecting means 30 or the observation condition inputting means 9 inputs the view point position information of the observer to the image and barrier positions calculating means 44. The image and barrier positions calculating means 44 calculates an optimal relative positional relationship between the stripe image 11 to be displayed on the display 1 and, for example, the light-transmission portions of the parallax barrier pattern to be formed on the spatial light modulation element 2 on the basis of the input view point position information, and outputs a signal to the barrier position controlling circuit 45 and the image processing means 3. The barrier position controlling circuit 45 controls the barrier driving circuit 5 on the basis of the input signal to form the parallax barrier pattern at an optimal position on the spatial light modulation element 2.

At the same time, the image processing means 3 displays the stripe image at an optimal position on the display 1 on the basis of the signal input form the image and barrier positions calculating means 44.

Figure 24A:
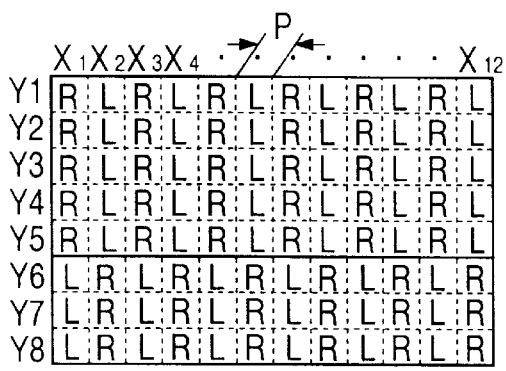
FIGS. 24A to 24C are explanatory views of the stereoscopic image display method of the 11th embodiment.
Figure 24B:
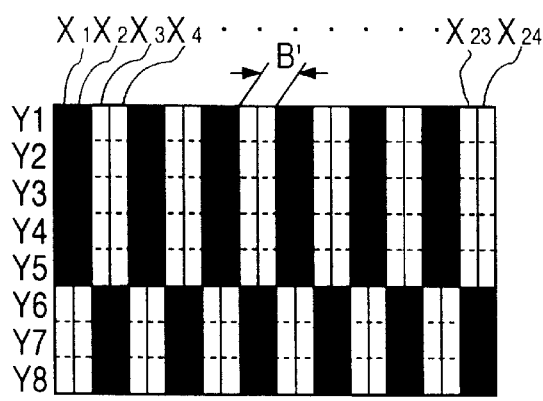
Figure 24C:
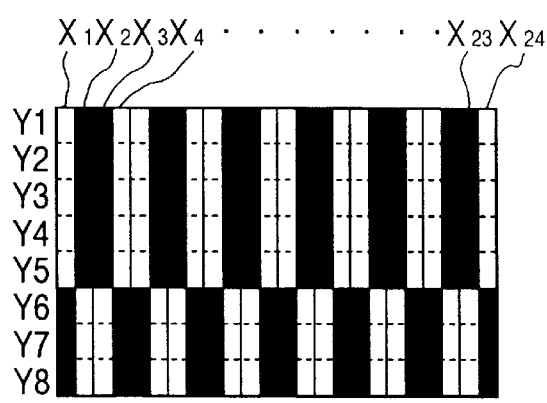

FIGS. 24A to 24C show the display state (FIG. 24A) of the display 1 when the display is driven by the non-interlace method, and the parallax barrier pattern (FIG. 24B) formed on the spatial light modulation element 2.

FIG. 24C shows the driving state wherein when the observer moves in the right-and-left direction, the view point position after the movement is detected, and the position of the parallax barrier pattern to be formed on the spatial light modulation element 2 is shifted by one pixel in the right-and-left direction. Note that FIGS. 24A to 24C show the display states at the time upon completion of scanning of the fifth scan line Y5.

In this embodiment, the width P of each stripe pixel to be displayed on the display 1 is set to be equal to the one-pixel width of the display 1, and the width B' of the light-transmission portion or the light-shielding portion of the parallax barrier pattern to be formed on the spatial light modulation element 2 is set to be equal to the two-pixel width of the spatial light modulation element 2.

Figure 25A:
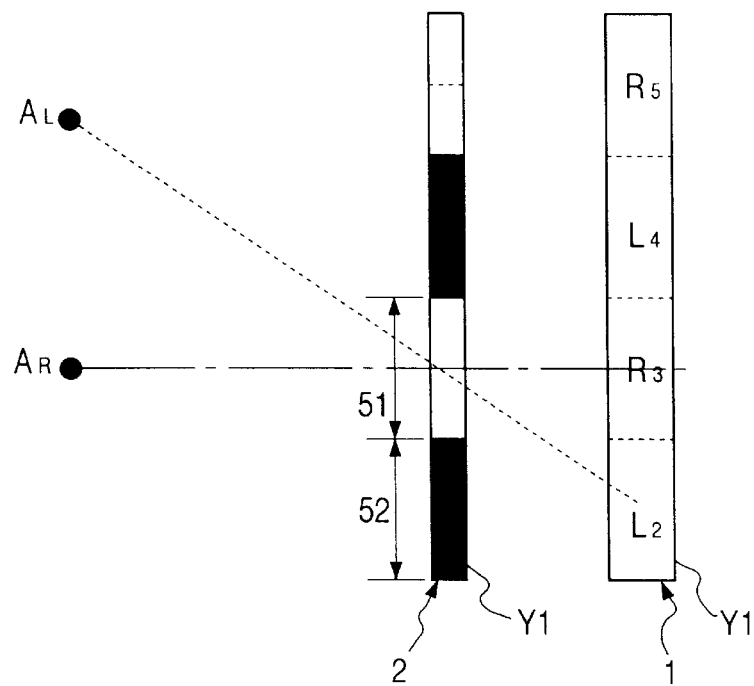
FIGS. 25A and 25B are explanatory views of movement of a parallax barrier pattern in correspondence with movement of the view point position in the 11th embodiment.
Figure 25B:
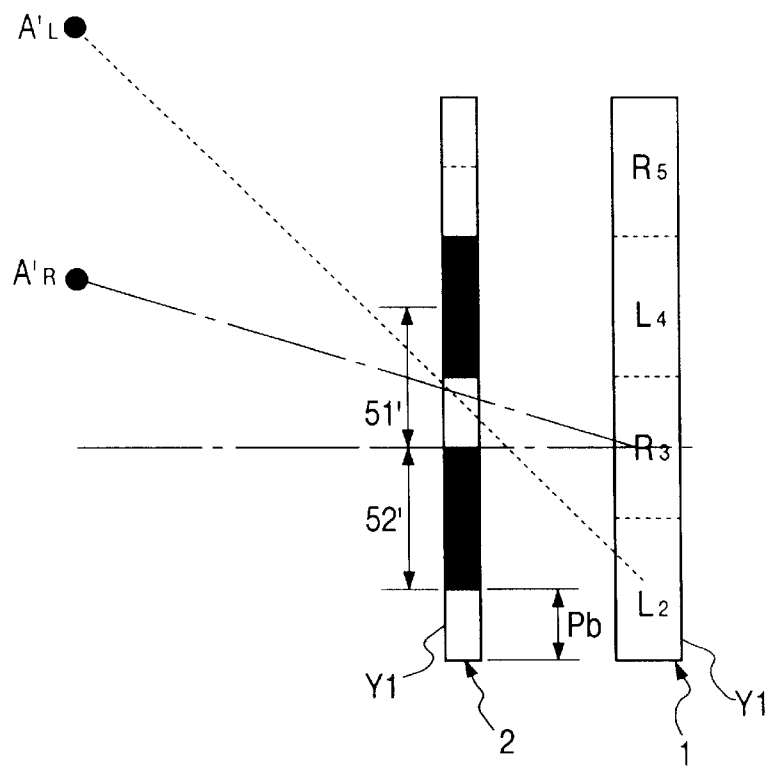

FIGS. 25A and 25B are explanatory views of the movement of the parallax barrier pattern in correspondence with the movement of the view point position in this embodiment. FIGS. 25A and 25B show the relationship among the stripe image, the parallax barrier pattern, and the view point position of the observer in a certain portion along the first scan line Y1.

A case will be explained below wherein the stripe image to be displayed on the display 1 is fixed in position, and the positions of the light-transmission portions of the parallax barrier pattern to be formed on the spatial light modulation element 2 are controlled to optimal positions, upon movement of the observer. As shown in FIG. 25A, the observer observes a right stripe pixel $R_3$ via a light-transmission portion 51 with his or her eight eye $A_R$, and observes a left stripe pixel $L_2$ via the light-transmission portion 51 with his or her left eye $A_L$, thus observing a stereoscopic image.

Assume that the eyes of the observer move from this state to positions $A'_R$ and $A'_L$ in the right-and-left direction, as shown in FIG. 25B. A light-transmission portion 51' of the parallax barrier pattern is formed on the spatial light modulation element 2 upon being moved in the right-and-left direction by a width Pb of one pixel of the spatial light modulation element 2. The driving operation of the scan line is performed in synchronism with the scanning operation of the display 1, as described in the above embodiments. With this operation, the observer observes the right stripe pixel $R_3$ via the light-transmission portion 51' with his or her right eye $A'_R$, and observes the left stripe pixel $L_2$ via the light-transmission portion 51' with his or her left eye $A'_L$, thus observing a stereoscopic image.

At this time, the light-transmission portion or light-shielding portion of the parallax barrier pattern to be formed on the spatial light modulation element 2 is preferably constituted by a plurality of pixels of the spatial light modulation element 2, since the parallax barrier pattern can then be moved at a fine pitch.

In contrast to the above description, when the view point position moves, the positions of the light-transmission portions of the parallax barrier pattern may remain the same, and the position of the stripe image to be displayed on the display 1 may be shifted in the right-and-left direction. At this time, the width of each stripe pixel to be displayed on the display 1 is preferably constituted by a plurality of pixels of the display 1. That is, the display width P of each stripe pixel to be displayed on the display 1 is set to be equal to the total width of a plurality of pixels of the display 1.

As described above, in this embodiment, even when the view point of the observer moves, the observation condition detecting means automatically detects the view point position of the observer to control the display position of the stripe image and the formation position of the parallax barrier pattern, so that the right and left parallax images can always be normally observed from the view point position of the observer. For this reason, the observation range of a stereoscopic image can be broadened very much. That is, in this embodiment, at least one of the constituting elements of the stripe image and the parallax barrier pattern is controlled in accordance with the signal from the observation condition detecting means or the observation condition inputting means so as to move the observation range of a stereoscopic image in correspondence with the movement of the view point position of the observer.

Note that the observation condition detecting means 30 may use a method for obtaining distance information on the basis of the principle of trigonometrical measurement using a plurality of cameras, and detecting the view point position of the observer.

Alternatively, a magnetic field may be formed around the observer, a magnetic sensor may be attached to the head portion of the observer, and the output from this sensor may be used. In addition to the above-mentioned observation condition detecting means, the observer himself or herself may control, e.g., an adjustment switch while observing the displayed image.

Figure 26:
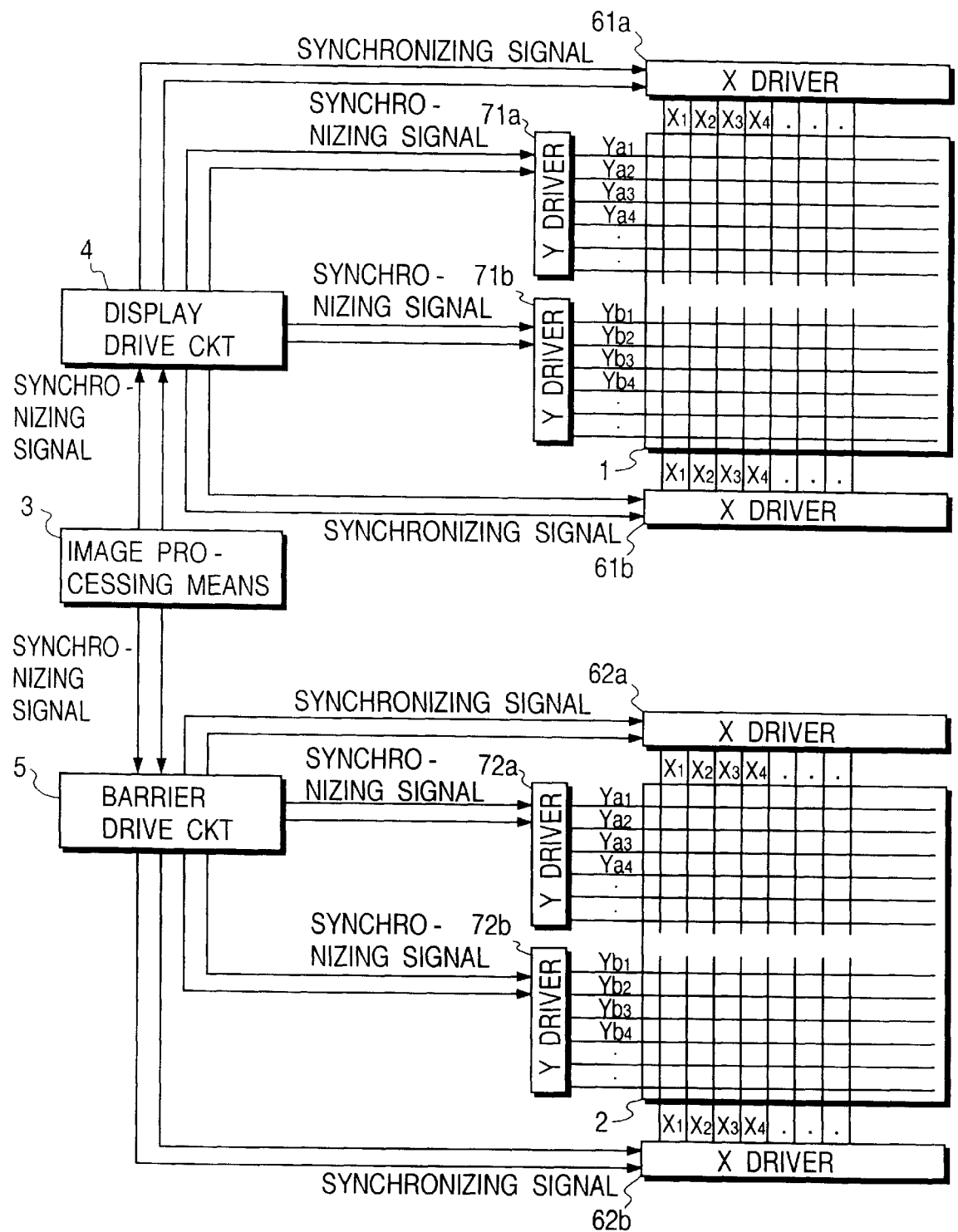
FIG. 26 is a schematic diagram showing principal part of a stereoscopic image display apparatus according to the 12th embodiment of the present invention.
Figures 27A, 27B:
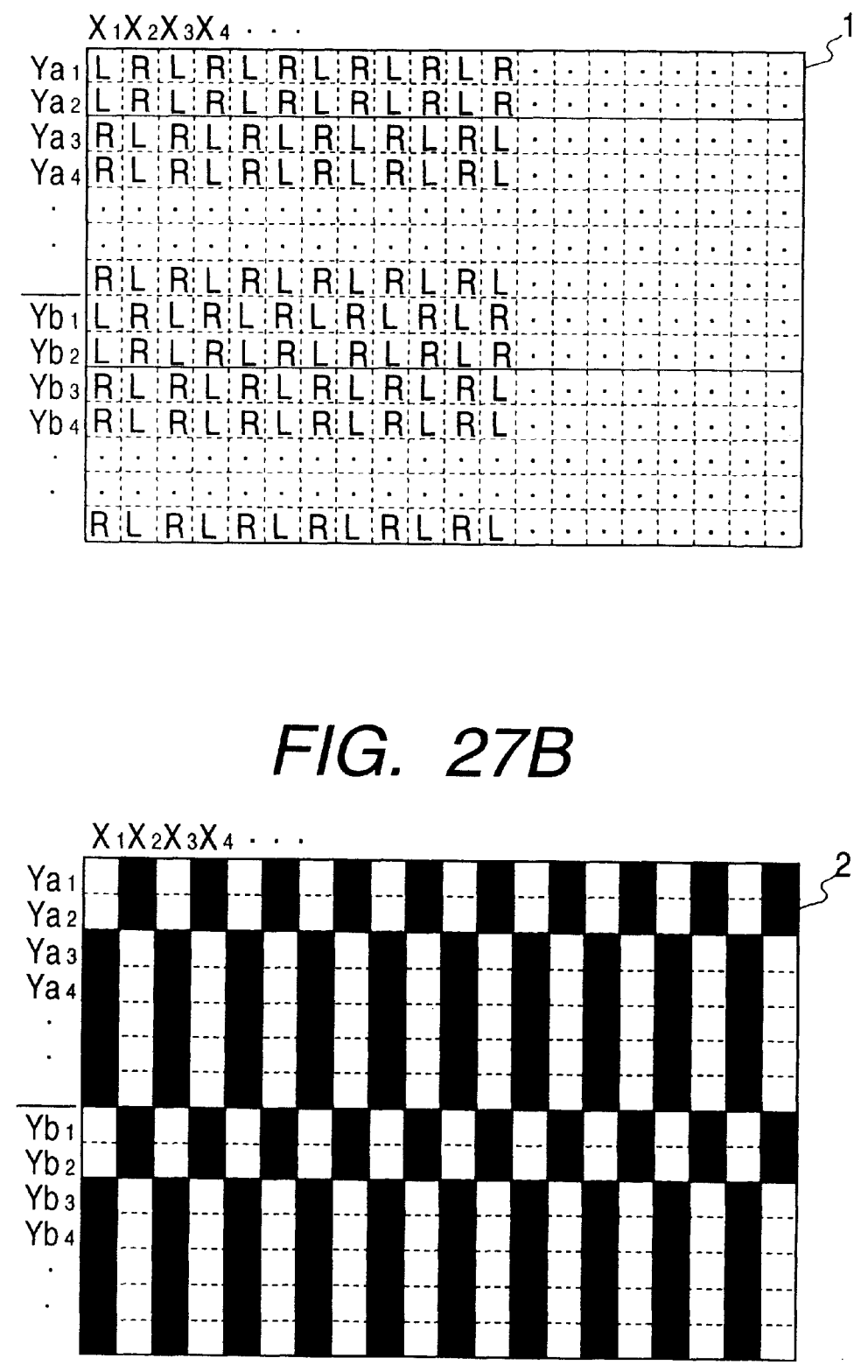

FIG. 26 is a schematic diagram showing principal part of a stereoscopic image display apparatus according to the 12th embodiment of the present invention. The arrangement of this apparatus is substantially the same as that of the sixth embodiment, except for the driving circuits for the display 1 and the spatial light modulation element 2. Note that the observation condition inputting means 9 and the parallax image source 15 are not shown. This embodiment is different from the sixth embodiment in that two X drivers and two Y drivers are arranged for each of the display 1 and the spatial light modulation element 2, and each display screen is two-divisionally driven. For example, when VGA (640× 480 pixels) liquid crystal displays are used as the display 1 and the spatial light modulation element 2, each of these liquid crystal displays is divided into two portions (each having 320 scan lines) to be driven by Y drivers 71a and 71b or 72a and 72b. In this embodiment, the non-interlace driving method is used, and FIGS. 27A and 27B show the display states of the display 1 and the spatial light modulation element 2 of this embodiment.

At a certain scan time, the display 1 receives an image signal on the basis of a synchronizing signal from the image processing means 3, and displays a stripe image generated based on the right and left parallax images. FIG. 27A shows the state upon completion of scanning of the second scan lines Ya2 and Yb2 of the Y drivers 71a and 71b.

The display method will be described below. Assume that the first stripe image $11_A$ obtained by arranging stripe pixels in the order of $R_1, L_2, R_3, L_4, \ldots$ is displayed on the entire surface of the display 1 at a certain time (at the time of completion of scanning of the entire screen). When first scan lines Ya1 and Yb1 of the Y drivers 71a and 71b are selected and scanned again, the corresponding portions of the second stripe image $11_B$ obtained by arranging stripe pixels in the order of $L_1, R_2, L_3, R_4, \ldots$ are displayed on these scan lines. Subsequently, second scan lines Ya2 and Yb2 are selected, and the corresponding portions of the second stripe image $11_B$ are displayed on these scan lines. FIG. 27A shows the state at that time.

A parallax barrier pattern is similarly formed on the spatial light modulation element 2. That is, at a certain time (at the time of completion of scanning of the entire screen), the stripe-shaped first parallax barrier pattern $2_A$ obtained by arranging the light-transmission portions and the light-shielding portions in the order of close, open, close, open, . . . is displayed on the spatial light modulation element 2. When first scan lines Ya1 and Yb1 of the Y drivers 72a and 72b are selected and scanned again, the corresponding portions of the stripe-shaped second parallax barrier pattern $11_B$ obtained by arranging the light-transmission portions and the light-shielding portions in the order of open, close, open, close, . . . are displayed on these scan lines. Subsequently, second scan lines Ya2 and Yb2 are selected and scanned, and the corresponding portions of the second parallax barrier pattern $11_B$ are displayed on these scan lines. FIG. 27B shows the state at that time.

At this time, the second scan lines Ya2 and Yb2 of the Y drivers 71a and 71b, and 72a and 72b of the display 1 and the spatial light modulation element 2 are synchronously driven by the image processing means 3. That is, in this embodiment, four scan lines are scanned at the same time. For this reason, two each data lines (X drivers) are provided in correspondence with the Y drivers.

As described above, when the display screens of the display 1 and the spatial light modulation element 2 are two-divisionally driven, the display operation can be attained at a doubled driving speed, and a stereoscopic image from which flicker noise can be further eliminated as compared to the sixth embodiment and the like can be displayed.

In this embodiment, the display 1 and the spatial light modulation element 2 are synchronously driven in units of scan lines but may be synchronously driven in units of pixels as in the first embodiment.

Figures 28A, 28B:
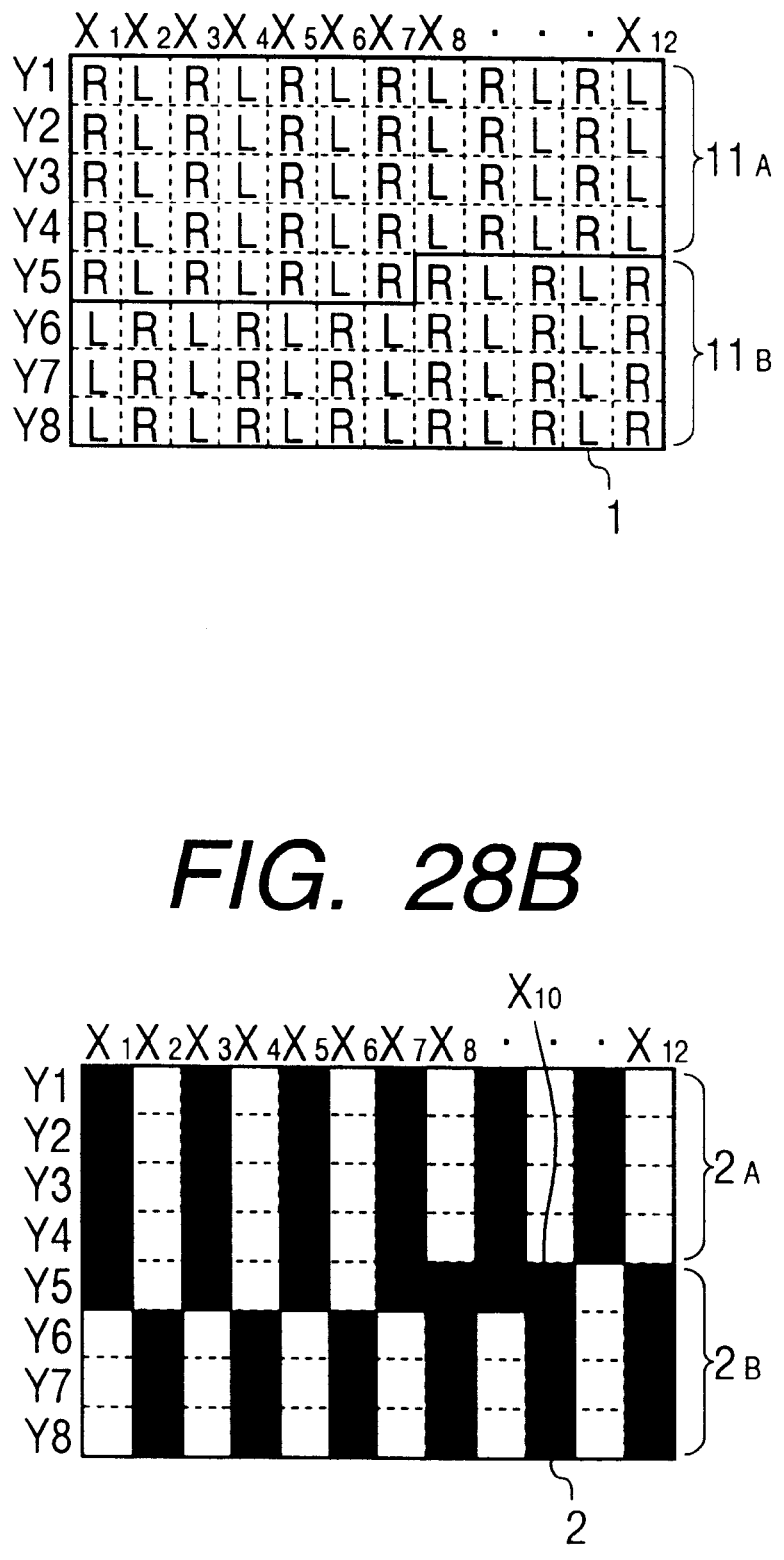

FIGS. 28A and 28B are explanatory views of the display states of a stereoscopic image display apparatus according to the 13th embodiment of the present invention. FIGS. 28A and 28B respectively show the display states of the display 1 and the spatial light modulation element 2. The arrangement of this embodiment is basically the same as that of the first embodiment. However, in this embodiment, when the display 1 and the spatial light modulation element 2 are synchronously driven in units of pixels, the light-shielding portion (close) is precedently displayed across several pixels on the spatial light modulation element 2.

As shown in FIG. 28A, the display 1 displays the corresponding portion of the first stripe image $11_A$ obtained by arranging stripe pixels in the order of $R_1, L_2, R_3, L_4, R_5, L_6, \ldots$ (R, L, R, L, R, L, . . . in FIG. 28A) on the first scan line Y1. At the same time, as shown in FIG. 28B, the spatial light modulation element 2 displays the corresponding portion of the first parallax barrier pattern $2_A$ obtained by alternately arranging the light-shielding portions and the light-transmission portions in the order of close, open, close, open, close, open, . . . on the first scan line Y1. In the case of the non-interlace driving method, the second scan line Y2 is selected, and the corresponding portions of the first stripe image $11_A$ and the first parallax barrier pattern $2_A$ are displayed as in the first scan line. This operation is sequentially repeated to display the first stripe image $11_A$ on the entire display surface. When this image is observed via the first parallax barrier pattern $2_A$, a stereoscopic image can be observed.

FIGS. 28A and 28B illustrate the display state wherein the fifth scan line Y5 is selected before completing all the scanning operations, pixel data of the seventh pixel $X_7$ is displayed on the display 1 (FIG. 28A), and the parallax barrier pattern is formed on the spatial light modulation element 2 (FIG. 28B).

In this embodiment, at this time, as shown in FIG. 28B, the light-shielding portion (close) is precedently displayed across several pixels (three pixels, i.e., the eighth pixel $X_8$ to the 10th pixel $X_{10}$ on the fifth scan line Y5) preceding to the seventh pixel $X_7$ on the fifth scan line Y5 of the spatial light modulation element 2, and pixel data up to the 10th pixel $X_{10}$ on the fifth scan line Y5 of the spatial light modulation element 2 are displayed as a light-shielding portion.

As described above, when the stripe image and the corresponding parallax barrier pattern are synchronously displayed in units of pixels, the light-shielding portion (close) is precedently displayed across several pixels (in this case, three pixels), thus further reducing crosstalk between the right and left stripe pixels.

In particular, when the display 1 and the spatial light modulation element 2 use liquid crystal panels with different characteristics, even when they have different driving speeds for one scan line, crosstalk between the right and left images can be reduced. Conversely, in terms of the driving operations of the liquid crystal panels, a large driving margin for synchronously driving the two panels can be assured.

Of course, this method can be applied to the sixth embodiment and the like for synchronously performing the driving operations in units of scan lines, in addition to this embodiment. In this case, a light-shielding portion (close) can be precedently displayed across several scan lines.

Figure 29:
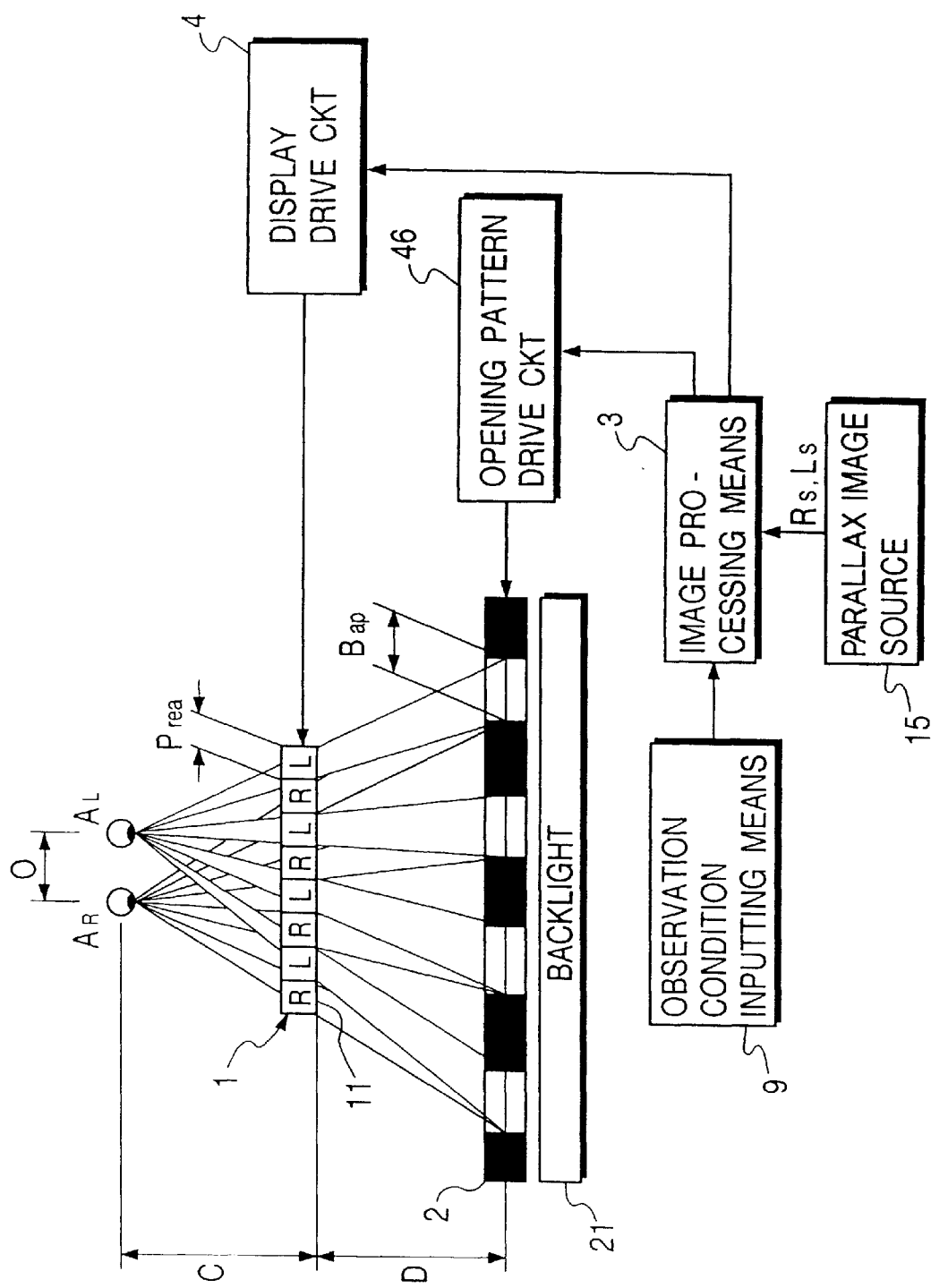
FIG. 29 is a schematic diagram showing principal part of a stereoscopic image display apparatus according to the 14th embodiment of the present invention.

FIG. 29 is a schematic diagram showing principal part of a stereoscopic image display apparatus according to the 14th embodiment of the present invention. In the above embodiments, the spatial light modulation element 2 on which the parallax barrier pattern is formed is arranged on the front side (the observer side) of the display 1 to observe a stereoscopic image. However, in this embodiment, the spatial light modulation element 2 is arranged on the rear side of the display 1 to form a slit pattern having predetermined light-transmission portions (slit portions) and light-shielding portions, and a stereoscopic image is observed by controlling the transmission portions of light emitted by the backlight (light source means) 21.

The arrangement of this apparatus will be explained below. Let O be the interval (base length) between the two eyes of the observer, C be the observation distance, D be the interval between the display 1 and the spatial light modulation element 2 for forming the parallax barrier pattern, $B_{ap}$ be the width of each slit portion of the slit pattern, and $P_{rea}$ be the pixel interval (pixel width) of the stripe image to be displayed on the display 1. In this case, in formulas (1) and (2) described in the first embodiment, $P_{rea}$ replaces B', and $B_{ap}$ replaces P. Thus, when these parameters satisfy the following relations, a stereoscopic view can be attained.

$$D = B_{ap} \cdot C/(O + B_{ap}) \quad (5)$$

$$P_{rea} = B_{ap} \cdot (C-D)/C \quad (6)$$

Note that the observation width has a finite divergence at the observation position in practice, and these quantities are set after they are slightly modified.

The stereoscopic image display method of this embodiment will be described below. The stripe image $11_A$ or $11_B$ is formed based on images from the parallax image source 15 shown in FIG. 29 and is displayed on the display 1 by the same method as in the first embodiment. On the other hand, the image processing means 3 inputs pixel data of the slit pattern $2_A$ or $2_B$ to a slit pattern drive circuit 46 in synchronism with the output stripe image data, thereby displaying the stripe-shaped slit pattern $2_A$ or $2_B$ by alternately forming light-shielding portions and light-transmission portions each having the slit width $B_{ap}$ on the spatial light modulation element 2.

Light emitted by the backlight 21 is transmitted through the light-transmission portions of the spatial light modulation element 2, illuminates stripe pixels $R_i$ on the display 1, and then becomes incident on the right eye $A_R$ of the observer. Similarly, light emitted by the backlight 21 and transmitted through the light-transmission portions of the spatial light modulation element 2 illuminates stripe pixels $L_i$ on the display 1, and becomes incident on the left eye $A_L$ of the observer. Thus, the observer observes the corresponding parallax images by his or her right and left eyes, and can stereoscopically observe the stripe image 11.

At this time, as the driving circuits for the display 1 and the spatial light modulation element 2, the circuit arrangement shown in FIG. 3 is used. With this arrangement, the display 1 and the spatial light modulation element 2 can be synchronously driven in units of pixels. In addition, since the stripe image and the corresponding slit pattern are always synchronously displayed, crosstalk between the right and left parallax images can be reduced.

Of course, the synchronous driving operation in units of scan lines may be used in addition to the method of this embodiment, and the display methods described in the embodiments described so far may be used.

Figure 30:
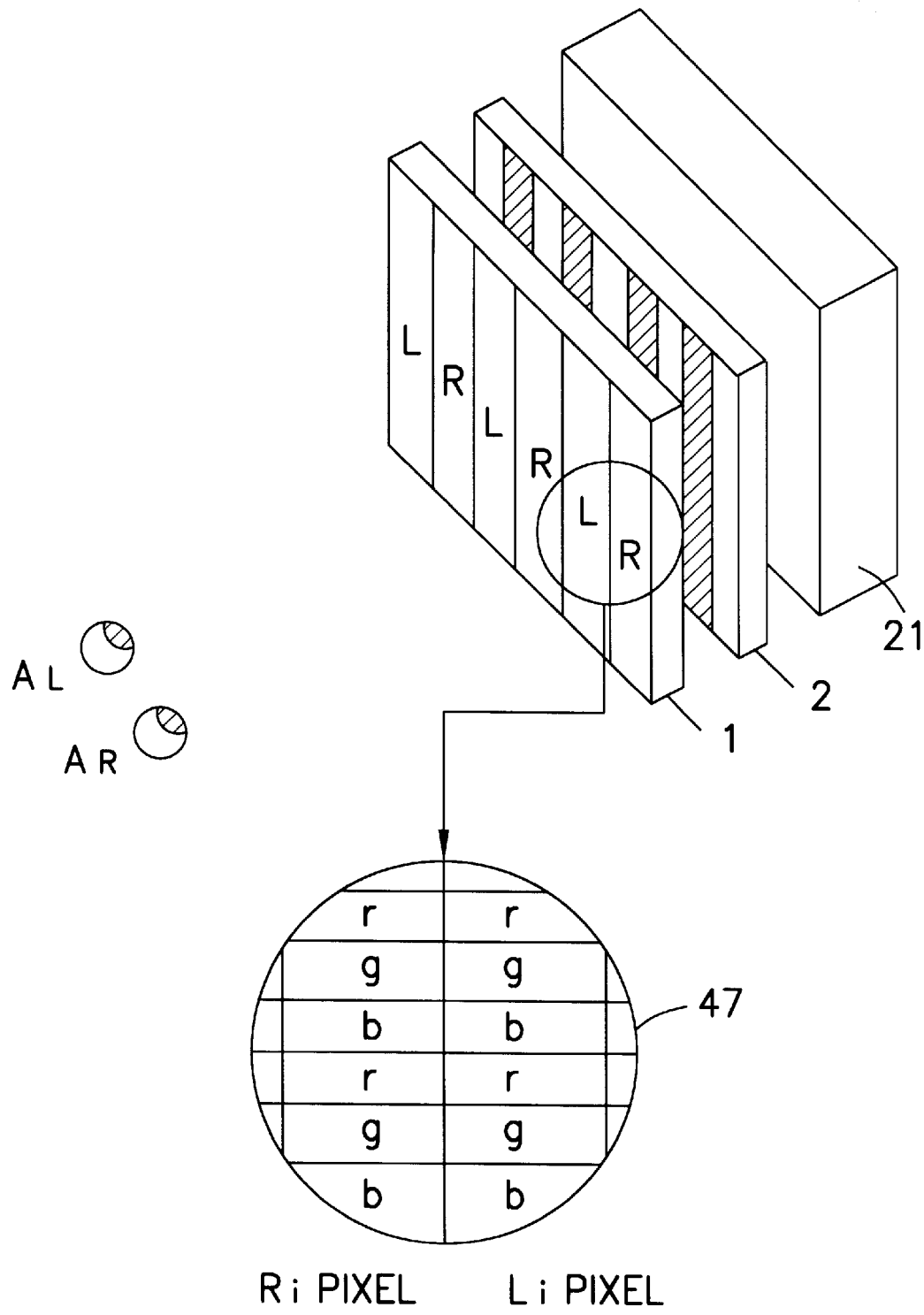
FIG. 30 is a perspective view of the 14th embodiment.

FIG. 30 is a perspective view of the stereoscopic image display apparatus of this embodiment. In this embodiment, the display apparatus performs a color display operation. In order to perform a color display operation in this embodiment, each of stripe pixels $R_i$ and $L_i$ can be controlled to correspond to one color pixel. However, when a known liquid crystal element having a vertical stripe type color filter layout is used, red, green, and blue colors deviate at the observation position, resulting in poor color reproducibility. In view of this problem, as indicated by an enlarged portion 47 in FIG. 30, red (r), green (g), and blue (b) color filters having a horizontal stripe structure are formed on the surface of a transmission type liquid crystal element used as the display 1, thus obtaining good color reproducibility.

FIGS. 31A and 31B are schematic views showing principal part of a stereoscopic image display apparatus according to the 15th embodiment of the present invention. In this embodiment, the apparatus is arranged by adding a linear Fresnel lens 48 to the above-mentioned embodiments. As shown in FIGS. 31A and 31B, the positional relationship between the display 1 and the spatial light modulation element 2 is not particularly limited, and the operation and the display principle of this apparatus are as described above.

The arrangement of this embodiment will be described below. In the above embodiments, the respective elements of the display 1 and the spatial light modulation element 2 are associated with each other to satisfy formulas (1) and (2) or (5) and (6), and the pixel width of the display 1 is different from that of the spatial light modulation element 2.

In this embodiment, the pixel pitch is adjusted using a linear Fresnel lens (cylindrical Fresnel lens) having a power in only the horizontal direction, and the display 1 and the spatial light modulation element 2 can use liquid crystal elements having the same specifications. Since the principle of stereoscopic view and the driving methods are the same as those in the above embodiments, a detailed description thereof will be omitted.

In FIGS. 31A and 31B, the linear Fresnel lens (cylindrical Fresnel lens) has a power in only the horizontal direction. A case will be exemplified below wherein the linear Fresnel lens 48 is arranged on the front side (the observer side) of the spatial light modulation element 2 for forming the parallax barrier pattern, as shown in FIG. 31A.

Let f be the focal length of the linear Fresnel lens 48, O be the interval (base length) between the two eyes of the observer, and $P_{LCD}$ be the pixel interval (pixel width) of the stripe image 11 displayed on the display 1 (this width is equal to that of each of the light-transmission portions and light-shielding portions formed on the spatial light modulation element 2). When the interval, $d_1$, between the display 1 and the spatial light modulation element 2 satisfies the following relation, a stereoscopic view can be obtained:

$$d_i = P_{LCD}/(O/f) \qquad (7)$$

In this embodiment, since the display 1 and the spatial light modulation element 2 use identical liquid crystal elements each having a pixel size of 0.110 mm (horizontal)× 0.330 mm (vertical), and one color pixel size is set to be the width of each stripe pixel and the width of each of the light-transmission portion and the light-shielding portion, $P_{LCD}$=0.110 mm. If the base length and the observation distance are respectively set to be O=65 mm and C=f=500 mm, a value $d_1$=2.5385 mm is obtained. Note that this value is finely adjusted in consideration of divergence of the observation width.

In this embodiment, when the display 1 and the spatial light modulation element 2 are synchronously driven in units of pixels or scan lines, since the stripe image and the corresponding slit pattern can always be synchronously displayed at any timing, the same display method as in the above embodiments can be adopted, and crosstalk between the right and left parallax images can be reduced.

Figure 32A:
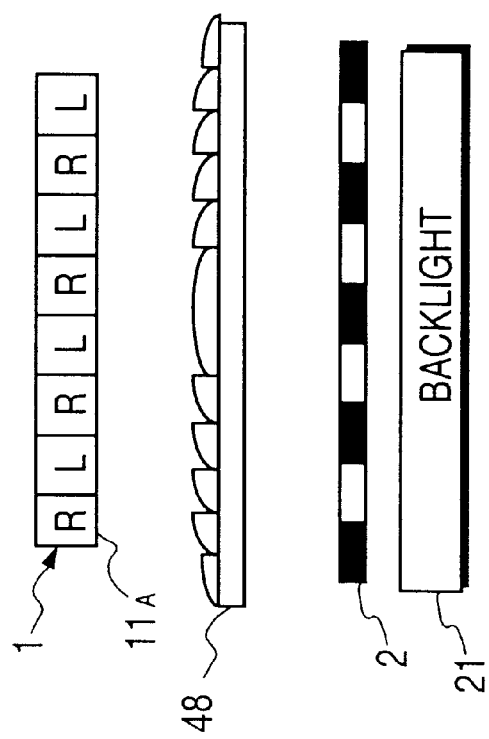
FIGS. 32A and 32B are schematic views showing principal part of another arrangement of the 15th embodiment.
Figure 32B:
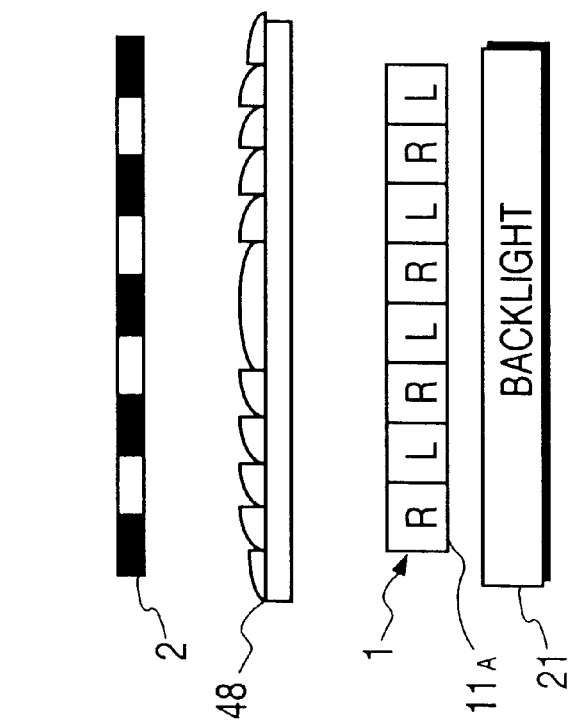
Figure 34:
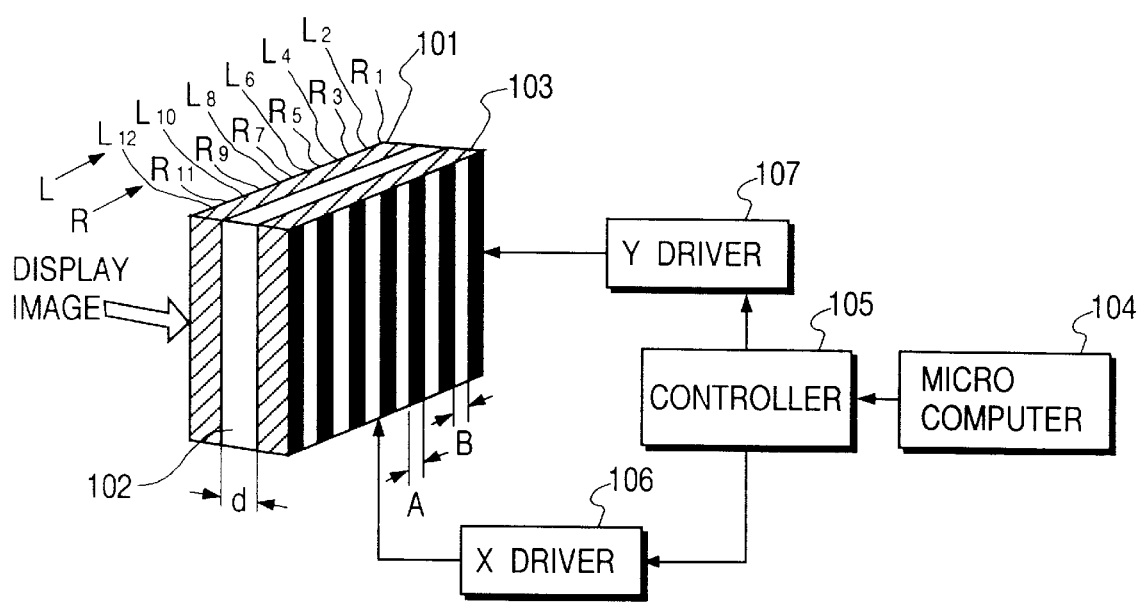
FIG. 34 is a schematic diagram showing a conventional stereoscopic image display apparatus.

FIGS. 32A and 32B are schematic views showing principal part of another arrangement of the 15th embodiment. In this modification, the linear Fresnel lens 48 is arranged between the display 1 and the spatial light modulation element 2.

FIG. 33 shows the optical layout of this modification. The operation of this modification will be explained below with reference to FIG. 33. Let S be the distance from the principal point of the linear Fresnel lens 48 to the first conjugate point (where the right or left eye $A_R$ or $A_L$ of the observer is located), S' be the distance from the principal point of the linear Fresnel lens 48 to the second conjugate point, d be the distance from the principal point of the linear Fresnel lens 48 to the display surface of the display 1 (or the spatial light modulation element 2), and d' be the distance from the principal point of the linear Fresnel lens 48 to the display surface of the spatial light modulation element 2 (or the display 1). Assuming that S=C (observation distance)=500 mm, if d=d' is set when f=250, the display 1 and the spatial light modulation element 2 can be constituted by liquid crystal elements having the same pixel widths.

However, the thickness of a cover glass of the liquid crystal element used in this modification is about 1.35 mm (including the polarizing plate), and the thickness of the linear Fresnel lens is 2 mm. If the refractive index of these elements is assumed to be 1.5, at least 2.23 mm (air conversion) are required as the interval between the principal point of the linear Fresnel lens and the display surface of the liquid crystal display. Thus, in this modification as well, when liquid crystal elements having a pixel size of 0.11 mm×0.33 mm are used, and C=500 mm is set, d=d'=2.5385/2=1.2693 mm is obtained from the required panel interval $d_1$=2.5385 mm. As a result, an equal-magnification layout cannot be adopted.

In this case, since the conditions that $d_1$=d←d', d'=S'/S d and 1/f=1/S+1/S' are satisfied, the equation that $$\text{``} f = S - d\frac{O}{P_{LCD}} \text{''}$$

is obtained.

Namely, by the conditions that S=500 mm, d=2.23 mm, S'=69.5 mm and d'=0.31 mm, the condition that f=60.76 mm can be used as the focal length of a Fresnel lens.

Since this modification uses the above-mentioned arrangement, the display 1 and the spatial light modulation element 2 can use liquid crystal elements having the same specifications, and the cost of the stereoscopic image display apparatus can be reduced.

Furthermore, in this case, as compared to the case wherein the Fresnel lens is arranged on the front surface of the apparatus, as shown in FIGS. 31A and 31B, dazzling or the like of the Fresnel lens can be eliminated.

What is claimed is:

1. A stereoscopic image display method comprising the steps of:

dividing each of a plurality of parallax images supplied from a parallax image source having parallax image information into stripe pixels;

displaying, on a display, a single stripe image by arranging and synthesizing some of the stripe pixels in a predetermined order;

displaying a slit pattern consisting of a light-transmission portion and a light shielding portion arranged at a predetermined pitch on a spatial light modulation element arranged at a predetermined position on a front or rear side of said display;

inputting light transmitted through the stripe pixels, corresponding to right and left eyes of an observer, of the stripe image to the right and left eyes of the observer via said spatial light modulation element; and synchronously displaying the stripe pattern and the slit pattern in units of pixels or scan lines on corresponding scan lines of said display and said spatial light modulation element, wherein said synchronously displaying step is performed such that the respective scanning lines of stripe image of said display and the respective scanning lines, corresponding to the respective scanning lines of stripe image of said display, of slit pattern of said spatial light modulation element are synchronously driven successively, or that the respective pixels of stripe image of said display and the respective pixels, corresponding to the respective pixels of stripe image of said display, of slit pattern of said spatial light modulation element are synchronously driven successively.

2. A method according to claim 1, wherein the plurality of parallax images are right and left parallax images, the stripe image is one of a first stripe image obtained by alternately arranging and synthesizing odd stripe pixels of the stripe pixels obtained by dividing the right parallax image and even stripe pixels of the stripe pixels obtained by dividing the left parallax image, and a second stripe image obtained by alternately arranging and synthesizing even stripe pixels of the stripe pixels obtained by dividing the right parallax image and odd stripe pixels of the stripe pixels obtained by dividing the left parallax image, one of the two stripe images is displayed on said display, the other stripe image is subsequently displayed, and the slit pattern in which the positions of the light-transmission portion and the light-shielding portion replace each other is displayed on said spatial light modulation element.

3. A method according to claim 1, wherein the stripe image is displayed on a portion of a display surface of said display, a non-stripe image is displayed on the remaining portion of the display surface, and the slit pattern is displayed on the entire display surface of said spatial light modulation element.

4. A method according to claim 1, wherein a display width of each of the stripe pixels constituting the stripe image to be displayed on said display and/or a display width of each of the light-transmission portion and the light-shielding portion of the slit pattern to be displayed on said spatial light modulation element are/is set to be equal to a total width of a plurality of pixels constituting display surfaces of said display and said spatial light modulation element.

5. A method according to claim 1, wherein a display width of each of the stripe pixels constituting the stripe image to be displayed on said display is set to be equal to a width of one pixel constituting a display surface of said display, and a display width of each of the light-transmission portion and the light-shielding portion of the slit pattern to be displayed on said spatial light modulation element is set to be equal to a total width of a plurality of pixels constituting a display surface of said spatial light modulation element.

6. A method according to claim 1, wherein a display width of each of the stripe pixels constituting the stripe image to be displayed on said display is set to be equal to a total width of a plurality of pixels constituting a display surface of said display, and a display width of each of the light-transmission portion and the light-shielding portion of the slit pattern to be displayed on said spatial light modulation element is set to be equal to a width of one pixel constituting a display surface of said spatial light modulation element.

7. A method according to claim 1, wherein each of display surfaces of said display and said spatial light modulation element has pixels in a matrix structure.

8. A method according to claim 1, wherein said spatial light modulation element comprises a liquid crystal element.

9. A method according to claim 1, further comprising the step of controlling at least one of constituting elements of the stripe image and constituting elements of the slit pattern in accordance with a signal from one of observation condition detecting means for automatically detecting a view point position of the observer and observation condition inputting means used by the operator to input an observation condition.

10. A message according to claim 1, further comprising the step of interlace-scanning the corresponding scan lines of said display and said spatial light modulation element.

11. A method according to claim 1, further comprising the step of scanning the corresponding scan lines of said display and said spatial light modulation element in a vertical direction.

12. A method according to claim 1, wherein the stripe image is displayed on a portion of a display surface of said display, a non-stripe image is displayed on the remaining portion of the display surface, the slit pattern is displayed on a portion, corresponding to the stripe image displayed on said display, of a display surface of said spatial light modulation element, and the remaining portion of the display surface of said spatial light modulation element is set in a light-transmission state.

13. A method according to claim 1, further comprising the step of outputting predetermined polarized light from said display.

14. A method according to claim 1, further comprising the step of controlling an interval between said display and said spatial light modulation element on the basis of a signal from one of observation condition detecting means for automatically detecting a view point position of the observer and observation condition inputting means used by the operator to input an observation condition.

15. A method according to claim 1, further comprising the step of selecting and using the parallax images from at least three original parallax images constituting the parallax image information on the basis of a signal from one of observation condition detecting means for automatically detecting a view point position of the observer and observation condition inputting means used by the operator to input an observation condition.

16. A method according to claim 1, further comprising the step of generating the parallax images on the basis of data constituting the parallax image information or generation the parallax image on the basis of at least two original parallax images constituting the parallax image information by interpolation or re-construction in correspondence with a view point position of the observer, in accordance with a signal from one of observation condition detecting means for automatically detecting the view point position of the observer and observation condition inputting means used by the operator to input an observation condition.

17. A method according to claim 1, further comprising the step of precedently displaying, as the light shielding portion, a plurality of pixels preceding to a scan line to be synchronously displayed or a plurality of scan lines preceding to a scan line to be synchronously displayed on said spatial light modulation element when the stripe image and the slit pattern are synchronously displayed on said display and said spatial light modulation element in units of pixels or scan lines.

18. A method according to claim 1, further comprising the step of dividing each of display surfaces of said display and said spatial light modulation element into a plurality of regions having the same size along a scan line, simultaneously selecting and scanning lines at the same relative positions of the plurality of regions, and synchronously displaying the stripe image and the slit pattern on said display and said spatial light modulation element in units of pixels on the plurality of scan lines or in units of corresponding scan lines of the plurality of scan lines.

19. An apparatus according to claim 17, wherein said display comprises a liquid crystal element.

20. An apparatus according to claim 19, wherein said display comprises a ferroelectric liquid crystal element.

21. An apparatus according to claim 10, wherein at least one of constituting elements of the stripe image and constituting elements of the slit pattern is controlled in accordance with a signal from one of observation condition detecting means for automatically detecting a view point position of the observer and observation condition inputting means used by the operator to input an observation condition.

22. An apparatus according to claim 19, wherein a display width of each of the stripe pixels constituting the strip image to be displayed on said display and/or a display width of each of the light-transmission portion and the light-shielding portion of the slit pattern to be displayed on said spatial light modulation element are/is set t o be equal to a total width of a plurality of pixels constituting display surface of said display and said spatial light modulation element.

23. An apparatus according to claim 19, wherein a display width of each of the stripe pixels constituting the stripe image to be displayed on said display is set to be equal to a width of one pixel constituting a display surface of said display, and a display width of each of the light-transmission portion and the light-shielding portion of the slit pattern to be displayed on said spatial light modulation element is set to be equal to a total width of a plurality of pixels constituting a display surface of said spatial light modulation element.

24. An apparatus according to claim 19, wherein a display width of each of the stripe pixels constituting the stripe image to be displayed on said display is set to be equal to a total width of a plurality of pixels constituting a display surface of said display, and a display width of each of the light-transmission portion and the light-shielding portion of the slit pattern to be displayed on said spatial light modulation element is set to be equal to a width of one pixel constituting a display surface of said spatial light modulation element.

25. An apparatus according claim 19, wherein each of display surfaces of said display and said spatial light modulation element has pixels in a matrix structure.

26. An apparatus according to claim 19, wherein said spatial modulation element comprises a liquid crystal element.

27. An apparatus according to claim 26, wherein said spatial light modulation element comprises a ferroelectric liquid crystal element.

28. An apparatus according to claim 26, wherein said display comprises a liquid crystal element.

29. An apparatus according to claim 26, wherein said display comprises a ferroelectric liquid crystal element.

30. An apparatus according to claim 26, wherein said display comprises a self-emission type display and a single polarizing plate.

31. An apparatus according to claim 19, wherein at least one of constituting elements of the stripe image and constituting elements of the slit pattern is controlled in accordance with a signal from one of observation condition detecting means for automatically detecting a view point position of the observer and observation condition inputting means used by the operator to input an observation condition.

32. An apparatus according to claim 19, wherein the corresponding scan lines of said display and said spatial light modulation element are interlace-scanned.

33. An apparatus according to claim 19, wherein the corresponding scan lines of said spatial modulation element are scanned in a vertical direction.

34. An apparatus according to claim 19, wherein the stripe image is displayed on a portion of a display surface of said display, a non-stripe image is displayed on the remaining portion of the display surface, the slit pattern is displayed on a portion, corresponding to the stripe image displayed on said display, of a display surface of said spatial light modulation element, and the remaining portion of the displayed surface of said spatial light modulation element is set in a light-transmission state.

35. An apparatus according to claim 19, wherein predetermined polarized light is output from the stripe image to be displayed on said display, and said spatial light modulation element comprises a liquid crystal element and a single polarizing plate.

36. An apparatus according to claim 19, wherein an interval between said display and said spatial light modulation element is controlled by interval controlling means on the basis of a signal from one of observation condition detecting means for automatically detecting a view point position of the observer and observation condition inputting means used by the operator to input an observation condition.

37. An apparatus according to claim 19, wherein the parallax images to be used are selected from at least three original parallax images constituting the parallax image information on the basis of a signal from one of observation condition detecting means for automatically detecting a view point position of the observation condition inputting means uses by the operator to input an observation condition.

38. An apparatus according to claim 19, wherein the parallax images are generated on the basis of data constituting th parallax image information or the parallax images are generated on the basis of at least two original parallax images constituting the parallax image information by interpolation or re-construction in correspondence with a view point position of the observer, in accordance with a signal from one of observation condition detecting means for automatically detecting the view point position of the observer and observation condition inputting means used by the operator to input an observation condition.

39. An apparatus according to claim 19, wherein a plurality of pixels preceding to a pixel to be synchronously displayed or a plurality of scan lines preceding to a scan line to be synchronously displayed on said spatial light modulation element are precedently displayed as the light-shielding portion when the stripe image and the slit pattern are synchronously displayed on said display and said spatial light modulation element in units of pixels or scan lines.

40. An apparatus according to claim 19, wherein each of display surfaces of said display and said spatial light modulation element is divided into a plurality of regions having the same size along a scan line, scan lines at the same relative positions of the plurality of regions are simultaneously selected and scanned, and the stripe image and the slit pattern are synchronously displayed on said display and said spatial light modulation element in units of pixels on the plurality of scan lines or in units of corresponding scan lines of the plurality of scan lines.

41. A stereoscopic image display apparatus comprising:
a display for sequentially forming a single stripe image obtained by arranging and synthesizing some of a plurality of stripe pixels which are obtained by dividing each of right- and left-eye parallax images supplied from a parallax image source having parallax image information, while performing a scanning operation; and
a spatial light modulation element located on a front or rear side of said display, said spatial light modulation element sequentially forming a slit pattern consisting of a light- transmission portion and a light-shielding portion arranged at a predetermined pitch in synchronism with the scanning operation, and light transmitted through the stripe pixels, corresponding to right and left eyes of an observer, of the stripe image displayed on said display being input to the right and left eyes of the observer via the slit pattern wherein said spatial light modulation element drives the respective scanning lines, corresponding to scanning lines of stripe image of said display, of said slit pattern in synchronism with drive of the respective scanning lines of stripe image of said display, or drives the respective pixels, corresponding to respective pixels of stripe image of said display, of said slit pattern in synchronism with drive of the respective pixels of stripe images of said display.

42. An apparatus according to claim 41, wherein said spatial light modulation element is arranged on the front side of said display, and said apparatus further comprises a linear Fresnel lens having a power only in a horizontal direction and arranged on the front side of said spatial light modulation element or arranged between said display and said spatial light modulation element.

43. An apparatus according to claim 41, wherein a spatial light modulation element illuminated with light emitted by light source means is arranged on the rear side of said display, and said apparatus further comprises a linear Fresnel lens having a power only in a horizontal direction and arranged on the front side of said display or arranged between said display and said spatial light modulation element.

44. A stereoscopic image display method comprising the steps of:

sequentially forming, on a display, a single stripe image obtained by arranging and synthesizing some of a plurality of stripe pixels which are obtained by dividing each of right- and left-eye parallax images supplied from a parallax image source having parallax image information, while performing a scanning operation, and inputting light transmitted through the stripe pixels, corresponding to right and left eyes of an observer, of the stripe image displayed on said display to the right and left eyes of the observer via a slit pattern, which is obtained by sequentially forming a light-transmission portion and a light-shielding portion at a predetermined pitch on a spatial light modulation element, in synchronism with the scanning operation, wherein said spatial light modulation element drives the respective scanning lines, corresponding to scanning lines of stripe image of said display, of said slit pattern in synchronism with drive of the respective scanning lines of stripe image of said display, or drives the respective pixels, corresponding to respective pixels of stripe image of display, of said slit pattern in synchronism with drive of the respective pixels of stripe image of said display.

* * * * *

UNITED STATES PATENT AND TRADEMARK OFFICE
CERTIFICATE OF CORRECTION

PATENT NO.   : 6,094,216
DATED        : July 25, 2000
INVENTOR(S)  : Naosato Taniguchi et al.

It is certified that error appears in the above-identified patent and that said Letters Patent is hereby corrected as shown below:

<u>Title page,</u>
Item [57], ABSTRACT,
Line 2, add -- the -- after "respectively,".

<u>Column 28,</u>
Line 38, please delete "it s" and insert therefor -- its --.

<u>Column 37,</u>
Line 46, please delete "message" and insert therefor -- method --.

<u>Column 38,</u>
Lines 43 and 44, please delete claim 19 and insert therefor --

19. A stereoscopic image display apparatus comprising:

a display for displaying a single stripe image obtained by arranging and synthesizing some of a plurality of stripe pixels which are obtained by dividing each of a plurality of parallax images supplied from a parallax image source having parallax image information;

a spatial light modulation element arranged at a predetermined position on a front or rear side of said display, said spatial light modulation element displaying a slit pattern consisting of a light-transmission portion and a light-shielding portion arranged at a predetermined pitch, and light transmitted through the stripe pixels, corresponding to right and left eyes of an observer, of the stripe image being input to the right and left eyes of the observer via said spatial light modulation element so as to attain a stereoscopic view; and means for synchronously displaying the stripe image and the slit pattern on corresponding scan lines of said display and said spatial light modulation element in units of pixels or scan lines, wherein said means for synchronously displaying synchronously drives the respective scanning lines of stripe image of said display and the respective scanning lines, corresponding to the respective scanning lines of stripe image of said display, of slit pattern of said spatial light modulation element successively, or synchronously drives the respective pixels of stripe image of said display and the respective pixels, corresponding to the respective pixels of stripe image of said display, of slit pattern of said spatial light modulation element successively.--

UNITED STATES PATENT AND TRADEMARK OFFICE
CERTIFICATE OF CORRECTION

PATENT NO. : 6,094,216
DATED : July 25, 2000
INVENTOR(S) : Naosato Taniguchi et al.

It is certified that error appears in the above-identified patent and that said Letters Patent is hereby corrected as shown below:

<u>Column 38 (cont'd),</u>
Lines 45 and 46, please delete claim 20 and insert therefor --

20. An apparatus according to claim 19, wherein the plurality of parallax image are right and left parallax images, the stripe image is one of a first stripe image obtained by alternately arranging and synthesizing odd stripe pixels of the stripe pixels obtained by dividing the right parallax image and even stripe pixels of the stripe pixels obtained by dividing the left parallax image, and a second stripe image obtained by alternately arranging and synthesizing even stripe pixels of the stripe pixels obtained by dividing the right parallax image odd stripe pixels of the stripe pixels obtained by dividing the left parallax image, the slit pattern to be displayed upon display of the first stripe image and the slit pattern to be displayed upon display of the second stripe image have opposite positional relationships of the light-transmission portion and the light-shielding portion, and the two stripe images are successively displayed. --

Lines 47-53, please delete claim 21 and insert therefor --

21. An apparatus according to claim 19, wherein the stripe image is displayed on a portion of a display surface of said display, a non-stripe image is displayed on the remaining portion of the display surface, and the slit pattern is displayed on the entire display surface of said spatial light modulation element.--

<u>Column 40,</u>
Line 52, please add -- , -- after "pattern".
Line 60, please delete "images" and insert therefor -- image --.

Signed and Sealed this

Twelfth Day of August, 2003

JAMES E. ROGAN
*Director of the United States Patent and Trademark Office*